United States Patent
Chen et al.

(10) Patent No.: US 12,491,274 B2
(45) Date of Patent: Dec. 9, 2025

(54) RADIOCONJUGATES TARGETING CD33 IN THE TREATMENT OF SARCOMAS

(71) Applicant: ACTINIUM PHARMACEUTICALS, INC., New York, NY (US)

(72) Inventors: Mary M. Chen, Hoboken, NJ (US); Avinash Desai, Ringoes, NJ (US); Dale L. Ludwig, Rockaway, NJ (US); Mark Berger, New York, NY (US)

( * ) Notice: Subject to any disclaimer, the term of this patent is extended or adjusted under 35 U.S.C. 154(b) by 692 days.

(21) Appl. No.: 17/822,701

(22) Filed: Aug. 26, 2022

(65) Prior Publication Data

US 2023/0092668 A1    Mar. 23, 2023

Related U.S. Application Data

(63) Continuation-in-part of application No. 17/883,434, filed on Aug. 8, 2022, which is a continuation-in-part of application No. 17/532,919, filed on Nov. 22, 2021.

(60) Provisional application No. 63/230,431, filed on Aug. 6, 2021.

(51) Int. Cl.
*A61K 51/10* (2006.01)
*A61K 45/06* (2006.01)

(52) U.S. Cl.
CPC .......... *A61K 51/1027* (2013.01); *A61K 45/06* (2013.01)

(58) Field of Classification Search
None
See application file for complete search history.

(56) References Cited

PUBLICATIONS

Maccallum et al. (1996). J. Mol. Biol. 262:732-745.*
De Pascalis et al. (2002). Journal of Immunology. 169:3076-3084.*
Casset et al. (2003). Biochemical and Biophysical Research Communications. 307:198-205.*
Chen et al. (1999). J. Mol. biol. 293:865-881.*
Wu et al. (1999). J. Mol. Biol. 294:151-162.*
Rudikoff et al. (1982). PNAS. 79:1979-1983.*

* cited by examiner

*Primary Examiner* — Christine J Saoud
*Assistant Examiner* — Jon M Lockard

(57) ABSTRACT

The invention provides compositions and methods for treating cancers and proliferative disorders, including solid tumor cancers and non-myeloid hematological malignancies, using radioconjugates targeting CD33, alone or in combination with one or more radioconjugates targeting other cancer-associated targets such as DR5, 5T4, HER2, HER3, and TROP2, antibody drug conjugates targeting these or other cancer-associated targets, therapeutic antibodies targeting these or other cancer-associated targets, chemotherapy agents and regimens, and immune checkpoint inhibitors.

2 Claims, 1 Drawing Sheet
Specification includes a Sequence Listing.

SEQUENCE LISTING

```
Sequence total quantity: 146
SEQ ID NO: 1           moltype = AA  length = 5
FEATURE                Location/Qualifiers
source                 1..5
                       mol_type = protein
                       organism = Mus musculus
SEQUENCE: 1
SHWLH                                                                    5

SEQ ID NO: 2           moltype = AA  length = 17
```

```
FEATURE              Location/Qualifiers
source               1..17
                     mol_type = protein
                     organism = Mus musculus
SEQUENCE: 2
VLDPSDFYSN YNQNFKG                                                    17

SEQ ID NO: 3         moltype = AA  length = 11
FEATURE              Location/Qualifiers
source               1..11
                     mol_type = protein
                     organism = Mus musculus
SEQUENCE: 3
GLLSGDYAMD Y                                                          11

SEQ ID NO: 4         moltype = AA  length = 16
FEATURE              Location/Qualifiers
source               1..16
                     mol_type = protein
                     organism = Mus musculus
SEQUENCE: 4
RSSQSIVHSN GNTYLE                                                     16

SEQ ID NO: 5         moltype = AA  length = 7
FEATURE              Location/Qualifiers
source               1..7
                     mol_type = protein
                     organism = Mus musculus
SEQUENCE: 5
KVSNRFS                                                               7

SEQ ID NO: 6         moltype = AA  length = 9
FEATURE              Location/Qualifiers
source               1..9
                     mol_type = protein
                     organism = Mus musculus
SEQUENCE: 6
FQGSYVPWT                                                             9

SEQ ID NO: 7         moltype = AA  length = 120
FEATURE              Location/Qualifiers
source               1..120
                     mol_type = protein
                     organism = Mus musculus
SEQUENCE: 7
QVQLQQPGAE LVRPGTSVKL SCKASGYTFT SHWLHWVKQR PGQGLEWIGV LDPSDFYSNY      60
NQNFKGKATL TVDTSSSTAY MQLSSLTSED SAVYYCARGL LSGDYAMDYW GAGTSVTVSS     120

SEQ ID NO: 8         moltype = AA  length = 112
FEATURE              Location/Qualifiers
source               1..112
                     mol_type = protein
                     organism = Mus musculus
SEQUENCE: 8
DVLMTQIPLS LPVSLGDQAS ISCRSSQSIV HSNGNTYLEW YLQKPGQSPK SLIYKVSNRF      60
SGVPDRFSGS GSGTDFTLKI SRVEAEDLGV YYCFQGSYVP WTFGGGTKLE IK             112

SEQ ID NO: 9         moltype = AA  length = 463
FEATURE              Location/Qualifiers
source               1..463
                     mol_type = protein
                     organism = Mus musculus
SEQUENCE: 9
MGWSCIIVLL VSTATGVHSQ VQLQQPGAEL VRPGTSVKLS CKASGYTFTS HWLHWVKQRP      60
GQGLEWIGVL DPSDFYSNYN QNFKGKATLT VDTSSSTAYM QLSSLTSEDS AVYYCARGLL     120
SGDYAMDYWG QGTSVTVSSA KTTPPSVYPL APGSAAQTNS MVTLGCLVKG YFPEPVTVTW     180
NSGSLSSGVH TFPAVLQSDL YTLSSSVTVP SSTWPSQTVT CNVAHPASST KVDKKIVPRD     240
CGCKPCICTV PEVSSVFIFP PKPKDVLTIT LTPKVTCVVV DISKDDPEVQ FSWFVDDVEV     300
HTAQTQPREE QFNSTFRSVS ELPIMHQDWL NGKEFKCRVN SAAFPAPIEK TISKTKGRPK     360
APQVYTIPPP KEQMAKDKVS LTCMITDFFP EDITVEWQWN GQPAENYKNT QPIMDTDGSY     420
FVYSKLNVQK SNWEAGNTFT CSVLHEGLHN HHTEKSLSHS PGK                       463

SEQ ID NO: 10        moltype = AA  length = 238
FEATURE              Location/Qualifiers
source               1..238
                     mol_type = protein
                     organism = Mus musculus
SEQUENCE: 10
MKLPVRLLVL MFWIPASSSD VLMTQIPLSL PVSLGDQASI SCRSSQSIVH SNGNTYLEWY      60
```

```
LQKPGQSPKS LIYKVSNRFS GVPDRFSGSG SGTDFTLKIS RVEAEDLGVY YCFQGSYVPW    120
TFGGGTKLEI KRADAAPTVS IFPPSSEQLT SGGASVVCFL NNFYPRDINV KWKIDGSERQ    180
NGVLNSWTDQ DSKDSTYSMS STLTLTKDEY ERHNSYTCEA THKTSTSPIV KSFNRNEC      238

SEQ ID NO: 11               moltype = AA   length = 444
FEATURE                     Location/Qualifiers
source                      1..444
                            mol_type = protein
                            organism = Mus musculus
SEQUENCE: 11
QVQLQQPGAE LVRPGTSVKL SCKASGYTFT SHWLHWVKQR PGQGLEWIGV LDPSDFYSNY    60
NQNFKGKATL TVDTSSSTAY MQLSSLTSED SAVYYCARGL LSGDYAMDYW GQGTSVTVSS    120
AKTTPPSVYP LAPGSAAQTN SMVTLGCLVK GYFPEPVTVT WNSGSLSSGV HTFPAVLQSD    180
LYTLSSSVTV PSSTWPSQTV TCNVAHPASS TKVDKKIVPR DCGCKPCICT VPEVSSVFIF    240
PPKPKDVLTI TLTPKVTCVV VDISKDDPEV QFSWFVDDVE VHTAQTQPRE EQFNSTFRSV    300
SELPIMHQDW LNGKEFKCRV NSAAFPAPIE KTISKTKGRP KAPQVYTIPP PKEQMAKDKV    360
SLTCMITDFF PEDITVEWQW NGQPAENYKN TQPIMDTDGS YFVYSKLNVQ KSNWEAGNTF    420
TCSVLHEGLH NHHTEKSLSH SPGK                                          444

SEQ ID NO: 12               moltype = AA   length = 219
FEATURE                     Location/Qualifiers
source                      1..219
                            mol_type = protein
                            organism = Mus musculus
SEQUENCE: 12
DVLMTQIPLS LPVSLGDQAS ISCRSSQSIV HSNGNTYLEW YLQKPGQSPK SLIYKVSNRF    60
SGVPDRFSGS GSGTDFTLKI SRVEAEDLGV YYCFQGSYVP WTFGGGTKLE IKRADAAPTV    120
SIFPPSSEQL TSGGASVVCF LNNFYPRDIN VKWKIDGSER QNGVLNSWTD QDSKDSTYSM    180
SSTLTLTKDE YERHNSYTCE ATHKTSTSPI VKSFNRNEC                           219

SEQ ID NO: 13               moltype = AA   length = 10
FEATURE                     Location/Qualifiers
source                      1..10
                            mol_type = protein
                            organism = Mus musculus
SEQUENCE: 13
QVQLQQPGAE                                                           10

SEQ ID NO: 14               moltype = AA   length = 10
FEATURE                     Location/Qualifiers
source                      1..10
                            mol_type = protein
                            organism = Mus musculus
SEQUENCE: 14
DVLMTQIPLS                                                           10

SEQ ID NO: 15               moltype = AA   length = 5
FEATURE                     Location/Qualifiers
REGION                      1..5
                            note = Description of Artificial Sequence: Synthetic peptide
source                      1..5
                            mol_type = protein
                            organism = synthetic construct
SEQUENCE: 15
DYAMS                                                                5

SEQ ID NO: 16               moltype = AA   length = 17
FEATURE                     Location/Qualifiers
REGION                      1..17
                            note = Description of Artificial Sequence: Synthetic peptide
source                      1..17
                            mol_type = protein
                            organism = synthetic construct
SEQUENCE: 16
TISDGGTYTY YPDSVKG                                                   17

SEQ ID NO: 17               moltype = AA   length = 10
FEATURE                     Location/Qualifiers
REGION                      1..10
                            note = Description of Artificial Sequence: Synthetic peptide
source                      1..10
                            mol_type = protein
                            organism = synthetic construct
SEQUENCE: 17
EWGDYDGFDY                                                           10

SEQ ID NO: 18               moltype = AA   length = 11
FEATURE                     Location/Qualifiers
REGION                      1..11
```

```
                         note = Description of Artificial Sequence: Synthetic peptide
source                   1..11
                         mol_type = protein
                         organism = synthetic construct
SEQUENCE: 18
RASQEISGYL S                                                              11

SEQ ID NO: 19            moltype = AA   length = 7
FEATURE                  Location/Qualifiers
REGION                   1..7
                         note = Description of Artificial Sequence: Synthetic peptide
source                   1..7
                         mol_type = protein
                         organism = synthetic construct
SEQUENCE: 19
AASTLDS                                                                   7

SEQ ID NO: 20            moltype = AA   length = 9
FEATURE                  Location/Qualifiers
REGION                   1..9
                         note = Description of Artificial Sequence: Synthetic peptide
source                   1..9
                         mol_type = protein
                         organism = synthetic construct
SEQUENCE: 20
LQYDSYPYT                                                                 9

SEQ ID NO: 21            moltype = AA   length = 119
FEATURE                  Location/Qualifiers
REGION                   1..119
                         note = Description of Artificial Sequence: Synthetic
                           polypeptide
source                   1..119
                         mol_type = protein
                         organism = synthetic construct
SEQUENCE: 21
QVQLVESGGG LVKPGGSLRL SCAASGFTFS DYAMSWIRQA PGKGLEWVST ISDGGTYTYY    60
PDSVKGRFTI SRDNAKNSLY LQMNSLRAED TAVYYCAREW GDYDGFDYWG QGTLVTVSS    119

SEQ ID NO: 22            moltype = AA   length = 107
FEATURE                  Location/Qualifiers
REGION                   1..107
                         note = Description of Artificial Sequence: Synthetic
                           polypeptide
source                   1..107
                         mol_type = protein
                         organism = synthetic construct
SEQUENCE: 22
DIQMTQSPSS LSASVGDRVT ITCRASQEIS GYLSWYQQKP GKAPKRLIYA ASTLDSGVPS    60
RFSGSGSGTE FTLTISSLQP EDFATYYCLQ YDSYPYTFGQ GTKLEIK                 107

SEQ ID NO: 23            moltype = AA   length = 471
FEATURE                  Location/Qualifiers
REGION                   1..471
                         note = Description of Artificial Sequence: Synthetic
                           polypeptide
source                   1..471
                         mol_type = protein
                         organism = synthetic construct
SEQUENCE: 23
MDMRVPAQLL GLLLLWLRGA RCQVQLVESG GGLVKPGGSL RLSCAASGFT FSDYAMSWIR    60
QAPGKGLEWV STISDGGTYT YYPDSVKGRF TISRDNAKNS LYLQMNSLRA EDTAVYYCAR   120
EWGDYDGFDY WGQGTLVTVS SASTKGPSVF PLAPSSKSTS GGTAALGCLV KDYFPEPVTV   180
SWNSGALTSG VHTFPAVLQS SGLYSLSSVV TVPSSSLGTQ TYICNVNHKP SNTKVDKRVE   240
PKSCDKTHTC PPCPAPELLG GPSVFLFPPK PKDTLMISRT PEVTCVVVDV SHEDPEVKFN   300
WYVDGVEVHN AKTKPREEQY NSTYRVVSVL TVLHQDWLNG KEYKCKVSNK ALPAPIEKTI   360
SKAKGQPREP QVYTLPPSRE EMTKNQVSLT CLVKGFYPSD IAVEWESNGQ PENNYKTTPP   420
VLDSDGSFFL YSKLTVDKSR WQQGNVFSCS VMHEALHNHY TQKSLSLSPG K            471

SEQ ID NO: 24            moltype = AA   length = 236
FEATURE                  Location/Qualifiers
REGION                   1..236
                         note = Description of Artificial Sequence: Synthetic
                           polypeptide
source                   1..236
                         mol_type = protein
                         organism = synthetic construct
SEQUENCE: 24
MDMRVPAQLL GLLLLWLRGA RCDIQMTQSP SSLSASVGDR VTITCRASQE ISGYLSWYQQ    60
```

```
KPGKAPKRLI YAASTLDSGV PSRFSGSGSG TEFTLTISSL QPEDFATYYC LQYDSYPYTF    120
GQGTKLEIKR TVAAPSVFIF PPSDEQLKSG TASVVCLLNN FYPREAKVQW KVDNALQSGN    180
SQESVTEQDS KDSTYSLSST LTLSKADYEK HKVYACEVTH QGLSSPVTKS FNRGEC        236

SEQ ID NO: 25           moltype = AA   length = 5
FEATURE                 Location/Qualifiers
REGION                  1..5
                        note = Description of Artificial Sequence: Synthetic peptide
source                  1..5
                        mol_type = protein
                        organism = synthetic construct
SEQUENCE: 25
SHWLH                                                                 5

SEQ ID NO: 26           moltype = AA   length = 17
FEATURE                 Location/Qualifiers
REGION                  1..17
                        note = Description of Artificial Sequence: Synthetic peptide
source                  1..17
                        mol_type = protein
                        organism = synthetic construct
SEQUENCE: 26
VLDPSDFYSN YNQNFKG                                                   17

SEQ ID NO: 27           moltype = AA   length = 11
FEATURE                 Location/Qualifiers
REGION                  1..11
                        note = Description of Artificial Sequence: Synthetic peptide
source                  1..11
                        mol_type = protein
                        organism = synthetic construct
SEQUENCE: 27
GLLSGDYAMD Y                                                         11

SEQ ID NO: 28           moltype = AA   length = 16
FEATURE                 Location/Qualifiers
REGION                  1..16
                        note = Description of Artificial Sequence: Synthetic peptide
source                  1..16
                        mol_type = protein
                        organism = synthetic construct
SEQUENCE: 28
RSSQSIVHSN GNTYLE                                                    16

SEQ ID NO: 29           moltype = AA   length = 7
FEATURE                 Location/Qualifiers
REGION                  1..7
                        note = Description of Artificial Sequence: Synthetic peptide
source                  1..7
                        mol_type = protein
                        organism = synthetic construct
SEQUENCE: 29
KVSNRFS                                                               7

SEQ ID NO: 30           moltype = AA   length = 9
FEATURE                 Location/Qualifiers
REGION                  1..9
                        note = Description of Artificial Sequence: Synthetic peptide
source                  1..9
                        mol_type = protein
                        organism = synthetic construct
SEQUENCE: 30
FQGSYVPWT                                                             9

SEQ ID NO: 31           moltype = AA   length = 120
FEATURE                 Location/Qualifiers
REGION                  1..120
                        note = Description of Artificial Sequence: Synthetic
                         polypeptide
source                  1..120
                        mol_type = protein
                        organism = synthetic construct
SEQUENCE: 31
QVQLQQPGAE LVRPGTSVKL SCKASGYTFT SHWLHWVKQR PGQGLEWIGV LDPSDFYSNY     60
NQNFKGKATL TVDTSSSTAY MQLSSLTSED SAVYYCARGL LSGDYAMDYW GQGTSVTVSS    120

SEQ ID NO: 32           moltype = AA   length = 112
FEATURE                 Location/Qualifiers
REGION                  1..112
```

```
                         note = Description of Artificial Sequence: Synthetic
                          polypeptide
source                   1..112
                         mol_type = protein
                         organism = synthetic construct
SEQUENCE: 32
DVLMTQIPLS LPVSLGDQAS ISCRSSQSIV HSNGNTYLEW YLQKPGQSPK SLIYKVSNRF   60
SGVPDRFSGS GSGTDFTLKI SRVEAEDLGV YYCFQGSYVP WTFGGGTKLE IK          112

SEQ ID NO: 33            moltype = AA   length = 463
FEATURE                  Location/Qualifiers
REGION                   1..463
                         note = Description of Artificial Sequence: Synthetic
                          polypeptide
source                   1..463
                         mol_type = protein
                         organism = synthetic construct
SEQUENCE: 33
MGWSCIIVLL VSTATGVHSQ VQLQQPGAEL VRPGTSVKLS CKASGYTFTS HWLHWVKQRP   60
GQGLEWIGVL DPSDFYSNYN QNFKGKATLT VDTSSSTAYM QLSSLTSEDS AVYYCARGLL  120
SGDYAMDYWG QGTSVTVSSA KTTPPSVYPL APGSAAQTNS MVTLGCLVKG YFPEPVTVTW  180
NSGSLSSGVH TFPAVLQSDL YTLSSSVTVP SSTWPSQTVT CNVAHPASST KVDKKIVPRD  240
CGCKPCICTV PEVSSVFIFP PKPKDVLTIT LTPKVTCVVV DISKDDPEVQ FSWFVDDVEV  300
HTAQTQPREE QFNSTFRSVS ELPIMHQDWL NGKEFKCRVN SAAFPAPIEK TISKTKGRPK  360
APQVYTIPPP KEQMAKDKVS LTCMITDFFP EDITVEWQWN GQPAENYKNT QPIMDTDGSY  420
FVYSKLNVQK SNWEAGNTFT CSVLHEGLHN HHTEKSLSHS PGK                   463

SEQ ID NO: 34            moltype = AA   length = 238
FEATURE                  Location/Qualifiers
REGION                   1..238
                         note = Description of Artificial Sequence: Synthetic
                          polypeptide
source                   1..238
                         mol_type = protein
                         organism = synthetic construct
SEQUENCE: 34
MKLPVRLLVL MFWIPASSSD VLMTQIPLSL PVSLGDQASI SCRSSQSIVH SNGNTYLEWY   60
LQKPGQSPKS LIYKVSNRFS GVPDRFSGSG SGTDFTLKIS RVEAEDLGVY YCFQGSYVPW  120
TFGGGTKLEI KRADAAPTVS IFPPSSEQLT SGGASVVCFL NNFYPRDINV KWKIDGSERQ  180
NGVLNSWTDQ DSKDSTYSMS STLTLTKDEY ERHNSYTCEA THKTSTSPIV KSFNRNEC    238

SEQ ID NO: 35            moltype = AA   length = 7
FEATURE                  Location/Qualifiers
REGION                   1..7
                         note = Description of Artificial Sequence: Synthetic peptide
source                   1..7
                         mol_type = protein
                         organism = synthetic construct
SEQUENCE: 35
TFGLSVG                                                              7

SEQ ID NO: 36            moltype = AA   length = 16
FEATURE                  Location/Qualifiers
REGION                   1..16
                         note = Description of Artificial Sequence: Synthetic peptide
source                   1..16
                         mol_type = protein
                         organism = synthetic construct
SEQUENCE: 36
HIWWDDDKYY NPALKS                                                   16

SEQ ID NO: 37            moltype = AA   length = 10
FEATURE                  Location/Qualifiers
REGION                   1..10
                         note = Description of Artificial Sequence: Synthetic peptide
source                   1..10
                         mol_type = protein
                         organism = synthetic construct
SEQUENCE: 37
IGADALPFDY                                                          10

SEQ ID NO: 38            moltype = AA   length = 16
FEATURE                  Location/Qualifiers
REGION                   1..16
                         note = Description of Artificial Sequence: Synthetic peptide
source                   1..16
                         mol_type = protein
                         organism = synthetic construct
SEQUENCE: 38
```

```
RSSKSLLHSN GNTYLY                                                        16

SEQ ID NO: 39              moltype = AA  length = 7
FEATURE                    Location/Qualifiers
REGION                     1..7
                           note = Description of Artificial Sequence: Synthetic peptide
source                     1..7
                           mol_type = protein
                           organism = synthetic construct
SEQUENCE: 39
RMSNLAS                                                                  7

SEQ ID NO: 40              moltype = AA  length = 9
FEATURE                    Location/Qualifiers
REGION                     1..9
                           note = Description of Artificial Sequence: Synthetic peptide
source                     1..9
                           mol_type = protein
                           organism = synthetic construct
SEQUENCE: 40
MQHLEYPFT                                                                9

SEQ ID NO: 41              moltype = AA  length = 120
FEATURE                    Location/Qualifiers
REGION                     1..120
                           note = Description of Artificial Sequence: Synthetic
                            polypeptide
source                     1..120
                           mol_type = protein
                           organism = synthetic construct
SEQUENCE: 41
QVTLKESGPG ILRPSQTLSL TCSFSGFSLS TFGLSVGWIR QPSGKGLEWL AHIWWDDDKY    60
YNPALKSRLT ISKDTSKNQV FLKIANVDTA DTATYYCARI GADALPFDYW GQGTTLTVSS   120

SEQ ID NO: 42              moltype = AA  length = 112
FEATURE                    Location/Qualifiers
REGION                     1..112
                           note = Description of Artificial Sequence: Synthetic
                            polypeptide
source                     1..112
                           mol_type = protein
                           organism = synthetic construct
SEQUENCE: 42
DIVLTQTAPS VPVTPGESVS ISCRSSKSLL HSNGNTYLYW FLQRPGQSPQ LLIYRMSNLA    60
SGVPDRFSGS GSGTAFTLRI SRVEAEDVGV YYCMQHLEYP FTFGSGTKLE IK           112

SEQ ID NO: 43              moltype = AA  length = 475
FEATURE                    Location/Qualifiers
REGION                     1..475
                           note = Description of Artificial Sequence: Synthetic
                            polypeptide
source                     1..475
                           mol_type = protein
                           organism = synthetic construct
SEQUENCE: 43
MGRLTSSFLL LIVPAYVLSQ VTLKESGPGI LRPSQTLSLT CSFSGFSLST FGLSVGWIRQ    60
PSGKGLEWLA HIWWDDDKYY NPALKSRLTI SKDTSKNQVF LKIANVDTAD TATYYCARIG   120
ADALPFDYWG QGTTLTVSSA KTTPPSVYPL APGCGDTTGS SVTSGCLVKG YFPEPVTVTW   180
NSGSLSSSVH TFPALLQSGL YTMSSSVTVP SSTWPSQTVT CSVAHPASST TVDKKLEPSG   240
PISTINPCPP CKECHKCPAP NLEGGPSVFI FPPNIKDVLM ISLTPKVTCV VVDVSEDDPD   300
VQISWFVNNV EVHTAQTQTH REDYNSTIRV VSTLPIQHQD WMSGKEFKCK VNNKDLPSPI   360
ERTISKIKGL VRAPQVYTLP PPAEQLSRKD VSLTCLVVGF NPGDISVEWT SNGHTEENYK   420
DTAPVLDSDG SYFIYSKLNM KTSKWEKTDS FSCNVRHEGL KNYYLKKTIS RSPGK        475

SEQ ID NO: 44              moltype = AA  length = 239
FEATURE                    Location/Qualifiers
REGION                     1..239
                           note = Description of Artificial Sequence: Synthetic
                            polypeptide
source                     1..239
                           mol_type = protein
                           organism = synthetic construct
SEQUENCE: 44
MRCLAEFLGL LVLWIPGAIG DIVLTQTAPS VPVTPGESVS ISCRSSKSLL HSNGNTYLYW    60
FLQRPGQSPQ LLIYRMSNLA SGVPDRFSGS GSGTAFTLRI SRVEAEDVGV YYCMQHLEYP   120
FTFGSGTKLE IKRADAAPTV SIFPPSSEQL TSGGASVVCF LNNFYPRDIN VKWKIDGSER   180
QNGVLNSWTD QDSKDSTYSM SSTLTLTKDE YERHNSYTCE ATHKTSTSPI VKSFNRNEC    239

SEQ ID NO: 45              moltype = AA  length = 5
```

```
FEATURE                 Location/Qualifiers
REGION                  1..5
                        note = Description of Artificial Sequence: Synthetic peptide
source                  1..5
                        mol_type = protein
                        organism = synthetic construct
SEQUENCE: 45
DHIIH                                                                              5

SEQ ID NO: 46           moltype = AA  length = 17
FEATURE                 Location/Qualifiers
REGION                  1..17
                        note = Description of Artificial Sequence: Synthetic peptide
source                  1..17
                        mol_type = protein
                        organism = synthetic construct
SEQUENCE: 46
YIYPRDGYIK YNEKFKG                                                                17

SEQ ID NO: 47           moltype = AA  length = 8
FEATURE                 Location/Qualifiers
REGION                  1..8
                        note = Description of Artificial Sequence: Synthetic peptide
source                  1..8
                        mol_type = protein
                        organism = synthetic construct
SEQUENCE: 47
GYYYAMDY                                                                           8

SEQ ID NO: 48           moltype = AA  length = 16
FEATURE                 Location/Qualifiers
REGION                  1..16
                        note = Description of Artificial Sequence: Synthetic peptide
source                  1..16
                        mol_type = protein
                        organism = synthetic construct
SEQUENCE: 48
RSSQSIVHSI GNTYLE                                                                 16

SEQ ID NO: 49           moltype = AA  length = 9
FEATURE                 Location/Qualifiers
REGION                  1..9
                        note = Description of Artificial Sequence: Synthetic peptide
source                  1..9
                        mol_type = protein
                        organism = synthetic construct
SEQUENCE: 49
FQGSHVPFT                                                                          9

SEQ ID NO: 50           moltype = AA  length = 117
FEATURE                 Location/Qualifiers
REGION                  1..117
                        note = Description of Artificial Sequence: Synthetic
                         polypeptide
source                  1..117
                        mol_type = protein
                        organism = synthetic construct
SEQUENCE: 50
QVQLQQSDAE LVKPGASVKI SCKVSGYTFT DHIIHWMKQR PEQGLEWIGY IYPRDGYIKY                  60
NEKFKGKATL TADKSSSTAY MQVNSLTSED SAVYFCARGY YYAMDYWGQG TSVTVSS                    117

SEQ ID NO: 51           moltype = AA  length = 112
FEATURE                 Location/Qualifiers
REGION                  1..112
                        note = Description of Artificial Sequence: Synthetic
                         polypeptide
source                  1..112
                        mol_type = protein
                        organism = synthetic construct
SEQUENCE: 51
DVLMTQTPLS LPVSLGDQAS ISCRSSQSIV HSIGNTYLEW YLQKPGQSPK LLIYKVSNRF                  60
SGVPERFSGS GSGTDFTLKI SRVEAEDLGV YYCFQGSHVP FTFGSGTKLE IK                         112

SEQ ID NO: 52           moltype = AA  length = 460
FEATURE                 Location/Qualifiers
REGION                  1..460
                        note = Description of Artificial Sequence: Synthetic
                         polypeptide
source                  1..460
```

```
                        mol_type = protein
                        organism = synthetic construct
SEQUENCE: 52
MEWSWVSLFF LSVTTGVHSQ VQLQQSDAEL VKPGASVKIS CKVSGYTFTD HIIHWMKQRP        60
EQGLEWIGYI YPRDGYIKYN EKFKGKATLT ADKSSSTAYM QVNSLTSEDS AVYFCARGYY       120
YAMDYWGQGT SVTVSSAKTT PPSVYPLAPG SAAQTNSMVT LGCLVKGYFP EPVTVTWNSG       180
SLSSGVHTFP AVLQSDLYTL SSSVTVPSST WPSQTVTCNV AHPASSTKVD KKIVPRDCGC       240
KPCICTVPEV SSVFIFPPKP KDVLTITLTP KVTCVVVDIS KDDPEVQFSW FVDDVEVHTA       300
QTQPREEQFN STFRSVSELP IMHQDWLNGK EFKCRVNSAA FPAPIEKTIS KTKGRPKAPQ       360
VYTIPPPKEQ MAKDKVSLTC MITDFFPEDI TVEWQWNGQP AENYKNTQPI MDTDGSYFVY       420
SKLNVQKSNW EAGNTFTCSV LHEGLHNHHT EKSLSHSPGK                             460

SEQ ID NO: 53           moltype = AA  length = 238
FEATURE                 Location/Qualifiers
REGION                  1..238
                        note = Description of Artificial Sequence: Synthetic
                        polypeptide
source                  1..238
                        mol_type = protein
                        organism = synthetic construct
SEQUENCE: 53
MKLPVRLLVL MFWIPASRSD VLMTQTPLSL PVSLGDQASI SCRSSQSIVH SIGNTYLEWY        60
LQKPGQSPKL LIYKVSNRFS GVPERFSGSG SGTDFTLKIS RVEAEDLGVY YCFQGSHVPF       120
TFGSGTKLEI KRADAAPTVS IFPPSSEQLT SGGASVVCFL NNFYPKDINV KWKIDGSERQ       180
NGVLNSWTDQ DSKDSTYSMS STLTLTKDEY ERHNSYTCEA THKTSTSPIV KSFNRNEC        238

SEQ ID NO: 54           moltype = AA  length = 5
FEATURE                 Location/Qualifiers
REGION                  1..5
                        note = Description of Artificial Sequence: Synthetic peptide
source                  1..5
                        mol_type = protein
                        organism = synthetic construct
SEQUENCE: 54
SYWMH                                                                    5

SEQ ID NO: 55           moltype = AA  length = 17
FEATURE                 Location/Qualifiers
REGION                  1..17
                        note = Description of Artificial Sequence: Synthetic peptide
source                  1..17
                        mol_type = protein
                        organism = synthetic construct
SEQUENCE: 55
MIDPSDVYTN YNPKFKG                                                      17

SEQ ID NO: 56           moltype = AA  length = 6
FEATURE                 Location/Qualifiers
REGION                  1..6
                        note = Description of Artificial Sequence: Synthetic peptide
source                  1..6
                        mol_type = protein
                        organism = synthetic construct
SEQUENCE: 56
NYSGDY                                                                   6

SEQ ID NO: 57           moltype = AA  length = 115
FEATURE                 Location/Qualifiers
REGION                  1..115
                        note = Description of Artificial Sequence: Synthetic
                        polypeptide
source                  1..115
                        mol_type = protein
                        organism = synthetic construct
SEQUENCE: 57
QVQLLQPGAE LVRPGTSVKL SCKTSGYTFS SYWMHWVKQR PGQGLEWIGM IDPSDVYTNY        60
NPKFKGKATL TVDTSSSTAY MQLSSLTSED SAVYYCARNY SGDYWGQGTT LTVSS            115

SEQ ID NO: 58           moltype = AA  length = 112
FEATURE                 Location/Qualifiers
REGION                  1..112
                        note = Description of Artificial Sequence: Synthetic
                        polypeptide
source                  1..112
                        mol_type = protein
                        organism = synthetic construct
SEQUENCE: 58
DVLMTQIPLS LPVSLGDQAS ISCRSSQSIV HSNGNTYLEW YLQKPGQSPK LLIYKVSNRF        60
SGVPDRFSGS GSGTDFTLKI SRVEAEDLGV YYCFQGSYVP WTFGGGTKLE IK               112
```

```
SEQ ID NO: 59            moltype = AA   length = 458
FEATURE                  Location/Qualifiers
REGION                   1..458
                         note = Description of Artificial Sequence: Synthetic
                          polypeptide
source                   1..458
                         mol_type = protein
                         organism = synthetic construct
SEQUENCE: 59
MGWSCIIVLL VSTATCVHSQ VQLLQPGAEL VRPGTSVKLS CKTSGYTFSS YWMHWVKQRP    60
GQGLEWIGMI DPSDVYTNYN PKFKGKATLT VDTSSSTAYM QLSSLTSEDS AVYYCARNYS   120
GDYWGQGTTL TVSSAKTTPP SVYPLAPGSA AQTNSMVTLG CLVKGYFPEP VTVTWNSGSL   180
SSGVHTFPAV LQSDLYTLSS SVTVPSSTWP SQTVTCNVAH PASSTKVDKK IVPRDCGCKP   240
CICTVPEVSS VFIFPPKPKD VLTITLTPKV TCVVVDISKD DPEVQFSWFV DDVEVHTAQT   300
QPREEQFNST FRSVSELPIM HQDWLNGKEF KCRVNSAAFP APIEKTISKT KGRPKAPQVY   360
TIPPPKEQMA KDKVSLTCMI TDFFPEDITV EWQWNGQPAE NYKNTQPIMD TDGSYFVYSK   420
LNVQKSNWEA GNTFTCSVLH EGLHNHHTEK SLSHSPGK                          458

SEQ ID NO: 60            moltype = AA   length = 238
FEATURE                  Location/Qualifiers
REGION                   1..238
                         note = Description of Artificial Sequence: Synthetic
                          polypeptide
source                   1..238
                         mol_type = protein
                         organism = synthetic construct
SEQUENCE: 60
MKLPVRLLVL MFWIPASSSD VLMTQIPLSL PVSLGDQASI SCRSSQSIVH SNGNTYLEWY    60
LQKPGQSPKL LIYKVSNRFS GVPDRFSGSG SGTDFTLKIS RVEAEDLGVY YCFQGSYVPW   120
TFGGGTKLEI KRADAAPTVS IFPPSSEQLT SGGASVVCFL NNFYPRDINV KWKIDGSERQ   180
NGVLNSWTDQ DSKDSTYSMS STLTLTKDEY ERHNSYTCEA THKTSTSPIV KSFNRNEC    238

SEQ ID NO: 61            moltype = AA   length = 5
FEATURE                  Location/Qualifiers
REGION                   1..5
                         note = Description of Artificial Sequence: Synthetic peptide
source                   1..5
                         mol_type = protein
                         organism = synthetic construct
SEQUENCE: 61
TYGMS                                                                 5

SEQ ID NO: 62            moltype = AA   length = 17
FEATURE                  Location/Qualifiers
REGION                   1..17
                         note = Description of Artificial Sequence: Synthetic peptide
source                   1..17
                         mol_type = protein
                         organism = synthetic construct
SEQUENCE: 62
WINTYSGVPT YADDFKG                                                   17

SEQ ID NO: 63            moltype = AA   length = 12
FEATURE                  Location/Qualifiers
REGION                   1..12
                         note = Description of Artificial Sequence: Synthetic peptide
source                   1..12
                         mol_type = protein
                         organism = synthetic construct
SEQUENCE: 63
GRDGYQVAWF AY                                                        12

SEQ ID NO: 64            moltype = AA   length = 11
FEATURE                  Location/Qualifiers
REGION                   1..11
                         note = Description of Artificial Sequence: Synthetic peptide
source                   1..11
                         mol_type = protein
                         organism = synthetic construct
SEQUENCE: 64
ITSTDIDDDM N                                                         11

SEQ ID NO: 65            moltype = AA   length = 7
FEATURE                  Location/Qualifiers
REGION                   1..7
                         note = Description of Artificial Sequence: Synthetic peptide
source                   1..7
                         mol_type = protein
```

```
                                   organism = synthetic construct
SEQUENCE: 65
EGNTLRP                                                                          7

SEQ ID NO: 66           moltype = AA   length = 9
FEATURE                 Location/Qualifiers
REGION                  1..9
                        note = Description of Artificial Sequence: Synthetic peptide
source                  1..9
                        mol_type = protein
                        organism = synthetic construct
SEQUENCE: 66
LQSDNLPYT                                                                        9

SEQ ID NO: 67           moltype = AA   length = 121
FEATURE                 Location/Qualifiers
REGION                  1..121
                        note = Description of Artificial Sequence: Synthetic
                         polypeptide
source                  1..121
                        mol_type = protein
                        organism = synthetic construct
SEQUENCE: 67
QIQLVQSGPE LKKPGEAVKI SCKSSGYTFT TYGMSWVKQA PGRALKWMGW INTYSGVPTY               60
ADDFKGRFAF SLESSASTAY LQINNLKNED TATYFCARGR DGYQVAWFAY WGQGTLVTVS              120
A                                                                              121

SEQ ID NO: 68           moltype = AA   length = 107
FEATURE                 Location/Qualifiers
REGION                  1..107
                        note = Description of Artificial Sequence: Synthetic
                         polypeptide
source                  1..107
                        mol_type = protein
                        organism = synthetic construct
SEQUENCE: 68
ETTVTQSPAS LSMAIGDKVT IRCITSTDID DDMNWFQQKP GEPPKLLISE GNTLRPGVPS               60
RFSGSGYGTD FIFTIENMLS EDVADYYCLQ SDNLPYTFGG GTKLEIK                            107

SEQ ID NO: 69           moltype = AA   length = 464
FEATURE                 Location/Qualifiers
REGION                  1..464
                        note = Description of Artificial Sequence: Synthetic
                         polypeptide
source                  1..464
                        mol_type = protein
                        organism = synthetic construct
SEQUENCE: 69
MGWLWNLLFL MAAAQSAQAQ IQLVQSGPEL KKPGEAVKIS CKSSGYTFTT YGMSWVKQAP               60
GRALKWMGWI NTYSGVPTYA DDFKGRFAFS LESSASTAYL QINNLKNEDT ATYFCARGRD              120
GYQVAWFAYW GQGTLVTVSA AKTTPPSVYP LAPGSAAQTN SMVTLGCLVK GYFPEPVTVT              180
WNSGSLSSGV HTFPAVLQSD LYTLSSSVTV PSSTWPSQTV TCNVAHPASS TKVDKKIVPR              240
DCGCKPCICT VPEVSSVFIF PPKPKDVLTI TLTPKVTCVV VDISKDDPEV QFSWFVDDVE              300
VHTAQTQPRE EQFNSTFRSV SELPIMHQDW LNGKEFKCRV NSAAFPAPIE KTISKTKGRP              360
KAPQVYTIPP PKEQMAKDKV SLTCMITDFF PEDITVEWQW NGQPAENYKN TQPIMDTDGS              420
YFVYSKLNVQ KSNWEAGNTF TCSVLHEGLH NHHTEKSLSH SPGK                               464

SEQ ID NO: 70           moltype = AA   length = 234
FEATURE                 Location/Qualifiers
REGION                  1..234
                        note = Description of Artificial Sequence: Synthetic
                         polypeptide
source                  1..234
                        mol_type = protein
                        organism = synthetic construct
SEQUENCE: 70
MFSLALLLSL LLLCVSDSRA ETTVTQSPAS LSMAIGDKVT IRCITSTDID DDMNWFQQKP               60
GEPPKLLISE GNTLRPGVPS RFSGSGYGTD FIFTIENMLS EDVADYYCLQ SDNLPYTFGG              120
GTKLEIKRAD AAPTVSIFPP SSEQLTSGGA SVVCFLNNFY PRDINVKWKI DGSERQNGVL              180
NSWTDQDSKD STYSMSSTLT LTKDEYERHN SYTCEATHKT STSPIVKSFN RNEC                    234

SEQ ID NO: 71           moltype = AA   length = 5
FEATURE                 Location/Qualifiers
REGION                  1..5
                        note = Description of Artificial Sequence: Synthetic peptide
source                  1..5
                        mol_type = protein
                        organism = synthetic construct
SEQUENCE: 71
```

```
NYWMH                                                                               5

SEQ ID NO: 72           moltype = AA  length = 17
FEATURE                 Location/Qualifiers
REGION                  1..17
                        note = Description of Artificial Sequence: Synthetic peptide
source                  1..17
                        mol_type = protein
                        organism = synthetic construct
SEQUENCE: 72
MIDPSDSYTN YNPKFKG                                                                 17

SEQ ID NO: 73           moltype = AA  length = 115
FEATURE                 Location/Qualifiers
REGION                  1..115
                        note = Description of Artificial Sequence: Synthetic
                         polypeptide
source                  1..115
                        mol_type = protein
                        organism = synthetic construct
SEQUENCE: 73
QVQLQQPGAE LVRPGTSVKL SCKASGYTFT NYWMHWVKQR PGQGLEWIGM IDPSDSYTNY                   60
NPKFKGKATL TVDTSSSTAY MQLSSLTSED SAVYYCARNY SGDYWGQGTT LTVSS                       115

SEQ ID NO: 74           moltype = AA  length = 112
FEATURE                 Location/Qualifiers
REGION                  1..112
                        note = Description of Artificial Sequence: Synthetic
                         polypeptide
source                  1..112
                        mol_type = protein
                        organism = synthetic construct
SEQUENCE: 74
DVLMTQTPLS LPVSLGDQAS ISCRSSQSIV HSNGNTYLEW YLQKPGQSPK LLIYKVSNRF                   60
SGVPDRFSGS GSGTDFTLKI SRVEAEDLGV YYCFQGSYVP WTFGGGTKLE IK                         112

SEQ ID NO: 75           moltype = AA  length = 458
FEATURE                 Location/Qualifiers
REGION                  1..458
                        note = Description of Artificial Sequence: Synthetic
                         polypeptide
source                  1..458
                        mol_type = protein
                        organism = synthetic construct
SEQUENCE: 75
MGWSCIIVLL VSTATGVHSQ VQLQQPGAEL VRPGTSVKLS CKASGYTFTN YWMHWVKQRP                   60
GQGLEWIGMI DPSDSYTNYN PKFKGKATLT VDTSSSTAYM QLSSLTSEDS AVYYCARNYS                  120
GDYWGQGTTL TVSSAKTTPP SVYPLAPGSA AQTNSMVTLG CLVKGYFPEP VTVTWNSGSL                  180
SSGVHTFPAV LQSDLYTLSS SVTVPSSTWP SQTVTCNVAH PASSTKVDKK IVPRDCGCKP                  240
CICTVPEVSS VFIFPPKPKD VLTITLTPKV TCVVVDISKD DPEVQFSWFV DDVEVHTAQT                  300
QPREEQFNST FRSVSELPIM HQDWLNGKEF KCRVNSAAFP APIEKTISKT KGRPKAPQVY                  360
TIPPPKEQMA KDKVSLTCMI TDFFPEDITV EWQWNGQPAE NYKNTQPIMD TDGSYFVYSK                  420
LNVQKSNWEA GNTFTCSVLH EGLHNHHTEK SLSHSPGK                                         458

SEQ ID NO: 76           moltype = AA  length = 238
FEATURE                 Location/Qualifiers
REGION                  1..238
                        note = Description of Artificial Sequence: Synthetic
                         polypeptide
source                  1..238
                        mol_type = protein
                        organism = synthetic construct
SEQUENCE: 76
MKLPVRLLVL MFWIPASSSD VLMTQTPLSL PVSLGDQASI SCRSSQSIVH SNGNTYLEWY                   60
LQKPGQSPKL LIYKVSNRFS GVPDRFSGSG SGTDFTLKIS RVEAEDLGVY YCFQGSYVPW                  120
TFGGGTKLEI KRADAAPTVS IFPPSSEQLT SGGASVVCFL NNFYPRDINV KWKIDGSERQ                  180
NGVLNSWTDQ DSKDSTYSMS STLTLTKDEY ERHNSYTCEA THKTSTSPIV KSFNRNEC                   238

SEQ ID NO: 77           moltype = AA  length = 449
FEATURE                 Location/Qualifiers
REGION                  1..449
                        note = Antibody heavy chain
source                  1..449
                        mol_type = protein
                        organism = synthetic construct
SEQUENCE: 77
QVQLVESGGG LVKPGGSLRL SCAASGFTFS DYAMSWIRQA PGKGLEWVST ISDGGTYTYY                   60
PDSVKGRFTI SRDNAKNSLY LQMNSLRAED TAVYYCAREW GDYDGFDYWG QGTLVTVSSA                  120
STKGPSVFPL APSSKSTSGG TAALGCLVKD YFPEPVTVSW NSGALTSGVH TFPAVLQSSG                  180
```

```
LYSLSSVVTV PSSSLGTQTY ICNVNHKPSN TKVDKKVEPK SCDKTHTCPP CPAPELLGGP    240
SVFLFPPKPK DTLMISRTPE VTCVVVDVSH EDPEVKFNWY VDGVEVHNAK TKPREEQYNS    300
TYRVVSVLTV LHQDWLNGKE YKCKVSNKAL PAPIEKTISK AKGQPREPQV YTLPPSRDEL    360
TKNQVSLTCL VKGFYPSDIA VEWESNGQPE NNYKTTPPVL DSDGSFFLYS KLTVDKSRWQ    420
QGNVFSCSVM HEALHNHYTQ KSLSLSPGK                                      449

SEQ ID NO: 78           moltype = AA   length = 214
FEATURE                 Location/Qualifiers
REGION                  1..214
                        note = Antibody light chain
source                  1..214
                        mol_type = protein
                        organism = synthetic construct
SEQUENCE: 78
DIQMTQSPSS LSASVGDRVT ITCRASQEIS GYLSWYQQKP GKAPKRLIYA ASTLDSGVPS    60
RFSGSGSGTE FTLTISSLQP EDFATYYCLQ YDSYPYTFGQ GTKLEIKRTV AAPSVFIFPP    120
SDEQLKSGTA SVVCLLNNFY PREAKVQWKV DNALQSGNSQ ESVTEQDSKD STYSLSSTLT    180
LSKADYEKHK VYACEVTHQG LSSPVTKSFN RGEC                                214

SEQ ID NO: 79           moltype = AA   length = 119
FEATURE                 Location/Qualifiers
REGION                  1..119
                        note = Description of Artificial Sequence:
                         Syntheticpolypeptide
source                  1..119
                        mol_type = protein
                        organism = synthetic construct
SEQUENCE: 79
EVQLVESGGG LVQPGGSLRL SCAASGFTFS DYAMSWVRQA PGKGLEWVAT ISDGGTYTYY    60
PDNVKGRFTI SRDNAKNSLY LQMNSLRAED TAVYYCAREW GDYDGFDYWG QGTLVTVSS     119

SEQ ID NO: 80           moltype = AA   length = 119
FEATURE                 Location/Qualifiers
REGION                  1..119
                        note = Description of Artificial Sequence:
                         Syntheticpolypeptide
source                  1..119
                        mol_type = protein
                        organism = synthetic construct
SEQUENCE: 80
QVQLVESGGG LVKPGGSLRL SCAASGFTFS DYAMSWIRQA PGKGLEWVST ISDGGTYTYY    60
PDNVKGRFTI SRDNAKNSLY LQMNSLRAED TAVYYCAREW GDYDGFDYWG QGTLVTVSS     119

SEQ ID NO: 81           moltype = AA   length = 119
FEATURE                 Location/Qualifiers
REGION                  1..119
                        note = Description of Artificial Sequence:
                         Syntheticpolypeptide
source                  1..119
                        mol_type = protein
                        organism = synthetic construct
SEQUENCE: 81
QVQLVESGGG LVKPGGSLRL SCAASGFTFS DYAMSWIRQA PGKGLEWVST ISDGGTYTYY    60
PDSVKGRFTI SRDNAKNSLY LQMNSLRAED TAVYYCAREW GDYDGFDYWG QGTLVTVSS     119

SEQ ID NO: 82           moltype = AA   length = 119
FEATURE                 Location/Qualifiers
REGION                  1..119
                        note = Description of Artificial Sequence:
                         Syntheticpolypeptide
source                  1..119
                        mol_type = protein
                        organism = synthetic construct
SEQUENCE: 82
EVQLVESGGG LVKPGGSLRL SCAASGFTFS DYAMSWVRQA PGKGLEWVST ISDGGTYTYY    60
PDNVKGRFTI SRDNAKNSLY LQMNSLRAED TAVYYCAREW GDYDGFDYWG QGTLVTVSS     119

SEQ ID NO: 83           moltype = AA   length = 119
FEATURE                 Location/Qualifiers
REGION                  1..119
                        note = Description of Artificial Sequence:
                         Syntheticpolypeptide
source                  1..119
                        mol_type = protein
                        organism = synthetic construct
SEQUENCE: 83
EVQLLESGGG LVQPGGSLRL SCAASGFTFS DYAMSWVRQA PGKGLEWVST ISDGGTYTYY    60
PDNVKGRFTI SRDNSKNTLY LQMNSLRAED TAVYYCAREW GDYDGFDYWG QGTLVTVSS     119
```

```
SEQ ID NO: 84          moltype = AA   length = 119
FEATURE                Location/Qualifiers
REGION                 1..119
                       note = Description of Artificial Sequence:
                       Syntheticpolypeptide
source                 1..119
                       mol_type = protein
                       organism = synthetic construct
SEQUENCE: 84
QVQLVESGGG VVQPGRSLRL SCAASGFTFS DYAMSWVRQA PGKGLEWVAT ISDGGTYTYY    60
PDNVKGRFTI SRDNSKNTLY LQMSSLRAED TAVYYCAREW GDYDGFDYWG QGTLVTVSS    119

SEQ ID NO: 85          moltype = AA   length = 119
FEATURE                Location/Qualifiers
REGION                 1..119
                       note = Description of Artificial Sequence:
                       Syntheticpolypeptide
source                 1..119
                       mol_type = protein
                       organism = synthetic construct
SEQUENCE: 85
EVQLVESGGG LVKPGGSLRL SCAASGFTFS DYAMSWVRQA PGKGLEWVAT ISDGGTYTYY    60
PDNVKGRFTI SRDNAKNSLY LQMNSLRAED TAVYYCAREW GDYDGFDYWG QGTLVTVSS    119

SEQ ID NO: 86          moltype = AA   length = 107
FEATURE                Location/Qualifiers
REGION                 1..107
                       note = Description of Artificial Sequence:
                       Syntheticpolypeptide
source                 1..107
                       mol_type = protein
                       organism = synthetic construct
SEQUENCE: 86
DIQLTQSPSF LSASVGDRVT ITCRASQEIS GYLSWYQQKP GKAPKLLIYA ASTLDSGVPS    60
RFSGSGSGTE FTLTISSLQP EDFATYYCLQ YDSYPYTFGQ GTKLEIK                 107

SEQ ID NO: 87          moltype = AA   length = 107
FEATURE                Location/Qualifiers
REGION                 1..107
                       note = Description of Artificial Sequence:
                       Syntheticpolypeptide
source                 1..107
                       mol_type = protein
                       organism = synthetic construct
SEQUENCE: 87
DIQMTQSPSS LSASVGDRVT ITCRASQEIS GYLSWFQQKP GKAPKSLIYA ASTLDSGVPS    60
RFSGSGSGTD FTLTISSLQP EDFATYYCLQ YDSYPYTFGQ GTKLEIK                 107

SEQ ID NO: 88          moltype = AA   length = 107
FEATURE                Location/Qualifiers
REGION                 1..107
                       note = Description of Artificial Sequence:
                       Syntheticpolypeptide
source                 1..107
                       mol_type = protein
                       organism = synthetic construct
SEQUENCE: 88
DIQMTQSPSS LSASVGDRVT ITCRASQEIS GYLSWYQQKP GKAPKRLIYA ASTLDSGVPS    60
RFSGSGSGTE FTLTISSLQP EDFATYYCLQ YDSYPYTFGQ GTKLEIK                 107

SEQ ID NO: 89          moltype = AA   length = 107
FEATURE                Location/Qualifiers
REGION                 1..107
                       note = Description of Artificial Sequence:
                       Syntheticpolypeptide
source                 1..107
                       mol_type = protein
                       organism = synthetic construct
SEQUENCE: 89
DIQMTQSPSS LSASVGDRVT ITCRASQEIS GYLSWYQQKP GKAPKLLIYA ASTLDSGVPS    60
RFSGSGSGTD FTFTISSLQP EDIATYYCLQ YDSYPYTFGQ GTKLEIK                 107

SEQ ID NO: 90          moltype = AA   length = 107
FEATURE                Location/Qualifiers
REGION                 1..107
                       note = Description of Artificial Sequence:
                       Syntheticpolypeptide
source                 1..107
                       mol_type = protein
```

```
                                organism = synthetic construct
SEQUENCE: 90
DIQMTQSPSS LSASVGDRVT ITCRASQEIS GYLSWYQQKP GKAPKLLIYA ASTLDSGVPS   60
RFSGSGSGTD FTLTISSLQP EDFATYYCLQ YDSYPYTFGQ GTKLEIK                107

SEQ ID NO: 91                   moltype = AA  length = 107
FEATURE                         Location/Qualifiers
REGION                          1..107
                                note = Description of Artificial Sequence:
                                  Syntheticpolypeptide
source                          1..107
                                mol_type = protein
                                organism = synthetic construct
SEQUENCE: 91
DIQMTQSPSS LSASVGDRVT ITCRASQEIS GYLSWLQQKP GGAIKRLIYA ASTLDSGVPS   60
RFSGSGSGSD YTLTISSLQP EDFATYYCLQ YDSYPYTFGQ GTKLEIK                107

SEQ ID NO: 92                   moltype = AA  length = 468
FEATURE                         Location/Qualifiers
REGION                          1..468
                                note = Description of Artificial Sequence:
                                  Syntheticpolypeptide
source                          1..468
                                mol_type = protein
                                organism = synthetic construct
SEQUENCE: 92
MNFGLSLMFL VLVLKGVQCE VQLVESGGGL VKPGGSLKLS CAASGFTFSD YAMSWVRQTP   60
EKRLEWVATI SDGGTYTYYP DNVKGRFTIS RDNAKNNLYL QMSHLKSEDT AMYYCAREWG  120
DYDGFDYWGQ GTTLTVSSAS TKGPSVFPLA PSSKSTSGGT AALGCLVKDY FPEPVTVSWN  180
SGALTSGVHT FPAVLQSSGL YSLSSVVTVP SSSLGTQTYI CNVNHKPSNT KVDKRVEPKS  240
CDKTHTCPPC PAPELLGGPS VFLFPPKPKD TLMISRTPEV TCVVVDVSHE DPEVKFNWYV  300
DGVEVHNAKT KPREEQYNST YRVVSVLTVL HQDWLNGKEY KCKVSNKALP APIEKTISKA  360
KGQPREPQVY TLPPSREEMT KNQVSLTCLV KGFYPSDIAV EWESNGQPEN NYKTTPPVLD  420
SDGSFFLYSK LTVDKSRWQQ GNVFSCSVMH EALHNHYTQK SLSLSPGK              468

SEQ ID NO: 93                   moltype = AA  length = 236
FEATURE                         Location/Qualifiers
REGION                          1..236
                                note = Description of Artificial Sequence:
                                  Syntheticpolypeptide
source                          1..236
                                mol_type = protein
                                organism = synthetic construct
SEQUENCE: 93
MDMRVPAHVF GFLLLWFPGT RCDIQMTQSP SSLSASLGER VSLTCRASQE ISGYLSWLQQ   60
KPDGTIKRLI YAASTLDSGV PKRFSGSRSG SDYSLTIGSL ESEDLADYYC LQYDSYPYTF  120
GGGTKLEIKR TVAAPSVFIF PPSDEQLKSG TASVVCLLNN FYPREAKVQW KVDNALQSGN  180
SQESVTEQDS KDSTYSLSST LTLSKADYEK HKVYACEVTH QGLSSPVTKS FNRGEC      236

SEQ ID NO: 94                   moltype = AA  length = 471
FEATURE                         Location/Qualifiers
REGION                          1..471
                                note = Description of Artificial Sequence:
                                  Syntheticpolypeptide
source                          1..471
                                mol_type = protein
                                organism = synthetic construct
SEQUENCE: 94
MDMRVPAQLL GLLLLWLRGA RCQVQLVESG GGLVKPGGSL RLSCAASGFT FSDYAMSWIR   60
QAPGKGLEWV STISDGGTYT YYPDSVKGRF TISRDNAKNS LYLQMNSLRA EDTAVYYCAR  120
EWGDYDGFDY WGQGTLVTVS SASTKGPSVF PLAPSSKSTS GGTAALGCLV KDYFPEPVTV  180
SWNSGALTSG VHTFPAVLQS SGLYSLSSVV TVPSSSLGTQ TYICNVNHKP SNTKVDKRVE  240
PKSCDKTHTC PPCPAPELLG GPSVFLFPPK PKDTLMISRT PEVTCVVVDV SHEDPEVKFN  300
WYVDGVEVHN AKTKPREEQY NSTYRVVSVL TVLHQDWLNG KEYKCKVSNK ALPAPIEKTI  360
SKAKGQPREP QVYTLPPSRE EMTKNQVSLT CLVKGFYPSD IAVEWESNGQ PENNYKTTPP  420
VLDSDGSFFL YSKLTVDKSR WQQGNVFSCS VMHEALHNHY TQKSLSLSPG K           471

SEQ ID NO: 95                   moltype = AA  length = 467
FEATURE                         Location/Qualifiers
REGION                          1..467
                                note = Description of Artificial Sequence:
                                  Syntheticpolypeptide
source                          1..467
                                mol_type = protein
                                organism = synthetic construct
SEQUENCE: 95
MDMRVPAQLL GLLLLWLRGA RCQVQLVESG GGLVKPGGSL RLSCAASGFT FSDYAMSWIR   60
QAPGKGLEWV STISDGGTYT YYPDSVKGRF TISRDNAKNS LYLQMNSLRA EDTAVYYCAR  120
EWGDYDGFDY WGQGTLVTVS SASTKGPSVF PLAPCSRSTS ESTAALGCLV KDYFPEPVTV  180
```

```
SWNSGALTSG VHTFPAVLQS SGLYSLSSVV TVPSSNFGTQ TYTCNVDHKP SNTKVDKTVE   240
RKCCVECPPC PAPPVAGPSV FLFPPKPKDT LMISRTPEVT CVVVDVSHED PEVQFNWYVD   300
GVEVHNAKTK PREEQFNSTF RVVSVLTVVH QDWLNGKEYK CKVSNKGLPA PIEKTISKTK   360
GQPREPQVYT LPPSREEMTK NQVSLTCLVK GFYPSDIAVE WESNGQPENN YKTTPPMLDS   420
DGSFFLYSKL TVDKSRWQQG NVFSCSVMHE ALHNHYTQKS LSLSPGK                467

SEQ ID NO: 96            moltype = AA   length = 236
FEATURE                  Location/Qualifiers
REGION                   1..236
                         note = Description of Artificial Sequence:
                           Syntheticpolypeptide
source                   1..236
                         mol_type = protein
                         organism = synthetic construct
SEQUENCE: 96
MDMRVPAQLL GLLLLWLRGA RCDIQMTQSP SSLSASVGDR VTITCRASQE ISGYLSWFQQ    60
KPGKAPKSLI YAASTLDSGV PSRFSGSGSG TDFTLTISSL QPEDFATYYC LQYDSYPYTF   120
GQGTKLEIKR TVAAPSVFIF PPSDEQLKSG TASVVCLLNN FYPREAKVQW KVDNALQSGN   180
SQESVTEQDS KDSTYSLSST LTLSKADYEK HKVYACEVTH QGLSSPVTKS FNRGEC       236

SEQ ID NO: 97            moltype = AA   length = 236
FEATURE                  Location/Qualifiers
REGION                   1..236
                         note = Description of Artificial Sequence:
                           Syntheticpolypeptide
source                   1..236
                         mol_type = protein
                         organism = synthetic construct
SEQUENCE: 97
MDMRVPAQLL GLLLLWLRGA RCDIQMTQSP SSLSASVGDR VTITCRASQE ISGYLSWYQQ    60
KPGKAPKRLI YAASTLDSGV PSRFSGSGSG TEFTLTISSL QPEDFATYYC LQYDSYPYTF   120
GQGTKLEIKR TVAAPSVFIF PPSDEQLKSG TASVVCLLNN FYPREAKVQW KVDNALQSGN   180
SQESVTEQDS KDSTYSLSST LTLSKADYEK HKVYACEVTH QGLSSPVTKS FNRGEC       236

SEQ ID NO: 98            moltype = AA   length = 449
FEATURE                  Location/Qualifiers
REGION                   1..449
                         note = Antibody heavy chain no leader sequence
source                   1..449
                         mol_type = protein
                         organism = synthetic construct
SEQUENCE: 98
QVQLVESGGG LVKPGGSLRL SCAASGFTFS DYAMSWIRQA PGKGLEWVST ISDGGTYTYY    60
PDSVKGRFTI SRDNAKNSLY LQMNSLRAED TAVYYCAREW GDYDGFDYWG QGTLVTVSSA   120
STKGPSVFPL APSSKSTSGG TAALGCLVKD YFPEPVTVSW NSGALTSGVH TFPAVLQSSG   180
LYSLSSVVTV PSSSLGTQTY ICNVNHKPSN TKVDKRVEPK SCDKTHTCPP CPAPELLGGP   240
SVFLFPPKPK DTLMISRTPE VTCVVVDVSH EDPEVKFNWY VDGVEVHNAK TKPREEQYNS   300
TYRVVSVLTV LHQDWLNGKE YKCKVSNKAL PAPIEKTISK AKGQPREPQV YTLPPSREEM   360
TKNQVSLTCL VKGFYPSDIA VEWESNGQPE NNYKTTPPVL DSDGSFFLYS KLTVDKSRWQ   420
QGNVFSCSVM HEALHNHYTQ KSLSLSPGK                                    449

SEQ ID NO: 99            moltype = AA   length = 445
FEATURE                  Location/Qualifiers
REGION                   1..445
                         note = Antibody heavy chain no leader sequence
source                   1..445
                         mol_type = protein
                         organism = synthetic construct
SEQUENCE: 99
QVQLVESGGG LVKPGGSLRL SCAASGFTFS DYAMSWIRQA PGKGLEWVST ISDGGTYTYY    60
PDSVKGRFTI SRDNAKNSLY LQMNSLRAED TAVYYCAREW GDYDGFDYWG QGTLVTVSSA   120
STKGPSVFPL APCSRSTSES TAALGCLVKD YFPEPVTVSW NSGALTSGVH TFPAVLQSSG   180
LYSLSSVVTV PSSNFGTQTY TCNVDHKPSN TKVDKTVERK CCVECPPCPA PPVAGPSVFL   240
FPPKPKDTLM ISRTPEVTCV VVDVSHEDPE VQFNWYVDGV EVHNAKTKPR EEQFNSTFRV   300
VSVLTVVHQD WLNGKEYKCK VSNKGLPAPI EKTISKTKGQ PREPQVYTLP PSREEMTKNQ   360
VSLTCLVKGF YPSDIAVEWE SNGQPENNYK TTPPMLDSDG SFFLYSKLTV DKSRWQQGNV   420
FSCSVMHEAL HNHYTQKSLS LSPGK                                        445

SEQ ID NO: 100           moltype = AA   length = 214
FEATURE                  Location/Qualifiers
REGION                   1..214
                         note = Antibody light chain no leader sequence
source                   1..214
                         mol_type = protein
                         organism = synthetic construct
SEQUENCE: 100
DIQMTQSPSS LSASVGDRVT ITCRASQEIS GYLSWFQQKP GKAPKSLIYA ASTLDSGVPS    60
RFSGSGSGTD FTLTISSLQP EDFATYYCLQ YDSYPYTFGQ GTKLEIKRTV AAPSVFIFPP   120
SDEQLKSGTA SVVCLLNNFY PREAKVQWKV DNALQSGNSQ ESVTEQDSKD STYSLSSTLT   180
```

```
LSKADYEKHK VYACEVTHQG LSSPVTKSFN RGEC                               214

SEQ ID NO: 101          moltype = AA   length = 214
FEATURE                 Location/Qualifiers
REGION                  1..214
                        note = Antibody light chain no leader sequence
source                  1..214
                        mol_type = protein
                        organism = synthetic construct
SEQUENCE: 101
DIQMTQSPSS LSASVGDRVT ITCRASQEIS GYLSWYQQKP GKAPKRLIYA ASTLDSGVPS    60
RFSGSGSGTE FTLTISSLQP EDFATYYCLQ YDSYPYTFGQ GTKLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 102          moltype = AA   length = 450
FEATURE                 Location/Qualifiers
REGION                  1..450
                        note = Antibody heavy chain
source                  1..450
                        mol_type = protein
                        organism = synthetic construct
SEQUENCE: 102
EVQLVESGGG LVQPGGSLRL SCAASGFNIK DTYIHWVRQA PGKGLEWVAR IYPTNGYTRY    60
ADSVKGRFTI SADTSKNTAY LQMNSLRAED TAVYYCSRWG GDGFYAMDYW GQGTLVTVSS   120
ASTKGPSVFP LAPSSKSTSG GTAALGCLVK DYFPEPVTVS WNSGALTSGV HTFPAVLQSS   180
GLYSLSSVVT VPSSSLGTQT YICNVNHKPS NTKVDKKVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPSREE   360
MTKNQVSLTC LVKGFYPSDI AVEWESNGQP ENNYKTTPPV LDSDGSFFLY SKLTVDKSRW   420
QQGNVFSCSV MHEALHNHYT QKSLSLSPGK                                    450

SEQ ID NO: 103          moltype = AA   length = 214
FEATURE                 Location/Qualifiers
REGION                  1..214
                        note = Antibody light chain
source                  1..214
                        mol_type = protein
                        organism = synthetic construct
SEQUENCE: 103
DIQMTQSPSS LSASVGDRVT ITCRASQDVN TAVAWYQQKP GKAPKLLIYS ASFLYSGVPS    60
RFSGSRSGTD FTLTISSLQP EDFATYYCQQ HYTTPPTFGQ GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 104          moltype = AA   length = 448
FEATURE                 Location/Qualifiers
REGION                  1..448
                        note = Antibody heavy chain
source                  1..448
                        mol_type = protein
                        organism = synthetic construct
SEQUENCE: 104
EVQLVESGGG LVQPGGSLRL SCAASGFTFT DYTMDWVRQA PGKGLEWVAD VNPNSGGSIY    60
NQRFKGRFTL SVDRSKNTLY LQMNSLRAED TAVYYCARNL GPSFYFDYWG QGTLVTVSSA   120
STKGPSVFPL APSSKSTSGG TAALGCLVKD YFPEPVTVSW NSGALTSGVH TFPAVLQSSG   180
LYSLSSVVTV PSSSLGTQTY ICNVNHKPSN TKVDKKVEPK SCDKTHTCPP CPAPELLGGP   240
SVFLFPPKPK DTLMISRTPE VTCVVVDVSH EDPEVKFNWY VDGVEVHNAK TKPREEQYNS   300
TYRVVSVLTV LHQDWLNGKE YKCKVSNKAL PAPIEKTISK AKGQPREPQV YTLPPSREEM   360
TKNQVSLTCL VKGFYPSDIA VEWESNGQPE NNYKTTPPVL DSDGSFFLYS KLTVDKSRWQ   420
QGNVFSCSVM HEALHNHYTQ KSLSLSPG                                      448

SEQ ID NO: 105          moltype = AA   length = 214
FEATURE                 Location/Qualifiers
REGION                  1..214
                        note = Antibody light chain
source                  1..214
                        mol_type = protein
                        organism = synthetic construct
SEQUENCE: 105
DIQMTQSPSS LSASVGDRVT ITCKASQDVS IGVAWYQQKP GKAPKLLIYS ASYRYTGVPS    60
RFSGSGSGTD FTLTISSLQP EDFATYYCQQ YYIYPYTFGQ GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 106          moltype = AA   length = 447
FEATURE                 Location/Qualifiers
REGION                  1..447
                        note = Antibody heavy chain
```

| | | |
|---|---|---|
| source | 1..447<br>mol_type = protein<br>organism = synthetic construct | |
| SEQUENCE: 106 | | |
| QVQLQQWGAG LLKPSETLSL TCAVYGGSFS GYYWSWIRQP PGKGLEWIGE INHSGSTNYN | | 60 |
| PSLKSRVTIS VETSKNQFSL KLSSVTAADT AVYYCARDKW TWYFDLWGRG TLVTVSSAST | | 120 |
| KGPSVFPLAP SSKSTSGGTA ALGCLVKDYF PEPVTVSWNS GALTSGVHTF PAVLQSSGLY | | 180 |
| SLSSVVTVPS SSLGTQTYIC NVNHKPSNTK VDKRVEPKSC DKTHTCPPCP APELLGGPSV | | 240 |
| FLFPPKPKDT LMISRTPEVT CVVVDVSHED PEVKFNWYVD GVEVHNAKTK PREEQYNSTY | | 300 |
| RVVSVLTVLH QDWLNGKEYK CKVSNKALPA PIEKTISKAK GQPREPQVYT LPPSREEMTK | | 360 |
| NQVSLTCLVK GFYPSDIAVE WESNGQPENN YKTTPPVLDS DGSFFLYSKL TVDKSRWQQG | | 420 |
| NVFSCSVMHE ALHNHYTQKS LSLSPGK | | 447 |
| | | |
| SEQ ID NO: 107<br>FEATURE<br>REGION | moltype = AA  length = 220<br>Location/Qualifiers<br>1..220<br>note = Antibody light chain | |
| source | 1..220<br>mol_type = protein<br>organism = synthetic construct | |
| SEQUENCE: 107 | | |
| DIEMTQSPDS LAVSLGERAT INCRSSQSVL YSSSNRNYLA WYQQNPGQPP KLLIYWASTR | | 60 |
| ESGVPDRFSG SGSGTDFTLT ISSLQAEDVA VYYCQQYYST PRTFGQGTKV EIKRTVAAPS | | 120 |
| VFIFPPSDEQ LKSGTASVVC LLNNFYPREA KVQWKVDNAL QSGNSQESVT EQDSKDSTYS | | 180 |
| LSSTLTLSKA DYEKHKVYAC EVTHQGLSSP VTKSFNRGEC | | 220 |
| | | |
| SEQ ID NO: 108<br>FEATURE<br>REGION | moltype = AA  length = 445<br>Location/Qualifiers<br>1..445<br>note = Antibody heavy chain | |
| source | 1..445<br>mol_type = protein<br>organism = synthetic construct | |
| SEQUENCE: 108 | | |
| EVQLLESGGG LVQPGGSLRL SCAASGFTFS HYVMAWVRQA PGKGLEWVSS ISSSGGWTLY | | 60 |
| ADSVKGRFTI SRDNSKNTLY LQMNSLRAED TAVYYCTRGL KMATIFDYWG QGTLVTVSSA | | 120 |
| STKGPSVFPL APCSRSTSES TAALGCLVKD YFPEPVTVSW NSGALTSGVH TFPAVLQSSG | | 180 |
| LYSLSSVVTV PSSNFGTQTY TCNVDHKPSN TKVDKTVERK CCVECPPCPA PPVAGPSVFL | | 240 |
| FPPKPKDTLM ISRTPEVTCV VVDVSHEDPE VQFNWYVDGV EVHNAKTKPR EEQFNSTFRV | | 300 |
| VSVLTVVHQD WLNGKEYKCK VSNKGLPAPI EKTISKTKGQ PREPQVYTLP PSREEMTKNQ | | 360 |
| VSLTCLVKGF YPSDIAVEWE SNGQPENNYK TTPPMLDSDG SFFLYSKLTV DKSRWQQGNV | | 420 |
| FSCSVMHEAL HNHYTQKSLS LSPGK | | 445 |
| | | |
| SEQ ID NO: 109<br>FEATURE<br>REGION | moltype = AA  length = 217<br>Location/Qualifiers<br>1..217<br>note = Antibody light chain | |
| source | 1..217<br>mol_type = protein<br>organism = synthetic construct | |
| SEQUENCE: 109 | | |
| QSALTQPASV SGSPGQSITI SCTGTSSDVG SYNVVSWYQQ HPGKAPKLII YEVSQRPSGV | | 60 |
| SNRFSGSKSG NTASLTISGL QTEDEADYYC CSYAGSSIFV IFGGGTKVTV LGQPKAAPSV | | 120 |
| TLFPPSSEEL QANKATLVCL VSDFYPGAVT VAWKADGSPV KVGVETTKPS KQSNNKYAAS | | 180 |
| SYLSLTPEQW KSHRSYSCRV THEGSTVEKT VAPAECS | | 217 |
| | | |
| SEQ ID NO: 110<br>FEATURE<br>REGION | moltype = AA  length = 449<br>Location/Qualifiers<br>1..449<br>note = Antibody heavy chain | |
| source | 1..449<br>mol_type = protein<br>organism = synthetic construct | |
| SEQUENCE: 110 | | |
| QVQLVQSGAE VKKPGASVKV SCKASGYTFR SSYISWVRQA PGQGLEWMGW IYAGTGSPSY | | 60 |
| NQKLQGRVTM TTDTSTSTAY MELRSLRSDD TAVYYCARHR DYYSNSLTYW GQGTLVTVSS | | 120 |
| ASTKGPSVFP LAPSSKSTSG GTAALGCLVK DYFPEPVTVS WNSGALTSGV HTFPAVLQSS | | 180 |
| GLYSLSSVVT VPSSSLGTQT YICNVNHKPS NTKVDKKVEP KSCDKTHTCP PCPAPELLGG | | 240 |
| PSVFLFPPKP KDTLMISRTP EVTCVVVDVS HEDPEVKFNW YVDGVEVHNA KTKPREEQYN | | 300 |
| STYRVVSVLT VLHQDWLNGK EYKCKVSNKA LPAPIEKTIS KAKGQPREPQ VYTLPPSRDE | | 360 |
| LTKNQVSLTC LVKGFYPSDI AVEWESNGQP ENNYKTTPPV LDSDGSFFLY SKLTVDKSRW | | 420 |
| QQGNVFSCSV MHEALHNHYT QKSLSLSPG | | 449 |
| | | |
| SEQ ID NO: 111<br>FEATURE<br>REGION | moltype = AA  length = 220<br>Location/Qualifiers<br>1..220<br>note = Antibody light chain | |
| source | 1..220<br>mol_type = protein | |

```
                        organism = synthetic construct
SEQUENCE: 111
DIVMTQSPDS LAVSLGERAT INCKSSQSVL NSGNQKNYLT WYQQKPGQPP KLLIYWASTR    60
ESGVPDRFSG SGSGTDFTLT ISSLQAEDVA VYYCQSDYSY PYTFGQGTKL EIKRTVAAPS   120
VPIFPPPSDEQ LKSGTASVVC LLNNFYPREA KVQWKVDNAL QSGNSQESVT EQDSKDSTYS  180
LSSTLTLSKA DYEKHKVYAC EVTHQGLSSP VTKSFNRGEC                         220

SEQ ID NO: 112          moltype = AA  length = 446
FEATURE                 Location/Qualifiers
REGION                  1..446
                        note = Antibody heavy chain
source                  1..446
                        mol_type = protein
                        organism = synthetic construct
SEQUENCE: 112
EVQLLESGGG LVQPGGSLRL SCAASGFTFS SYAMSWVRQA PGKGLEWVSA INSQGKSTYY    60
ADSVKGRFTI SRDNSKNTLY LQMNSLRAED TAVYYCARWG DEGFDIWGQG TLVTVSSAST   120
KGPSVFPLAP SSKSTSGGTA ALGCLVKDYF PEPVTVSWNS GALTSGVHTF PAVLQSSGLY   180
SLSSVVTVPS SSLGTQTYIC NVNHKPSNTK VDKRVEPKSC DKTHTCPPCP APELLGGPSV   240
FLFPPKPKDT LMISRTPEVT CVVVDVSHED PEVKFNWYVD GVEVHNAKTK PREEQYNSTY   300
RVVSVLTVLH QDWLNGKEYK CKVSNKALPA PIEKTISKAK GQPREPQVYT LPPSREEMTK   360
NQVSLTCLVK GFYPSDIAVE WESNGQPENN YKTTPPVLDS DGSFFLYSKL TVDKSRWQQG   420
NVFSCSVMHE ALHNHYTQKS LSLSPG                                       446

SEQ ID NO: 113          moltype = AA  length = 214
FEATURE                 Location/Qualifiers
REGION                  1..214
                        note = Antibody light chain
source                  1..214
                        mol_type = protein
                        organism = synthetic construct
SEQUENCE: 113
DIQMTQSPSS LSASVGDRVT ITCRASQGIS NWLAWYQQKP GKAPKLLIYG ASSLQSGVPS    60
RFSGSGSGTD FTLTISSLQP EDFATYYCQQ YSSFPTTFGQ GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                              214

SEQ ID NO: 114          moltype = AA  length = 238
FEATURE                 Location/Qualifiers
REGION                  1..238
                        note = lintuzumab light chain
source                  1..238
                        mol_type = protein
                        organism = synthetic construct
SEQUENCE: 114
MEKDTLLLWV LLLWVPGSTG DIQMTQSPSS LSASVGDRVT ITCRASESVD NYGISFMNWF    60
QQKPGKAPKL LIYAASNQGS GVPSRFSGSG SGTDFTLTIS SLQPDDFATY YCQQSKEVPW   120
TFGQGTKVEI KRTVAAPSVF IFPPSDEQLK SGTASVVCLL NNFYPREAKV QWKVDNALQS   180
GNSQESVTEQ DSKDSTYSLS STLTLSKADY EKHKVYACEV THQGLSSPVT KSFNRGEC     238

SEQ ID NO: 115          moltype = AA  length = 465
FEATURE                 Location/Qualifiers
REGION                  1..465
                        note = lintuzumab heavy chain
source                  1..465
                        mol_type = protein
                        organism = synthetic construct
SEQUENCE: 115
MGWSWIFLFL LSGTAGVHSQ VQLVQSGAEV KKPGSSVKVS CKASGYTFTD YNMHWVRQAP    60
GQGLEWIGYI YPYNGGTGYN QKFKSKATIT ADESTNTAYM ELSSLRSEDT AVYYCARGRP   120
AMDYWGQGTL VTVSSASTKG PSVFPLAPSS KSTSGGTAAL GCLVKDYFPE PVTVSWNSGA   180
LTSGVHTFPA VLQSSGLYSL SSVVTVPSSS LGTQTYICNV NHKPSNTKVD KKVEPKSCDK   240
THTCPPCPAP ELLGGPSVFL FPPKPKDTLM ISRTPEVTCV VVDVSHEDPE VKFNWYVDGV   300
EVHNAKTKPR EEQYNSTYRV VSVLTVLHQD WLNGKEYKCK VSNKALPAPI EKTISKAKGQ   360
PREPQVYTLP PSRDELTKNQ VSLTCLVKGF YPSDIAVEWE SNGQPENNYK TTPPVLDSDG   420
SFFLYSKLTV DKSRWQQGNV FSCSVMHEAL HNHYTQKSLS LSPGK                  465

SEQ ID NO: 116          moltype = AA  length = 450
FEATURE                 Location/Qualifiers
REGION                  1..450
                        note = Antibody heavy chain
source                  1..450
                        mol_type = protein
                        organism = synthetic construct
SEQUENCE: 116
EVQLVESGGG LVQPGGSLRL SCAASGFNIK DTYIHWVRQA PGKGLEWVAR IYPTNGYTRY    60
ADSVKGRFTI SADTSKNTAY LQMNSLRAED TAVYYCSRWG GDGFYAMDYW GQGTLVTVSS   120
ASTKGPSVFP LAPSSKSTSG GTAALGCLVK DYFPEPVTVS WNSGALTSGV HTFPAVLQSS   180
GLYSLSSVVT VPSSSLGTQT YICNVNHKPS NTKVDKKVEP KSCDKTHTCP PCPAPELLGG   240
```

```
PSVFLFPPKP KDTLMISRTP EVTCVVVDVS HEDPEVKFNW YVDGVEVHNA KTKPREEQYN  300
STYRVVSVLT VLHQDWLNGK EYKCKVSNKA LPAPIEKTIS KAKGQPREPQ VYTLPPSREE  360
MTKNQVSLTC LVKGFYPSDI AVEWESNGQP ENNYKTTPPV LDSDGSFFLY SKLTVDKSRW  420
QQGNVFSCSV MHEALHNHYT QKSLSLSPGK                                  450

SEQ ID NO: 117          moltype = AA   length = 214
FEATURE                 Location/Qualifiers
REGION                  1..214
                        note = Antibody light chain
source                  1..214
                        mol_type = protein
                        organism = synthetic construct
SEQUENCE: 117
DIQMTQSPSS LSASVGDRVT ITCRASQDVN TAVAWYQQKP GKAPKLLIYS ASFLYSGVPS  60
RFSGSRSGTD FTLTISSLQP EDFATYYCQQ HYTTPPTFGQ GTKVEIKRTV AAPSVFIFPP  120
SDEQLKSGTA SVVCLLNNFY PREAKVQWKV DNALQSGNSQ ESVTEQDSKD STYSLSSTLT  180
LSKADYEKHK VYACEVTHQG LSSPVTKSFN RGEC                             214

SEQ ID NO: 118          moltype = AA   length = 448
FEATURE                 Location/Qualifiers
REGION                  1..448
                        note = Antibody heavy chain
source                  1..448
                        mol_type = protein
                        organism = synthetic construct
SEQUENCE: 118
EVQLVESGGG LVQPGGSLRL SCAASGFTFT DYTMDWVRQA PGKGLEWVAD VNPNSGGSIY  60
NQRFKGRFTL SVDRSKNTLY LQMNSLRAED TAVYYCARNL GPSFYFDYWG QGTLVTVSSA  120
STKGPSVFPL APSSKSTSGG TAALGCLVKD YFPEPVTVSW NSGALTSGVH TFPAVLQSSG  180
LYSLSSVVTV PSSSLGTQTY ICNVNHKPSN TKVDKKVEPK SCDKTHTCPP CPAPELLGGP  240
SVFLFPPKPK DTLMISRTPE VTCVVVDVSH EDPEVKFNWY VDGVEVHNAK TKPREEQYNS  300
TYRVVSVLTV LHQDWLNGKE YKCKVSNKAL PAPIEKTISK AKGQPREPQV YTLPPSREEM  360
TKNQVSLTCL VKGFYPSDIA VEWESNGQPE NNYKTTPPVL DSDGSFFLYS KLTVDKSRWQ  420
QGNVFSCSVM HEALHNHYTQ KSLSLSPG                                    448

SEQ ID NO: 119          moltype = AA   length = 214
FEATURE                 Location/Qualifiers
REGION                  1..214
                        note = Antibody light chain
source                  1..214
                        mol_type = protein
                        organism = synthetic construct
SEQUENCE: 119
DIQMTQSPSS LSASVGDRVT ITCKASQDVS IGVAWYQQKP GKAPKLLIYS ASYRYTGVPS  60
RFSGSGSGTD FTLTISSLQP EDFATYYCQQ YYIYPYTFGQ GTKVEIKRTV AAPSVFIFPP  120
SDEQLKSGTA SVVCLLNNFY PREAKVQWKV DNALQSGNSQ ESVTEQDSKD STYSLSSTLT  180
LSKADYEKHK VYACEVTHQG LSSPVTKSFN RGEC                             214

SEQ ID NO: 120          moltype = AA   length = 451
FEATURE                 Location/Qualifiers
REGION                  1..451
                        note = mAb
source                  1..451
                        mol_type = protein
                        organism = synthetic construct
SEQUENCE: 120
QVQLQQSGSE LKKPGASVKV SCKASGYTFT NYGMNWVKQA PGQGLKWMGW INTYTGEPTY  60
TDDFKGRFAF SLDTSVSTAY LQISSLKADD TAVYFCARGG FGSSYWYFDV WGQGSLVTVS  120
SASTKGPSVF PLAPSSKSTS GGTAALGCLV KDYFPEPVTV SWNSGALTSG VHTFPAVLQS  180
SGLYSLSSVV TVPSSSLGTQ TYICNVNHKP SNTKVDKRVE PKSCDKTHTC PPCPAPELLG  240
GPSVFLFPPK PKDTLMISRT PEVTCVVVDV SHEDPEVKFN WYVDGVEVHN AKTKPREEQY  300
NSTYRVVSVL TVLHQDWLNG KEYKCKVSNK ALPAPIEKTI SKAKGQPREP QVYTLPPSRE  360
EMTKNQVSLT CLVKGFYPSD IAVEWESNGQ PENNYKTTPP VLDSDGSFFL YSKLTVDKSR  420
WQQGNVFSCS VMHEALHNHY TQKSLSLSPG K                                451

SEQ ID NO: 121          moltype = AA   length = 121
FEATURE                 Location/Qualifiers
REGION                  1..121
                        note = mAb
source                  1..121
                        mol_type = protein
                        organism = synthetic construct
SEQUENCE: 121
QVQLQQSGSE LKKPGASVKV SCKASGYTFT NYGMNWVKQA PGQGLKWMGW INTYTGEPTY  60
TDDFKGRFAF SLDTSVSTAY LQISSLKADD TAVYFCARGG FGSSYWYFDV WGQGSLVTVS  120
S                                                                 121

SEQ ID NO: 122          moltype = AA   length = 5
FEATURE                 Location/Qualifiers
```

```
REGION                      1..5
                            note = mAb
source                      1..5
                            mol_type = protein
                            organism = synthetic construct
SEQUENCE: 122
NYGMN                                                                        5

SEQ ID NO: 123              moltype = AA   length = 17
FEATURE                     Location/Qualifiers
REGION                      1..17
                            note = mAb
source                      1..17
                            mol_type = protein
                            organism = synthetic construct
SEQUENCE: 123
WINTYTGEPT YTDDFKG                                                          17

SEQ ID NO: 124              moltype = AA   length = 12
FEATURE                     Location/Qualifiers
REGION                      1..12
                            note = mAb
source                      1..12
                            mol_type = protein
                            organism = synthetic construct
SEQUENCE: 124
GGFGSSYWYF DV                                                               12

SEQ ID NO: 125              moltype = AA   length = 214
FEATURE                     Location/Qualifiers
REGION                      1..214
                            note = mAb
source                      1..214
                            mol_type = protein
                            organism = synthetic construct
SEQUENCE: 125
DIQLTQSPSS LSASVGDRVS ITCKASQDVS IAVAWYQQKP GKAPKLLIYS ASYRYTGVPD          60
RFSGSGSGTD FTLTISSLQP EDFAVYYCQQ HYITPLTFGA GTKVEIKRTV AAPSVFIFPP         120
SDEQLKSGTA SVVCLLNNFY PREAKVQWKV DNALQSGNSQ ESVTEQDSKD STYSLSSTLT         180
LSKADYEKHK VYACEVTHQG LSSPVTKSFN RGEC                                     214

SEQ ID NO: 126              moltype = AA   length = 110
FEATURE                     Location/Qualifiers
REGION                      1..110
                            note = mAb
source                      1..110
                            mol_type = protein
                            organism = synthetic construct
SEQUENCE: 126
DIQLTQSPSS LSASVGDRVS ITCKASQDVS IAVAWYQQKP GKAPKLLIYS ASYRYTGVPD          60
RFSGSGSGTD FTLTISSLQP EDFAVYYCQQ HYITPLTFGA GTKVEIKRTV                    110

SEQ ID NO: 127              moltype = AA   length = 11
FEATURE                     Location/Qualifiers
REGION                      1..11
                            note = mAb
source                      1..11
                            mol_type = protein
                            organism = synthetic construct
SEQUENCE: 127
KASQDVSIAV A                                                                11

SEQ ID NO: 128              moltype = AA   length = 7
FEATURE                     Location/Qualifiers
REGION                      1..7
                            note = mAb
source                      1..7
                            mol_type = protein
                            organism = synthetic construct
SEQUENCE: 128
SASYRYT                                                                      7

SEQ ID NO: 129              moltype = AA   length = 9
FEATURE                     Location/Qualifiers
REGION                      1..9
                            note = mAb
source                      1..9
                            mol_type = protein
                            organism = synthetic construct
```

```
SEQUENCE: 129
QQHYITPLT                                                                        9

SEQ ID NO: 130           moltype = AA  length = 451
FEATURE                  Location/Qualifiers
REGION                   1..451
                         note = mAb
source                   1..451
                         mol_type = protein
                         organism = synthetic construct
SEQUENCE: 130
QVQLVQSGAE VKKPGASVKV SCKASGYTFT TAGMQWVRQA PGQGLEWMGW INTHSGVPKY    60
AEDFKGRVTI SADTSTSTAY LQLSSLKSED TAVYYCARSG FGSSYWYFDV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKRVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 131           moltype = AA  length = 121
FEATURE                  Location/Qualifiers
REGION                   1..121
                         note = mAb
source                   1..121
                         mol_type = protein
                         organism = synthetic construct
SEQUENCE: 131
QVQLVQSGAE VKKPGASVKV SCKASGYTFT TAGMQWVRQA PGQGLEWMGW INTHSGVPKY    60
AEDFKGRVTI SADTSTSTAY LQLSSLKSED TAVYYCARSG FGSSYWYFDV WGQGTLVTVS   120
S                                                                   121

SEQ ID NO: 132           moltype = AA  length = 5
FEATURE                  Location/Qualifiers
REGION                   1..5
                         note = mAb
source                   1..5
                         mol_type = protein
                         organism = synthetic construct
SEQUENCE: 132
TAGMQ                                                                5

SEQ ID NO: 133           moltype = AA  length = 17
FEATURE                  Location/Qualifiers
REGION                   1..17
                         note = mAb
source                   1..17
                         mol_type = protein
                         organism = synthetic construct
SEQUENCE: 133
WINTHSGVPK YAEDFKG                                                  17

SEQ ID NO: 134           moltype = AA  length = 12
FEATURE                  Location/Qualifiers
REGION                   1..12
                         note = mAb
source                   1..12
                         mol_type = protein
                         organism = synthetic construct
SEQUENCE: 134
SGFGSSYWYF DV                                                       12

SEQ ID NO: 135           moltype = AA  length = 214
FEATURE                  Location/Qualifiers
REGION                   1..214
                         note = mAb
source                   1..214
                         mol_type = protein
                         organism = synthetic construct
SEQUENCE: 135
DIQMTQSPSS LSASVGDRVT ITCKASQDVS TAVAWYQQKP GKAPKLLIYS ASYRYTGVPS    60
RFSGSGSGTD FTLTISSLQP EDFAVYYCQQ HYITPLTFGQ GTKLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 136           moltype = AA  length = 110
FEATURE                  Location/Qualifiers
REGION                   1..110
                         note = mAb
```

```
                           -continued source                  1..110
                        mol_type = protein
                        organism = synthetic construct
SEQUENCE: 136
DIQMTQSPSS LSASVGDRVT ITCKASQDVS TAVAWYQQKP GKAPKLLIYS ASYRYTGVPS    60
RFSGSGSGTD FTLTISSLQP EDFAVYYCQQ HYITPLTFGQ GTKLEIKRTV              110

SEQ ID NO: 137          moltype = AA   length = 11
FEATURE                 Location/Qualifiers
REGION                  1..11
                        note = mAb
source                  1..11
                        mol_type = protein
                        organism = synthetic construct
SEQUENCE: 137
KASQDVSTAV A                                                         11

SEQ ID NO: 138          moltype = AA   length = 7
FEATURE                 Location/Qualifiers
REGION                  1..7
                        note = mAb
source                  1..7
                        mol_type = protein
                        organism = synthetic construct
SEQUENCE: 138
SASYRYT                                                              7

SEQ ID NO: 139          moltype = AA   length = 9
FEATURE                 Location/Qualifiers
REGION                  1..9
                        note = mAb
source                  1..9
                        mol_type = protein
                        organism = synthetic construct
SEQUENCE: 139
QQHYITPLT                                                            9

SEQ ID NO: 140          moltype = AA   length = 382
FEATURE                 Location/Qualifiers
REGION                  1..382
                        note = fusion protein
source                  1..382
                        mol_type = protein
                        organism = synthetic construct
SEQUENCE: 140
EPKSQDKTHT CPPCPAPELL GGPSVFLFPP KPKDTLMISR TPEVTCVVVD VSHEDPEVKF    60
NWYVDGVEVH NAKTKPREEQ YNSTYRVVSV LTVLHQDWLN GKEYKCKVSN KALPAPIEKT   120
ISKAKGQPRE PQVYTLPPSR DELTKNQVSL TCLVKGFYPS DIAVEWESNG QPENNYKTTP   180
PVLDSDGSFF LYSKLTVDKS RWQQGNVFSC SVMHEALHNH YTQKSLSLSP GGGGSGGGG    240
SAVFLNSLFN QEVQIPLTES YCGPCPKNWI CYKNNCYQFF DESKNWYESQ ASCMSQNASL   300
LKVYSKEDQD LLKLVKSYHW MGLVHIPTNG SWQWEDGSIL SPNLLTIIEM QKGDCALYAS   360
SFKGYIENCS TPNTYICMQR TV                                            382

SEQ ID NO: 141          moltype = AA   length = 345
FEATURE                 Location/Qualifiers
REGION                  1..345
                        note = Fusion protein
source                  1..345
                        mol_type = protein
                        organism = synthetic construct
SEQUENCE: 141
EEELQVIQPD KSVSVAAGES AILHCTVTSL IPVGPIQWFR GAGPARELIY NQKEGHFPRV    60
TTVSESTKRE NMDFSISISN ITPADAGTYY CVKFRKGSPD TEFKSGAGTE LSVRAKPSDK   120
THTCPPCPAP ELLGGPSVFL FPPKPKDTLM ISRTPEVTCV VVDVSHEDPE VKFNWYVDGV   180
EVHNAKTKPR EEQYNSTYRV VSVLTVLHQD WLNGKEYKCK VSNKALPAPI EKTISKAKGQ   240
PREPQVYTLP PSRDELTKNQ VSLTCLVKGF YPSDIAVEWE SNGQPENNYK TTPPVLDSDG   300
SFFLYSKLTV DKSRWQQGNV FSCSVMHEAL HNHYTQKSLS LSPGK                   345

SEQ ID NO: 142          moltype = AA   length = 345
FEATURE                 Location/Qualifiers
REGION                  1..345
                        note = Fusion protein
source                  1..345
                        mol_type = protein
                        organism = synthetic construct
SEQUENCE: 142
EEELQVIQPD KSVSVAAGES AILHCTVTSL IPVGPIQWFR GAGPARELIY NQKEGHFPRV    60
TTVSESTKRE NMDFSISISN ITPADAGTYY CVKFRKGSPD TEFKSGAGTE LSVRAKPSDK   120
THTCPPCPAP ELLGGPSVFL FPPKPKDTLM ISRTPEVTCV VVDVSHEDPE VKFNWYVDGV   180
```

```
EVHNAKTKPR EEQYNSTYRV VSVLTVLHQD WLNGKEYKCK VSNKALPAPI EKTISKAKGQ    240
PREPQVYTLP PSRDELTKNQ VSLTCLVKGF YPSDIAVEWE SNGQPENNYK TTPPVLDSDG    300
SFFLYSKLTV DKSRWQQGNV FSCSVMHEAL HNHYTQKSLS LSPGK                   345

SEQ ID NO: 143         moltype = AA  length = 347
FEATURE                Location/Qualifiers
REGION                 1..347
                       note = Fusion protein
source                 1..347
                       mol_type = protein
                       organism = synthetic construct
SEQUENCE: 143
EEELQVIQPD KSVSVAAGES AILHCTVTSL IPVGPIQWFR GAGPARELIY NQKEGHFPRV    60
TTVSESTKRE NMDFSISISN ITPADAGTYY CVKFRKGSPD TEFKSGAGTE LSVRAKPSES    120
KYGPPCPPCP APEFLGGPSV FLFPPKPKDT LMISRTPEVT CVVVDVSQED PEVQFNWYVD    180
GVEVHNAKTK PREEQFNSTY RVVSVLTVLH QDWLNGKEYK CKVSNKGLPS SIEKTISKAK    240
GQPREPQVYT LPPSQEEMTK NQVSLTCLVK GFYPSDIAVE WESNGQPENN YKTTPPVLDS    300
DGSFFLYSRL TVDKSRWQEG NVFSCSVMHE ALHNHYTQKS LSLSLGK                 347

SEQ ID NO: 144         moltype = DNA  length = 25
FEATURE                Location/Qualifiers
misc_feature           1..25
                       note = Morpholino
source                 1..25
                       mol_type = other DNA
                       organism = synthetic construct
SEQUENCE: 144
cgtcacaggc aggacccact gccca                                         25

SEQ ID NO: 145         moltype = AA  length = 444
FEATURE                Location/Qualifiers
REGION                 1..444
                       note = Anti-huCD47 antibody heavy chain
source                 1..444
                       mol_type = protein
                       organism = synthetic construct
SEQUENCE: 145
QVQLVQSGAE VKKPGASVKV SCKASGYTFT NYNMHWVRQA PGQRLEWMGT IYPGNDDTSY    60
NQKFKDRVTI TADTSASTAY MELSSLRSED TAVYYCARGG YRAMDYWGQG TLVTVSSAST    120
KGPSVFPLAP CSRSTSESTA ALGCLVKDYF PEPVTVSWNS GALTSGVHTF PAVLQSSGLY    180
SLSSVVTVPS SSLGTKTYTC NVDHKPSNTK VDKRVESKYG PPCPPCPAPE FLGGPSVFLF    240
PPKPKDTLMI SRTPEVTCVV VDVSQEDPEV QFNWYVDGVE VHNAKTKPRE EQFNSTYRVV    300
SVLTVLHQDW LNGKEYKCKV SNKGLPSSIE KTISKAKGQP REPQVYTLPP SQEEMTKNQV    360
SLTCLVKGFY PSDIAVEWES NGQPENNYKT TPPVLDSDGS FFLYSRLTVD KSRWQEGNVF    420
SCSVMHEALH NHYTQKSLSL SLGK                                          444

SEQ ID NO: 146         moltype = AA  length = 219
FEATURE                Location/Qualifiers
REGION                 1..219
                       note = Anti-huCD47 antibody light chain
source                 1..219
                       mol_type = protein
                       organism = synthetic construct
SEQUENCE: 146
DIVMTQSPLS LPVTPGEPAS ISCRSSQSIV YSNGNTYLGW YLQKPGQSPQ LLIYKVSNRF    60
SGVPDRFSGS GSGTDFTLKI SRVEAEDVGV YYCFQGSHVP YTFGQGTKLE IKRTVAAPSV    120
FIFPPSDEQL KSGTASVVCL LNNFYPREAK VQWKVDNALQ SGNSQESVTE QDSKDSTYSL    180
SSTLTLSKAD YEKHKVYACE VTHQGLSSPV TKSFNRGEC                          219
```

RADIOCONJUGATES TARGETING CD33 IN THE TREATMENT OF SARCOMAS

CROSS-REFERENCE TO RELATED APPLICATIONS

This application is a continuation-in-part of U.S. application Ser. No. 17/883,434 filed Aug. 8, 2022, which is a continuation-in-part of U.S. application Ser. No. 17/532,919 filed Nov. 22, 2021 and which claims the benefit of U.S. provisional application Ser. No. 63/230,431 filed Aug. 6, 2021, each of which is hereby incorporated by reference in its entirety.

SEQUENCE LISTING

The instant application contains a Sequence Listing which has been submitted electronically in XML format and is hereby incorporated by reference in its entirety. Said XML copy, created on Oct. 21, 2022, is named ATNM-002US-CIP_SL_ST26.xml and is 203,125 bytes in size.

FIELD OF THE INVENTION

The invention relates to the field of radiopharmaceuticals.

BACKGROUND OF THE INVENTION

Myeloid-Derived Suppressor Cells (MDSCs) are CD33-positive cells that contribute to immunosuppression and immunological escape of solid tumors and other cancers. MDSCs include monocytic MDSCs which are CD14-positive and granulocytic MDSCs which are CD15-positive. Within the tumor microenvironment, MDSCs can differentiate into immunosuppressive tumor-associated macrophages (TAMs). MDSCs also play a role in the pathology of the rare conditions haemophagocytic lymphohistiocytosis (HLH) and macrophage activation syndrome (MAS).

SUMMARY OF THE INVENTION

In one aspect, the invention provides compositions and methods for treating cancers and proliferative disorders, such as solid tumor cancers, using radioconjugates targeting CD33, alone or in combination with one or more of radioconjugates targeting other cancer-associated targets such as DR5, 5T4, HER2, HER3, or TROP2 antibody drug conjugates (ADCs) targeting cancer-associated targets such as the aforementioned targets, therapeutic antibodies targeting cancer-associated targets such as the aforementioned targets, chemotherapy agents and regimens, and immune checkpoint inhibitors.

Exemplary CD33 targeting agents that may be radiolabeled for use in the invention include the monoclonal anti-CD33 antibodies lintuzumab, gemtuzumab, or vadastuximab.

Exemplary DR5 targeting agents that may be radiolabeled, unlabeled or drug-conjugated for use in the invention include the monoclonal anti-DR5 antibodies mapatumumab, conatumumab, lexatumumab, tigatuzumab, drozitumab, and LBY-135. According to certain aspects, an Actinium-225 labeled monoclonal antibody against CD33 is administered to a mammalian subject, such as a human patient, in a radiation dose of 0.1 to 10 µCi/kg body weight of the subject and a protein dose of less than 10 mg/kg body weight of the subject.

Exemplary 5T4 targeting agents that may be radiolabeled, drug-conjugated, or unlabeled for use in the invention include the anti-5T4 monoclonal antibodies MED10641, ALG.APV-527, Tb535, H6-DM5, and ZV0508.

Exemplary HER2 targeting agents that may be radiolabeled, drug-conjugated, or unlabeled for use in the invention include the monoclonal antibodies trastuzumab and pertuzumab.

Exemplary HER3 targeting agents that may be radiolabeled, drug-conjugated, or unlabeled for use in the invention include the monoclonal antibodies patritumab, seribantumab, lumretuzumab, elgemtumab, GSK2849330, and AV-203 (CAN017).

Exemplary TROP2 targeting agents that may be radiolabeled, drug-conjugated, or unlabeled for use in the invention include the monoclonal antibodies Sacituzumab and Datopotamab, and antibodies recognizing the same epitope of TROP2 recognized by either of said antibodies.

Exemplary agents that block binding of CD47 to SIRPα include magrolimab, lemzoparlimab, AO-176, TTI-621, and TTI-622. Exemplary effective doses for the CD47 blockade include 0.05 to 5 mg/kg patient weight. Other immune checkpoint inhibitors, such as PD-1 and PD-L1 blocking agents, may also be used.

According to certain aspects, the cancer for treatment/treated may be a solid tumor or a hematological cancer, which may be a myeloid malignancy or a non-myeloid malignancy. Exemplary myeloid hematological malignancies include acute myelogenous leukemia, chronic myelogenous leukemia, myelodysplastic syndrome, or myeloproliferative neoplasm. According to certain aspects, the cancer may be associated with CD33 positive cells, such as myeloblast cells or malignant plasmacytes. Exemplary non-myeloid hematological malignancies for treatment/treated include lymphomas and lymphocytic leukemias.

Additional features, advantages, and aspects of the invention may be set forth or apparent from consideration of the following detailed description, drawings if any, and claims. Moreover, it is to be understood that both the foregoing summary of the invention and the following detailed description are exemplary and intended to provide further explanation without limiting the scope of the invention as claimed.

DETAILED DESCRIPTION OF THE INVENTION

Figure 1:
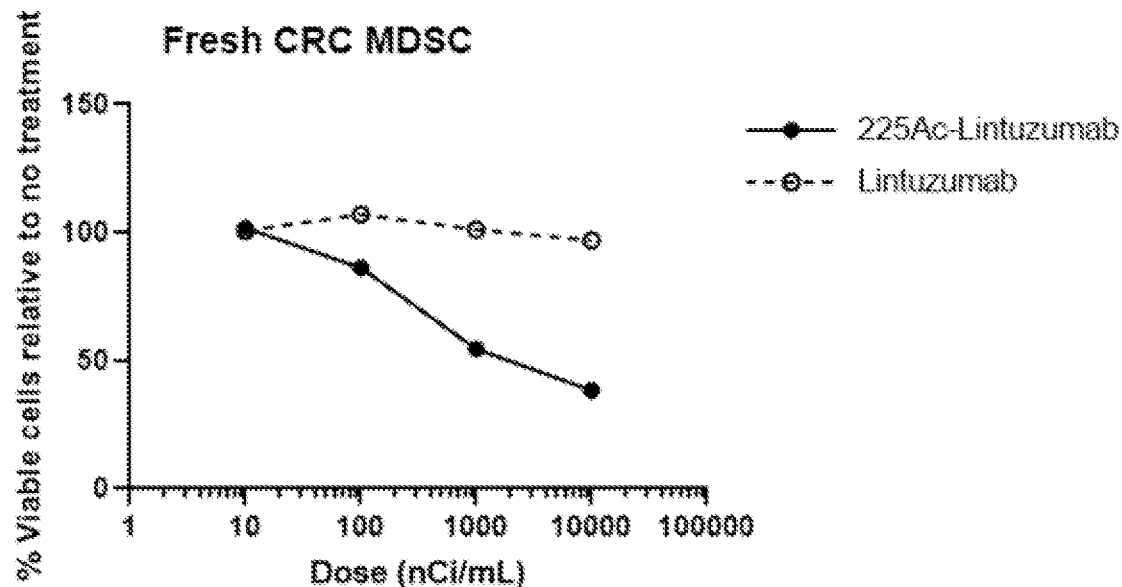
FIG. 1 shows results of a viability assay demonstrating that $^{225}$Ac-labeled lintuzumab (anti-CD33 mAb) significantly depletes MDSCs isolated from a human colorectal cancer (CRC) patient versus non-radiolabeled lintuzumab control.

One aspect of the presently disclosed invention is based on the discovery that, in addition to finding use in treating myeloid-derived hematological cancers and proliferative disorders, radioconjugated CD33 targeting agents such as radioconjugated anti-CD33 antibodies, may also be used to treat other proliferative disorders including but not limited to solid tumor cancers and non-myeloid derived hematological cancers by killing myeloid derived suppressor cells (MDSCs) that suppress host immune response to cancers.

In one aspect, the invention provides compositions and methods for treating cancers and proliferative disorders, such as solid tumor cancers, using radioconjugates targeting CD33, alone or in combination with one or more of radioconjugates targeting other cancer-associated targets such as DR5, 5T4, HER2, or HER3, antibody drug conjugates (ADCs) targeting cancer-associated targets such as the aforementioned targets, unlabeled therapeutic antibodies targeting cancer-associated targets such as the aforementioned targets, chemotherapy agents and regimens, and immune checkpoint inhibitors.

In another aspect, the invention provides compositions and methods for treating the MDSC-associated disorders haemophagocytic lymphohistiocytosis (HLH) and macrophage activation syndrome (MAS) using one or more radiolabeled CD33 targeting agents.

Definitions and Abbreviations

Throughout this description and in the appended claims, use of the singular includes the plural and plural encompasses singular, unless specifically stated otherwise. For example, although reference is made herein to "an" antibody, "a" radionuclide, and "the" targeting agent, one or more of any of these components and/or any other components described herein may be used.

The words "comprising" and forms of the word "comprising" as well as the word "including" and forms of the word "including," as used in this description and in the claims, do not limit the inclusion of elements beyond what is referred to. Additionally, although throughout the present disclosure various aspects or elements thereof are described in terms of "including" or "comprising," corresponding aspects or elements thereof described in terms of "consisting essentially of" or "consisting of" are similarly disclosed. For example, while certain aspects of the invention have been described in terms of a method "including" or "comprising" administering a radiolabeled targeting agent, corresponding methods instead reciting "consisting essentially of" or "consisting of" administering the radiolabeled target are also within the scope of said aspects and disclosed by this disclosure.

The term "about" when used in this disclosure in connection with a numerical designation or value, e.g., in describing temperature, time, amount, and concentration, including in the description of a range, indicates a variance of ±10% and, within that larger variance, variances of ±5% or ±1%.

As used herein, "administer" with respect to a targeting agent or other therapeutic agent or composition includes delivering the agent to a subject's body via any known method suitable for delivery. Specific modes of administration include, without limitation, intravenous, transdermal, subcutaneous, intraperitoneal, intrathecal and intra-tumoral administration. Exemplary administration methods for antibodies may be as substantially described in U.S. Pat. No. 10,736,975 and International Pub. No. WO 2016/187514, each incorporated by reference herein. For example, according to certain aspects, the targeting agent may be administered as a patient specific therapeutic composition which may be included in a single dose container, the total volume of which may be administered to a patient in a single treatment session. Any of the compositions disclosed herein, such as those including a monoclonal antibody or antigen-binding antibody fragment, may include at least one pharmaceutically acceptable carrier or pharmaceutically acceptable excipient. The dose of an effector molecule (e.g., radionuclide) of the radiolabeled targeting agent such as radiolabeled monoclonal antibody and a total protein amount of the agent may depend on and/or be selected based on at least one patient specific parameter. Patient specific parameters include, but are not limited to, a patient weight, a patient age, a patient height, a patient gender, a patient medical condition, and a patient medical history.

Antibodies, antibody fragments and other therapeutic proteins and peptides may, for example, be formulated with one or more pharmaceutically acceptable carriers and/or excipients as, for example, known in the art. For example, injectable drug delivery systems include solutions, suspensions, gels, microspheres and polymeric injectables, and can include one or more excipients such as solubility-altering agents (e.g., ethanol, propylene glycol and sucrose) and polymers (e.g., polycaprylactones and PLGA's). An exemplary formulation may be as substantially described in U.S. Pub. No. 20170326259 or International Pub No. WO 2017/155937, each incorporated by reference herein. For example, according to certain aspects, the formulation may include 0.5% to 5.0% (w/v) of an excipient selected from the group consisting of ascorbic acid, polyvinylpyrrolidone (PVP), human serum albumin (HSA), a water-soluble salt of HSA, and mixtures thereof. Certain formulations may include 0.5-5% ascorbic acid; 0.5-4% polyvinylpyrrolidone (PVP); and the monoclonal antibody in 50 mM PBS buffer, pH 7.

As used herein, the term "antibody" includes, without limitation, (a) an immunoglobulin molecule including two heavy chains and two light chains and which recognizes an antigen; (b) polyclonal and monoclonal immunoglobulin molecules; (c) monovalent and divalent fragments thereof, such as Fab, di-Fab, scFvs, diabodies, minibodies, and single domain antibodies (sdAb) such as nanobodies; (d) naturally occurring and non-naturally occurring, such as wholly synthetic antibodies, IgG-Fc-silent, and chimeric; and (e) bi/multi-specific forms thereof. Immunoglobulin molecules may derive from any of the commonly known classes, including but not limited to IgA, secretory IgA, IgG and IgM. IgG subclasses are also well known to those in the art and include, but are not limited to, human IgG1, IgG2, IgG3 and IgG4. The N-terminus of each chain defines a "variable region" of about 100 to 110 or more amino acids primarily responsible for antigen recognition. The terms variable light chain (VL) and variable heavy chain (VH) refer to these regions of light and heavy chains respectively. Antibodies may be human, humanized, nonhuman, or chimeric. When a specific aspect of the presently disclosed invention refers to or recites an "antibody," it is envisioned as referring to any of the full-length antibodies or fragments thereof disclosed herein, unless explicitly denoted otherwise.

A "humanized" antibody refers to an antibody in which some, most or all amino acids outside the CDR domains of a non-human antibody are replaced with corresponding amino acids derived from human immunoglobulins. In one embodiment of a humanized form of an antibody, some, most or all of the amino acids outside the complementarity-determining region (CDR) domains have been replaced with amino acids from human immunoglobulins, whereas some, most or all amino acids within one or more CDR regions are unchanged. Small additions, deletions, insertions, substitutions or modifications of amino acids are permissible as long as they do not abrogate the ability of the antibody to bind to a particular antigen. A "humanized" antibody retains an antigenic specificity similar to that of the original antibody.

A "chimeric antibody" refers to an antibody in which the variable regions are derived from one species and the constant regions, such as the Fc region, are derived from another species, such as an antibody in which the variable regions are derived from a mouse antibody and the constant regions are derived from a human antibody.

A "complementarity-determining region", or "CDR", refers to amino acid sequences that, together, define the binding affinity and specificity of the variable region of a native immunoglobulin binding site. There are three CDRs in each of the light and heavy chains of an antibody. CDRs and framework regions may, for example, be delineated according to the Kabat or IMGT numbering conventions, as known in the art.

A "framework region", or "FR", refers to amino acid sequences interposed between CDRs, typically conserved, that act as the scaffold between the CDRs.

A "constant region" refers to the portion of an antibody molecule that is consistent for a class of antibodies and is defined by the type of light and heavy chains. For example, a light chain constant region may be of the kappa or lambda chain type and a heavy chain constant region may be of one of the five chain isotypes: alpha, delta, epsilon, gamma or mu. This constant region, in general, can confer effector functions exhibited by the antibodies. Heavy chains of various subclasses (such as the IgG subclass of heavy chains) are mainly responsible for different effector functions.

As used herein, "immunoreactivity" refers to a measure of the ability of an immunoglobulin to recognize and bind to a specific antigen. "Specific binding" or "specifically binds" refers to an antibody binding to a target antigen or an epitope within the antigen with significantly greater affinity and/or selectivity than for other antigens in the milieu in which the antibody is used or present. Typically, an antibody binds to the antigen or the epitope within the antigen with an equilibrium dissociation constant ($K_D$) of about $1 \times 10^{-8}$ M or less, for example about $1 \times 10^{-9}$ M or less, about $1 \times 10^{-10}$ M or less, about $1 \times 10^{-11}$ M or less, or about $1 \times 10^{-12}$ M or less, typically with the $K_D$ that is at least one hundred fold less than its $K_D$ for binding to a nonspecific antigen (e.g., BSA, casein). The dissociation constant may be measured using standard procedures. Antibodies that specifically bind to the antigen or the epitope within the antigen may have cross-reactivity to other related antigens, for example to the same antigen from other species (homologs), such as human or monkey, for example *Macaca fascicularis* (cynomolgus, cyno), Pan troglodytes (chimpanzee, chimp) or *Callithrix jacchus* (common marmoset, marmoset).

As used herein, a "CD33 targeting agent" includes, for example, an antibody, such as but not limited to a monoclonal antibody (mAb), antibody fragment such as Fab or Fab$_2$ fragment, a corresponding scFv molecule, antibody mimetic, peptide, aptamer, or small molecule that specifically binds to any available epitope of CD33. According to certain aspects, the CD33 targeting agent used may include any of the monoclonal antibodies lintuzumab (HuM195), gemtuzumab, or vadastuximab, or an antibody including the heavy chain and light chain CDRs of one of these antibodies, or an epitope-binding antibody fragment thereof of any of the preceding antibodies such as a Fab, Fab$_2$ or scFv molecule, or an antibody or antibody fragment that binds to the same epitope as any of the aforementioned antibodies. In a related aspect, the CD33 targeting agent used is the monoclonal antibody lintuzumab (HuM195), or an antibody including the heavy and light chain CDRs of lintuzumab, or an antigen-binding fragment thereof such as a Fab, Fab$_2$ or corresponding scFv of any of the preceding antibodies, or a different antibody or different antibody fragment that binds to the CD33 epitope recognized by lintuzumab.

As used herein, a "DR5 targeting agent" includes, for example, an antibody, such as but not limited to a monoclonal antibody (mAb), antibody fragment such as Fab fragment, antibody mimetic, peptide, ligand, aptamer, or small molecule that binds to any available epitope of DR5. According to certain aspects, the DR5 targeting agent may be an anti-DR5 antibody such as a human or humanized antibody against DR5. According to certain aspects, the anti-DR5 antibody may be or bind to an epitope of DR5 recognized by the any of mapatumumab, conatumumab, lexatumumab, tigatuzumab, drozitumab, and LBY-135. According to certain aspects, the anti-DR5 antibody includes mapatumumab, conatumumab, lexatumumab, tigatuzumab, drozitumab, and/or LBY-135.

TABLE 1

| Company Name (Originator) | Partners | Product Name | Agent |
|---|---|---|---|
| Active Biotech AB | NeoTX Therapeutics Ltd. | naptumomab estafenatox (ABR-217620, second generation) | Antibody (Fab)-drug conjugate |
| Aptevo Therapeutics Inc. | Alligator Bioscience AB | ALG.APV-527 | Antibody (dual targeting) |
| Asana BioSciences LLC | Mersana | ASN004 | Antibody-drug conjugate; scFvFc structure |
| Biotecnol Ltd. | Chiome Bioscience | Tb535 | Antibody (triabody) |
| Ambrx Inc. | Pfizer Inc. | Anti-5T4 ADC | Antibody-drug conjugate |
| Byondis | Previous name: Synthon | Anti-5T4 SYD1875 | Antibody-drug conjugate |
| Genmab | Abbvie | GEN1044 (DuoBody-CD3x5T4) | Bispecific mAb |
| Guangdong Zhongsheng Pharmaceutical Co | — | H6-DM4 | Antibody-drug conjugate |

TABLE 1-continued

| Company Name (Originator) | Partners | Product Name | Agent |
|---|---|---|---|
| Medimmune | AstraZeneca | MEDI0641 | Antibody-drug conjugate |
| Oxford Biomedica | — | H8 | Antibody |
| Pfizer Inc. | Oxford Biomedica | PF-06263507/ A1mcMMAF | Antibody-drug conjugate |
| Zova Biotherapeutics | Neoantigen Therapeutics | ZV0508 | Antibody-drug conjugate |
| Macrogenics | — | 5T4 × CD137 TRIDENT | Bispecific mAb |
| Macrogenics | — | 5T4 × CD3 DART ® | Bispecific mAb |
| Amgen | — | 5T4-CD3 Bispecific | Bispecific mAb |

As used herein, a "5T4 targeting agent" includes, for example, an antibody, such as but not limited to a monoclonal antibody (mAb), antibody fragment such as Fab fragment, antibody mimetic, peptide, ligand, aptamer, or small molecule that binds to any available epitope of 5T4. For example, the 5T4 targeting agent may be a monoclonal antibody. An early description of an anti-5T4 antibody sequence was provided by Hole & Stern (Hole & Stern (1988) *Br. J. Cancer* 57, 239-246). An antibody for use as an 5T4 targeting agent according to the presently disclosed invention may, for example, be produced using the sequence provided by Hole & Stern. According to certain aspects, the 5T4 targeting agent includes a humanized antibody against 5T4, such as described in U.S. Pat. Nos. 7,074,909 and 8,044,178. Exemplary antibodies against 5T4 include at least MEDI0641, described in Harper (Harper, J. et al. (2017) *Mol. Cancer Ther.* 16, 1576-1587) and developed by Medimmune/AstraZeneca; ALG.APV-527, developed by Aptevo Therapeutics/Alligator Bioscience; Tb535, developed by Biotecnol/Chiome Bioscience; H6-DM5 developed by Guangdong Zhongsheng Pharmaceuticals; and ZV0508 developed by Zova Biotherapeutics. See also Table 1 which discloses additional antibodies and antibody-drug conjugates, the antibody portions of which may be employed as 5T4 targeting agents according to aspects of the present invention.

As used herein, a "HER2 targeting agent" includes, for example, an antibody, such as but not limited to a monoclonal antibody (mAb), antibody fragment such as Fab fragment, antibody mimetic, peptide, ligand, aptamer, or small molecule that binds to any available epitope of HER2 (ErbB2). According to certain aspects, the anti-HER2 antibody employed may be Trastuzumab or a different antibody that binds to an epitope of HER2 recognized by Trastuzumab, or an antigen-binding fragment of either, and/or the antibody employed may be Pertuzumab or a different antibody that binds to an epitope of HER2 recognized by Pertuzumab, or an antigen-binding fragment of either. According to certain aspects, the anti-HER2 antibody may also be a multi-specific antibody, such as bispecific antibody, against any available epitope of HER3/HER2 such as MM-111 and MM-141/Istiratumab from Merrimack Pharmaceuticals, MCLA-128 from Merus NV, and MEHD7945A/Duligotumab from Genentech.

As used herein, a "HER3 targeting agent" includes, for example, an antibody, such as but not limited to a monoclonal antibody (mAb), antibody fragment such as Fab fragment, antibody mimetic, peptide, ligand, aptamer, or small molecule that binds to any available epitope of HER3. According to certain aspects, the anti-HER3 antibody may be one of the following antibodies or bind to an epitope of HER3 recognized by one of the following antibodies: Patritumab, Seribantumab, Lumretuzumab, Elgemtumab, AV-203 (a/k/a CAN017; Aveo Oncology), or GSK2849330, or be an antigen-binding fragment of such antibodies. According to certain aspects, the anti-HER3 antibody is selected from one or more of Patritumab, Seribantumab, Lumretuzumab, Elgemtumab, US-1402, AV-203, CDX-3379, GSK2849330, and antigen-binding fragments thereof. According to certain aspects, the anti-HER3 antibody may be a multi-specific antibody, such as a bispecific antibody, against any available epitope of HER3/HER2 such as MM-111 and MM-141/Istiratumab from Merrimack Pharmaceuticals, MCLA-128 from Merus NV, and MEHD7945A/Duligotumab from Genentech. The antibody may, for example, also be one of the anti-HER3 antibodies disclosed in U.S. Pub No. 20210025006, incorporated by reference herein, such as CAN017, 04D01, 09D03, 1 1G01, 12A07, 18H02 and 22A02, or an antibody binding to an epitope of HER3 recognized by one of said antibodies, or an antigen binding fragment of any of the aforementioned antibodies.

As used herein, a "TROP2 targeting agent" includes, for example, an antibody, such as but not limited to a monoclonal antibody (mAb), antibody fragment such as Fab, Fab$_2$ or corresponding scFv, antibody mimetic, peptide, ligand, aptamer, or small molecule that binds to any available epitope of TROP2. According to certain aspects, the anti-TROP2 antibody may be Sacituzumab or Datopotamab, or an antibody that binds to an epitope of TROP2 recognized by Sacituzumab or Datopotamab.

An "epitope" refers to the target molecule site (e.g., at least a portion of an antigen) that is capable of being recognized by, and bound by, a targeting agent such as an antibody, antibody fragment, Fab fragment, aptamer, or small molecule. For a protein antigen, for example, this may refer to the region of the protein (i.e., amino acids, and particularly their side chains) that is bound by the targeting agent. Overlapping epitopes may include at least one to five common amino acid residues. Methods of identifying epitopes of antibodies are known to those skilled in the art and include, for example, those described in Antibodies, A Laboratory Manual, Cold Spring Harbor Laboratory, Ed Harlow and David Lane (1988).

As used herein, the terms "proliferative disorder" is inclusive of cancers and precancerous proliferative disorders, and includes, without limitation, a solid cancer (e.g., a solid tumor). "Solid cancers" which may be treated according to various aspects of the invention include, without limitation, bone cancer, pancreatic cancer, skin cancer, cancer of the head or neck (head & neck cancer), cutaneous or intraocular malignant melanoma, uterine cancer, ovarian cancer, prostate cancer, colorectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, pediatric tumors, cancer of the bladder, cancer of the kidney or ureter, cancer of lung such as non-small cell lung carcinoma (NSCLC) and small cell lung carcinoma (SCLC), carcinoma of the renal pelvis, neoplasm of the central nervous system (CNS), primary CNS lymphoma, tumor angiogenesis, spinal axis tumor, brain stem glioma, glioblastoma, pituitary adenoma, Kaposi's sarcoma, epidermoid cancer, squamous cell cancer, environmentally-induced cancers including those induced by asbestos such as mesothelioma. The sarcoma may, for example, be osteosarcoma, dermatofibrosarcoma protuberans (DF SP), fibrosarcoma (fibroblastic sarcoma), chondrosarcoma, Ewing's sarcoma, rhabdomyosarcoma, liposarcoma, synovial sarcoma, pleomorphic sarcoma, gastrointestinal stromal tumor, Kaposi's sarcoma, leiomyosarcoma, or angiosarcoma. The carcinoma may, for example, be basal cell carcinoma, squamous cell carcinoma, renal cell carcinoma, ductal carcinoma in situ (DCIS; a breast cancer), invasive ductal carcinoma (a breast cancer), or adenocarcinoma (such as lung, pancreatic, stomach, colorectal, prostate or breast adenocarcinoma).

According to certain aspects of the invention, the solid cancer treated or for treatment may be breast cancer such as metastatic breast cancer, tamoxifen-sensitive breast cancer, tamoxifen-resistant breast cancer or triple negative breast cancer (TNBC), gastric cancer, bladder cancer, cervical cancer, endometrial cancer, skin cancer such as melanoma, stomach cancer, testicular cancer, esophageal cancer, bronchioloalveolar cancer, prostate cancer such as castration resistant prostate cancer (CRPC), metastatic prostate cancer and metastatic CRPC (mCRPC), colorectal cancer, ovarian cancer, cervical epidermoid cancer, liver cancer such as hepatocellular carcinoma (HCC) or cholangiocarcinoma, pancreatic cancer, lung cancer such as non-small cell lung carcinoma (NSCLC; including any of subtypes adenocarcinoma, squamous cell carcinoma, and large cell carcinoma) or small cell lung cancer (SCLC), renal cancer, head and neck cancer such as head and neck squamous cell cancer, a carcinoma, a sarcoma, or any combination thereof. In general, the various aspects of the invention may be employed in the treatment of non-metastatic, premetastatic, and metastatic forms of cancers such as the aforementioned cancers and others disclosed herein.

As used herein, "cancer" also includes, without limitation, a hematological malignancy. A "hematologic disease" or "hematological disorder" may be taken to refer to at least a blood cancer. According to certain aspects of the invention, the hematological cancer or hematological proliferative disorder includes, leukemias (such as acute myeloid leukemia (AML), acute promyelocytic leukemia, acute lymphoblastic leukemia (ALL), acute mixed lineage leukemia, chronic myeloid leukemia (CML), chronic lymphocytic leukemia (CLL), hairy cell leukemia and large granular lymphocytic leukemia), myelodysplastic syndrome (MDS), myeloproliferative disorders (polycythemia vera, essential thrombocytosis, primary myelofibrosis and chronic myeloid leukemia), lymphomas, multiple myeloma, MGUS and similar disorders, Hodgkin lymphoma (HL), non-Hodgkin lymphoma (NHL), primary mediastinal large B-cell lymphoma, diffuse large B-cell lymphoma, follicular lymphoma, transformed follicular lymphoma, splenic marginal zone lymphoma, lymphocytic lymphoma, T-cell lymphoma, and other B-cell malignancies.

One object of the present invention is providing compositions and methods for treating hematological proliferative disorders that are not myeloid-derived, such as lymphomas and lymphocytic leukemias, and/or that do not substantially or at all express CD33, using one or more CD33 targeting radioconjugates. Such lymphomas include Hodgkin lymphoma and Non-Hodgkin lymphoma. Without limitation, these Non-Hodgkin lymphomas include (1) aggressive lymphomas such as: Diffuse large B-cell lymphoma; Anaplastic large-cell lymphoma; Burkitt lymphoma; Lymphoblastic lymphoma; Mantle cell lymphoma; and Peripheral T-cell lymphoma; and (2) indolent lymphomas such as: Follicular lymphoma; Cutaneous T-cell lymphoma; Lymphoplasmacytic lymphoma; Marginal zone B-cell lymphoma; MALT lymphoma; and Small-cell lymphocytic lymphoma. Hodgkin lymphoma includes (1) classical (or classic) Hodgkin lymphoma representing approximately 95% of Hodgkin lymphoma cases of which there are four subtypes: Nodular sclerosis (the most common sub-type of classical Hodgkin lymphoma), Mixed cellularity accounting for about 25 percent of all classical Hodgkin lymphoma cases, Lymphocyte-rich accounting for about 5 percent of all classical cases, and Lymphocyte-depleted accounting for less than 1 percent of all Hodgkin lymphomas; and (2) nodular lymphocyte-predominant Hodgkin lymphoma (NLPHL), representing about 5 percent of Hodgkin lymphoma patients.

According to certain aspects, a radiotherapeutic may include a targeting agent labeled with a radioisotope. As used herein, a "radioisotope" and "radionuclide" may be used interchangeably, and may be an alpha particle emitting isotope, a beta particle emitting isotope, and/or a gamma-emitting isotope. Accordingly, a targeting agent may be labeled with a beta particle emitter, an alpha particle emitter, and/or a gamma ray emitter. Examples of radioisotopes that may be used include the following: $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Bi, $^{213}$Po, $^{211}$At, $^{212}$Bi, $^{213}$Bi, $^{223}$Ra, $^{227}$Th, $^{149}$Tb, $^{161}$Tb, $^{47}$Sc, $^{67}$Cu, $^{134}$Ce, $^{137}$Cs, $^{212}$Pb, and $^{103}$Pd. Methods for affixing a radionuclide to a targeting agent such as a protein such as an antibody or antibody fragment (i.e., "labeling" the targeting agent such an antibody with a radioisotope) are well known in the art. Specific methods for labeling are described, for example, in U.S. Pat. Nos. 9,603,954, 10,420,851, International Pub. No. WO 2017/155937 and U.S. Provisional Patent Application No. 63/042,651 filed Dec. 9, 2019 and titled "Compositions and methods for preparation of site-specific radioconjugates," each of which is incorporated by reference herein.

For example, according to certain aspects, the radiotherapeutic targeting agent may be labeled by (a) chemically conjugating a targeting agent such as an antibody or peptide with a bifunctional chelator, such as p-SCN-Bn-DOTA in a buffered solution, (b) labeling the chelator-conjugated targeting agent by chelation of a radionuclide, such as Actinium-225 ($^{225}$Ac) or Lutetium-177 ($^{177}$Ac), in a buffered solution, (c) quenching the labeling reaction by the addition of a quenching chelate (e.g. diethylenetriaminepentaacetic acid (DTPA)), and (d) purifying the radiolabeled-chelator-conjugated targeting agent. Exemplary chelators that may be used include bifunctional chelator compounds that have the dual functionality of sequestering metal ions, such as the radionuclide, plus the ability to covalently bind a biological carrier such as an antibody.

Exemplary chelators that may be used include, but are not limited to compounds such as S-2-(4-Isothiocyanatobenzyl)-1,4,7,10 tetraazacyclododecanetetraacetic acid (p-SCN-Bn-DOTA), diethylene triamine pentaacetic acid (DTPA); ethylene diamine tetraacetic acid (EDTA); 1,4,7,10-tetra-azacyclododecane-N,N,N'',N'''-tetraacetic acid (DOTA); p-isothiocyanatobenzyl-1,4,7,10-tetra-azacyclododecane-1,4,7,10-tetraacetic acid (p-SCN-Bz-DOTA); 1,4,7,10-tetra-azacyclododecane-N,N,N''-triacetic acid (DO3A); 1,4,7,10-tetra-azacyclododecane-1,4,7,10-tetrakis(2-propionic acid) (DOTMA); 3,6,9-triaza-12-oxa-3,6,9-tricarboxymethylene-10-carboxy-13-phenyl-tridecanoic acid ("B-19036"); 1,4,7-triazacyclononane-N,N',N''-triacetic acid (NOTA); 1,4,8,11-tetra-azacyclotetradecane-N,N,N'',N'''-tetraacetic acid (TETA); triethylene tetraamine hexaacetic acid (TTHA); trans-1,2-diaminohexane tetraacetic acid (CYDTA); 1,4,7,10-tetra-azacyclododecane-1-(2-hydroxypropyl)-4, 7,10-triacetic acid (HP-D03 A); trans-cyclohexane-diamine tetraacetic acid (CDTA); trans(1,2)-cyclohexane dietylene triamine pentaacetic acid (CDTPA); 1-oxa-4,7,10-triazacyclododecane-N,N,N''-triacetic acid (OTTA); 1,4,7,10-tetra-azacyclododecane-1,4,7,10-tetrakis{3-(4-carboxyl)-butanoic acid}; 1,4,7,10-tetra-azacyclododecane-1,4,7,10-tetrakis(acetic acid-methyl amide); 1,4,7,10-tetra-azacyclododecane-1,4,7,10-tetrakis(methylene phosphonic acid); and derivatives thereof.

According to certain aspects, when the radiotherapeutic targeting agent is $^{225}$Ac-labeled, the effective amount is at or below 50 µCi/kg, 40 µCi/kg, 30 µCi/kg, 20 µCi/kg, 10 µCi/kg, 5 µCi/kg, 4 µCi/kg, 3 µCi/kg, 2 µCi/kg, 1 µCi/kg, or even 0.5 µCi/kg. According to certain aspects, the effective amount is at least 0.05 µCi/kg, or 0.1 µCi/kg, 0.2 µCi/kg, 0.3 µCi/kg, 0.4 µCi/kg, 0.5 µCi/kg, 1 µCi/kg, 2 µCi/kg, 3 µCi/kg, 4 µCi/kg, 5 µCi/kg, 6 µCi/kg, 7 µCi/kg, 8 µCi/kg, 9 µCi/kg, 10 µCi/kg, 12 µCi/kg, 14 µCi/kg, 15 µCi/kg, 16 µCi/kg, 18 µCi/kg, 20 µCi/kg, 30 µCi/kg, or 40 µCi/kg. According to certain aspects, the $^{225}$Ac-labeled targeting agent may be administered at a dose that includes any combination of upper and lower limits as described herein, such as from at least 0.1 µCi/kg to at or below 5 µCi/kg, or from at least 5 µCi/kg to at or below 20 µCi/kg.

According to certain aspects, the radiotherapeutic targeting agent is $^{225}$Ac-labeled, and the effective amount may be at or below 2 mCi (i.e., wherein the $^{225}$Ac is administered to the subject in a non-weight-based dosage). According to certain aspects, the effective amount may be at or below 1 mCi, such as 0.9 mCi, 0.8 mCi, 0.7 mCi, 0.6 mCi, 0.5 mCi, 0.4 mCi, 0.3 mCi, 0.2 mCi, 0.1 mCi, 90 µCi, 80 µCi, 70 µCi, 60 µCi, 50 µCi, 40 µCi, 30 µCi 20 µCi, 10 µCi, or 5 µCi. The effective amount may be at least 2 µCi, such as at least 5 µCi, 10 µCi, 20 µCi, 30 µCi, 40 µCi, 50 µCi, 60 µCi, 70 µCi, 80 µCi, 90 µCi, 100 µCi, 200 µCi, 300 µCi, 400 µCi, 500 µCi, 600 µCi, 700 µCi, 800 µCi, 900 µCi, 1 mCi, 1.1 mCi, 1.2 mCi, 1.3 mCi, 1.4 mCi, or 1.5 mCi. According to certain aspects, the $^{225}$Ac-labeled CD33 targeting agent may be administered in an amount that includes any combination of upper and lower limits as described herein, such as from at least 2 µCi to at or below 1 mCi, or from at least 2 µCi to at or below 250 µCi, or from 75 µCi to at or below 400 µCi.

According to certain aspects, the $^{225}$Ac-labeled radiotherapeutic targeting agent includes a single dose that delivers less than 12Gy, or less than 8 Gy, or less than 6 Gy, or less than 4 Gy, or less than 2 Gy, such as doses of 2 Gy to 8 Gy, to the subject, such as predominantly to the targeted solid tumor.

According to certain aspects, the radiotherapeutic targeting agent is radiolabeled with $^{177}$Lu ("$^{177}$Lu-labeled"), and the effective amount may be, for example, at or below 1 mCi/kg (i.e., where the amount of $^{177}$Lu-labeled targeting agent administered to the subject delivers a radiation dose of at or below 1000 mCi per kilogram of subject's body weight). According to certain aspects, the effective amount is at or below 900 µCi/kg, 800 µCi/kg, 700 µCi/kg, 600 µCi/kg, 500 µCi/kg, 400 µCi/kg, 300 µCi/kg, 200 µCi/kg, 150 µCi/kg, 100 µCi/kg, 80 µCi/kg, 60 µCi/kg, 50 µCi/kg, 40 µCi/kg, 30 µCi/kg, 20 µCi/kg, 10 µCi/kg, 5 µCi/kg, or 1 µCi/kg. According to certain aspects, the effective amount is at least 1 µCi/kg, 2.5 µCi/kg, 5 µCi/kg, 10 µCi/kg, 20 µCi/kg, 30 µCi/kg, 40 µCi/kg, 50 µCi/kg, 60 µCi/kg, 70 µCi/kg, 80 µCi/kg, 90 µCi/kg, 100 µCi/kg, 150 µCi/kg, 200 µCi/kg, 250 µCi/kg, 300 µCi/kg, 350 µCi/kg, 400 µCi/kg or 450 µCi/kg. According to certain aspects, an $^{177}$Lu-labeled targeting agent may be administered in an amount that includes any combination of upper and lower limits as described herein, such as from at least 5 mCi/kg to at or below 50 µCi/kg, or from at least 50 mCi/kg to at or below 500 µCi/kg.

According to certain aspects, the radiotherapeutic targeting agent is $^{177}$Lu-labeled, and the effective amount may be at or below 45 mCi, such as at or below 40 mCi, 30 mCi, 20 mCi, 10 mCi, 5 mCi, 3.0 mCi, 2.0 mCi, 1.0 mCi, 800 µCi, 600 µCi 400 µCi, 200 µCi, 100 µCi, or 50 µCi. According to certain aspects, the effective amount may be at least 10 µCi, such as at least 25 µCi, 50 µCi, 100 µCi, 200 µCi, 300 µCi, 400 µCi, 500 µCi, 600 µCi, 700 µCi, 800 µCi, 900 µCi, 1 mCi, 2 mCi, 3 mCi, 4 mCi, 5 mCi, 10 mCi, 15 mCi, 20 mCi, 25 mCi, 30 mCi. According to certain aspects, an $^{177}$Lu-labeled targeting agent may be administered in an amount that includes any combination of upper and lower limits as described herein, such as from at least 10 mCi to at or below 30 mCi, or from at least 100 µCi to at or below 3 mCi, or from 3 mCi to at or below 30 mCi.

According to certain aspects, the radiotherapeutic targeting agent is radiolabeled with $^{131}$I ("$^{131}$I-labeled"), and the effective amount may be at or below, for example, 1200 mCi (i.e., where the amount of $^{131}$I administered to the subject delivers a total body radiation dose of at or below 1200 mCi in a non-weight-based dose). According to certain aspects, the effective amount may be at or below 1100 mCi, at or below 1000 mCi, at or below 900 mCi, at or below 800 mCi, at or below 700 mCi, at or below 600 mCi, at or below 500 mCi, at or below 400 mCi, at or below 300 mCi, at or below 200 mCi, at or below 150 mCi, or at or below 100 mCi. According to certain aspects, the effective amount may be at or below 200 mCi, such as at or below 190 mCi, 180 mCi, 170 mCi, 160 mCi, 150 mCi, 140 mCi, 130 mCi, 120 mCi, 110 mCi, 100 mCi, 90 mCi, 80 mCi, 70 mCi, 60 mCi, or 50 mCi. According to certain aspects, the effective amount may be at least 1 mCi, such as at least 2 mCi, 3 mCi, 4 mCi, 5 mCi, 6 mCi, 7 mCi, 8 mCi, 9 mCi, 10 mCi, 20 mCi, 30 mCi, 40 mCi, 50 mCi, 60 mCi, 70 mCi, 80 mCi, 90 mCi, 100 mCi, 110 mCi, 120 mCi, 130 mCi, 140 mCi, 150 mCi, 160 mCi, 170 mCi, 180 mCi, 190 mCi, 200 mCi, 250 mCi, 300 mCi, 350 mCi, 400 mCi, 450 mCi, 500 mCi. According to certain aspects, an $^{131}$I-labeled targeting agent may be administered in an amount that includes any combination of upper and lower limits as described herein, such as from at least 1 mCi to at or below 100 mCi, or at least 10 mCi to at or below 200 mCi.

While various radionuclides have been disclosed in detail herein, any of those disclosed herein may used for radiolabeling the targeting agents (to form a radiotherapeutic or radioimmunotherapy agent) according to the various aspects of presently disclosed invention.

According to certain aspects of the presently disclosed invention, a majority of the radiotherapeutic targeting agent composition (antibody, antibody fragment, peptide, small molecule, etc.) administered to a subject may consist of non-labeled targeting agent, with the minority being the radiolabeled targeting agent. The ratio of labeled to non-labeled targeting agent can be adjusted using known methods. According to certain aspects, the radiotherapeutic (e.g., radioimmunotherapy) may include a labeled fraction and an unlabeled fraction, wherein the ratio of labeled:unlabeled may be from about 0.01:10 to 1:1, such as 0.1:10 to 1:1 labeled:unlabeled. Moreover, the radiotherapeutic may be provided as a single dose composition tailored to a specific patient, wherein the amount of labeled and unlabeled targeting agent in the composition may depend on at least a patient weight, age, gender, diagnosis, and/or disease state or health status, such as detailed in International Publication No. WO 2016/187514.

This inventive combination of a radiolabeled fraction and a non-radiolabeled fraction of the targeting agent of the radiotherapeutic allows the composition to be tailored to a specific patient. For example, when the radiotherapeutic is a radioimmunotherapy (i.e., the targeting agent is an antibody), each of the radiation dose and the protein dose of the antibody may be personalized to that patient based on at least one patient specific parameter. As such, each vial of the composition may be made for a specific patient, where the entire content of the vial is delivered to that patient in a single dose. When a treatment regime calls for multiple doses, each dose may be formulated as a patient specific dose in a vial to be administered to the patient as a "single dose" (i.e., full contents of the vial administered at one time). The subsequent dose may be formulated in a similar manner, such that each dose in the regime provides a patient specific dose in a single dose container. One of the advantages of the disclosed composition is that there will be no left-over radiation that would need to be discarded or handled by the medical personnel, e.g., no dilution, or other manipulation to obtain a dose for the patient. When provided in a single dose container, the container is simply placed in-line in an infusion tubing set for infusion to the patient. Moreover, the volume can be standardized so that there is a greatly reduced possibility of medical error (i.e., delivery of an incorrect dose, as the entire volume of the composition is to be administered in one infusion).

Accordingly to certain aspects, when the radiotherapeutic targeting agent is an antibody, it may be provided in a total protein amount of up to 100 mg, such as up to 60 mg, such as 5 mg to 45 mg, or a total protein amount of between 0.01 mg/kg patient weight to 16.0 mg/kg patient weight, such as between 0.01 mg/kg patient weight to 10.0 mg/kg, or between 0.05 mg/kg patient weight to 5.0 mg/kg, or between 0.01 mg/kg patient weight to 1.0 mg/kg, or between 0.01 mg/kg patient weight to 0.6 mg/kg patient weight, or 0.01 mg/kg patient weight, 0.015 mg/kg patient weight, 0.02 mg/kg patient weight, or 0.04 mg/kg patient weight, or 0.06 mg/kg patient weight.

According to certain aspects, the effective amount of an antibody in the radioimmunotherapy may include a total protein amount of at or less than 10 mg/m$^2$ (mg/m$^2$ patient body surface area), such as about 6 mg/m$^2$, or 3 mg/m$^2$, or 2 mg/m$^2$, such as 1-10 mg/m$^2$ or 2-10 mg/m$^2$ As used herein, the term "subject" includes, without limitation, a mammal such as a human, a non-human primate, a dog, a cat, a horse, a sheep, a goat, a cow, a rabbit, a pig, a rat and a mouse. Where the subject is human, the subject can be of any age. For example, the subject can be 60 years or older, 65 or older, 70 or older, 75 or older, 80 or older, 85 or older, or 90 or older. Alternatively, the subject can be 50 years or younger, 45 or younger, 40 or younger, 35 or younger, 30 or younger, 25 or younger, or 20 or younger. For a human subject afflicted with cancer, the subject can be newly diagnosed, or relapsed and/or refractory, or in remission. The cancer may, for example, be metastatic or non-metastatic. The various aspects of the present invention may, for example, be for the treatment of a patient/subject having an elevated level of circulating MDSCs, for example, a patient/subject whose circulating MDSC level has been determined, for example, by immunoprofiling flow cytometry, to have a circulating MDSC level above a predetermined threshold level, for example, above the typical levels for a healthy (non-cancer) comparator group, such as an age-matched (or age group matched) healthy (non-cancer) comparator group. Accordingly, any of the methods of treatment disclosed herein may further include a step of determining the patient's/subject's circulating MDSC level before administering a radiolabeled CD33 targeting agent to deplete MDSCs in the treatment of a proliferative disorder such as a solid tumor. The treatment step may, for example, be performed if the circulating MDSC exceeds the predetermined threshold value. Similarly, any of the methods of treatment disclosed herein may further include a step of determining the patient's/subject's circulating MDSC level, for example, by immunoprofiling flow cytometry, after administering a radiolabeled CD33 targeting agent to deplete MDSCs in the treatment of a proliferative disorder such as a solid tumor in order to determine the extent of depletion of MDSCs resulting from the treatment. Such profiling may, for example, be performed according to the methods disclosed in Apodaca et al., Characterization of a whole blood assay for quantifying myeloid-derived suppressor cells, Journal for Immuno-Therapy of Cancer volume 7, Article number: 230 (2019) in which, in brief, total MDSC are defined as $CD45^+CD3^-CD19^-CD20^-CD56^-CD16^-HLA\text{-}DR^-CD33\ CD11b^+$ cells, while the monocytic (M-MDSC) and polymorphonuclear subsets are defined as $CD14^+$ or $CD15^+$, respectively.

As used herein, "treating" a subject afflicted with a cancer may include, without limitation, (i) slowing, stopping or reversing the cancer's progression, (ii) slowing, stopping or reversing the progression of the cancer's symptoms, (iii) reducing the likelihood of the cancer's recurrence, and/or (iv) reducing the likelihood that the cancer's symptoms will recur. According to certain preferred aspects, treating a subject afflicted with a cancer means (i) reversing the cancer's progression, ideally to the point of eliminating the cancer, and/or (ii) reversing the progression of the cancer's symptoms, ideally to the point of eliminating the symptoms, and/or (iii) reducing or eliminating the likelihood of relapse (i.e., consolidation, which ideally results in the destruction of any remaining cancer cells).

"Therapeutically effective amount" or "effective amount" refers to an amount effective, at dosages and for periods of time necessary, to achieve a therapeutic result. A therapeutically effective amount may vary according to factors such as the disease state, age, gender, and weight of the individual, and the ability of a therapeutic or a combination of therapeutics to elicit a desired response in the individual. Exemplary indicators of an effective therapeutic or combination of therapeutics include, for example, improved well-being of the subject/patient, reduction in a tumor burden, arrested or slowed growth of a tumor, and/or absence of metastasis of cancer cells to other locations in the body. According to certain aspects, "therapeutically effective amount" or "effective amount" refers to an amount of the therapeutic agent or combination of therapeutic agents that may deplete, cause a reduction in the overall number of and/or slow the proliferation of MDSCs and/or cancer cells and/or a reduction in the burden or amount of CD33-expressing MDSC and/or cancer cells, and/or DR5 expressing-cancer cells, and/or 5T4-expressing cancer cells, and/or HER2-expressing cancer cells, and/or HER3-expressing cancer cells "Inhibits growth" refers to a measurable decrease or delay in the growth of a malignant cell(s) or tissue (e.g., tumor) in vitro or in vivo when contacted with a therapeutic or a combination of therapeutics, drugs and/or treatment modalities, when compared to the decrease or delay in the growth of the same cells or tissue in the absence of the therapeutic or the combination. Inhibition of growth of a malignant cell or tissue in vitro or in vivo may be at least about 10%, 20%, 30%, 40%, 50%, 60%, 70%, 80%, 90%, 95%, 96%, 97%, 98%, 99%, or 100%.

Throughout this application, various patents, patent applications, and other publications are cited. The disclosures of these patents, patent applications and other publications are hereby incorporated by reference in their entireties.

Unless otherwise defined or clear from the context in which presented, technical and scientific terms used herein have the same meaning as commonly understood by one of ordinary skill in the art to which the presently disclosed invention belongs. Although methods and materials similar or equivalent to those described herein may be used in the practice or testing described herein, suitable methods and materials are described below.

Radiotherapeutic CD33 Targeting Agents

The overexpression of CD33 is commonly found in myeloid-derived hematological malignancies, including AML, CIVIL, and MDS and CD33 targeting agents are currently studied for the treatment of these disorders. However, in one aspect, the present invention provides novel compositions and methods for targeting CD33 in the treatment of proliferative disorders such as solid cancers and precancers and hematological proliferative disorders that do not have a myeloid origin, such as lymphomas and lymphocytic leukemias, and/or that do not substantially or at all express CD33 themselves.

Accordingly, in one aspect, the methods of treatment disclosed herein include administration of a radiolabeled CD33 targeting agent alone or in combination with other cancer therapeutic agents, such as radiolabeled targeting agents against cancer-associated antigens, drug conjugated targeting agents such as antibody drug conjugates against cancer-associated antigens, chemotherapy and immune checkpoint inhibition, or treatments, such as external beam radiation or brachytherapy, for the treatment of solid cancers and precancers and hematological proliferative disorders that do not have a myeloid origin, such as lymphomas, lymphocytic and lymphocytic leukemias, and/or that do not substantially or at all express CD33.

Antibodies against human CD33, such as lintuzumab (HuM195), gemtuzumab, and vadastuximab that are known in the art may, for example, be radiolabeled for use in the various aspects of the invention. The full-length amino acid sequence of the lintuzumab light chain, including the leader sequence, is disclosed as SEQ ID NO:114 herein. The mature light chain begins with the aspartic acid (D) residue at position 20. The full-length amino acid sequence of the lintuzumab heavy chain, including the leader sequence, is disclosed as SEQ ID NO:115 herein. The mature heavy chain begins with the glutamine (Q) residue at position 20.

Lintuzumab is also commercially available from Creative Biolabs (Shirley, NY USA) as Catalog No. TAB-756. A lintuzumab scFv fragment is commercially available from Creative Biolabs as Catalog No. HPAB-M0470-YC-S(P). Gemtuzumab is commercially available from Creative Biolabs as Catalog No. TAB-013. Vadastuximab is commercially available from Creative Biolabs as Catalog No. TAB-471CQ. Such anti-CD33 antibodies or antigen binding fragments thereof may, for example, be radiolabeled with an alpha-emitting radionuclide, such as Actinium-225, to provide a radiolabeled CD33 targeting agent that is highly targeted for use in various aspects of the invention. The $^{225}Ac$ payload delivers high energy alpha particles directly to the CD33 expressing cells, such as MDSCs, in circulation or resident in tumors, generating lethal double strand DNA breaks without necessitating significant payload accumulation within the tumor cell, and providing therapeutic efficacy for even low target antigen expressing tumors. Due to its short path length, the range of its high energy alpha particle emission is only a few cell diameters thick, thereby limiting damage to nearby normal tissues. The radiolabeled antibody may, for example, be or include $^{225}AC$ lintuzumab satetraxetan.

DR5 Targeting Agents

Humans express two functional death receptors (DR4 and DR5), also known as tumor necrosis factor-related apoptosis-inducing ligand receptors 1 and 2 (TRAIL-R1 and -R2), which become upregulated on cell surfaces as part of an immune surveillance mechanism to alert the immune system of the presence of virally infected or transformed cells. TRAIL, the ligand that binds death receptors, is expressed on immune cells such as T-cells and NK cells, and upon engagement of DR4 or DR5, TRAIL trimerizes the death receptor and induces an apoptotic cascade that is independent of p53 (Naoum, et el. (2017) *Oncol. Rev.* 11, 332). While DR4 and DR5 can be found expressed at low levels in some normal tissues (Spierings, et al. (2004) *J. Histochem. Cytochem.*, 52, 821-31), they are upregulated on the surface of many tumor tissues including renal (kidney), lung, acute myeloid leukemia (AML), cervical, and breast cancers.

Following the identification of death receptors as a viable therapeutic target, many DR4 and DR5-targeting antibodies and recombinant TRAIL (rTRAIL) proteins have been developed, including mapatumumab, conatumumab, lexatumumab, tigatuzumab, drozitumab, and LBY-135. Tigatuzumab has been evaluated in a Phase 2 clinical trial in triple negative breast cancer (TNBC) patients, wherein the expression of DR5 on both primary and metastatic tumor samples was confirmed, demonstrating that DR5 is a suitable target for directing therapeutic intervention in this cancer type and metastatic disease (Forero-Torres, et al. (2015) *Clin. Cancer Res.*, 21, 2722-9).

In treatment regimens targeting solid tumors, such as breast cancer, radiation is typically used only to treat the site of the primary tumor after surgical resection and is only used palliatively for metastases. An alternative approach to achieve targeted delivery of radiation to both primary and metastatic tumors while sparing normal tissues from radiation toxicity is through use of a MDSC-targeting radiotherapeutic, as disclosed herein, in combination with a second agent directed to the tumor related antigen such as DR5.

Accordingly, DR5 targeting agents that may be employed in the present invention include at least antibodies, antibody fragments, antibody mimetics, peptides, ligands, and/or small molecules, which may be radiolabeled, drug-conjugated or unlabeled if therapeutically active without labeling.

Such DR5 targeting agents may be used in combination with radiolabeled CD33 targeting agents of the invention for the treatment of DR5-expressing cancers. Exemplary radiotherapeutics include ARCs targeted to DR5, such as radiolabeled monoclonal antibodies against DR5 (e.g., $^{225}$Ac-labeled anti-DR5 mAb). Exemplary antibodies against DR5 that may be used include at least tigatuzumab (CD-1008) from Daiichi Sankyo, conatumumab (AMG 655) from Amgen, mapatumumab from AstraZeneca, lexatumumab (also known as ETR2-ST01) from Creative Biolabs (Shirley, NY, USA), LBY-135, and drozitumab from Genentech. Initial studies in mouse models may use the surrogate mouse antibody TRA-8 or MD5-1.

5T4 Targeting Agents

Trophoblast glycoprotein (TBPG), also known as 5T4, is a glycoprotein that is categorized as an oncofetal antigen, meaning it is expressed on cells during fetal developmental stages but is not expressed in adult tissues except on tumors (Southall, P. J. et al. (1990) *Br. J. Cancer* 61, 89-95). 5T4 is expressed widely across many different tumor types, including lung, breast, head and neck, colorectal, bladder, ovarian, pancreatic, and many others (Stern, P. L. & Harrop, R. (2017) *Cancer Immunol. Immunother.* 66, 415-426). Additional characteristics that make it amenable for targeting with a radiotherapeutic include a high rate of internalization, expression on the tumor periphery, and expression on cancer stem cells.

Several attempts have been made to develop therapeutics against tumors through 5T4 expression, including antibodies, vaccines, and cellular therapies. While an unlabeled 5T4-targeting antibody is not an effective therapeutic (Boghaert, et al. (2008) *Int. J. Oncol.* 32, 221-234), armed antibodies such as antibody drug-conjugates (ADC) with toxins have been developed and tested preclinically. Only an auristatin based ADC developed by Pfizer was tested clinically, with no objective responses reported and toxicity related to the auristatin conjugate observed (Shapiro, G. I. et al. (2017) *Invest. New Drugs* 35, 315-323).

Accordingly, 5T4 targeting agents that may be employed in the present invention include at least antibodies, antibody fragments, antibody mimetics, peptides, ligands, and/or small molecules, which may be radiolabeled, drug-conjugated or unlabeled if therapeutically active without labeling. Such 5T4 targeting agents may be used in combination with radiolabeled CD33 targeting agents of the invention for the treatment of 5T4-expressing cancers. Exemplary radiotherapeutics that may be used include ARCs targeted to 5T4, such as radiolabeled monoclonal antibodies against 5T4 (e.g., $^{225}$Ac-labeled anti-5T4 mAb). Exemplary antibodies against 5T4 include at least MED10641 developed by Medimmune/AstraZeneca; ALG.APV-527, developed by Aptevo Therapeutics/Alligator Bioscience; Tb535, developed by Biotecnol/Chiome Bioscience; H6-DM5 developed by Guangdong Zhongsheng Pharmaceuticals; and ZV0508 developed by Zova Biotherapeutics.

HER2 Targeting Agents

According to certain aspects, the anti-HER2 antibody employed may be Trastuzumab or a different antibody that binds to an epitope of HER2 recognized by Trastuzumab and/or the antibody employed may be Pertuzumab or a different antibody that binds to an epitope of HER2 recognized by Pertuzumab, or antigen-binding fragments of the aforementioned antibodies. According to certain aspects, the anti-HER2 antibody may also be a multi-specific antibody, such as bispecific antibody, against any available epitope of HER3/HER2 such as MM-111 and MM-141/Istiratumab from Merrimack Pharmaceuticals, MCLA-128 from Merus NV, and MEHD7945A/Duligotumab from Genentech.

The amino acid sequences of the heavy chain and the light chain of Trastuzumab reported by DrugBank Online are: heavy chain (SEQ ID NO:116) and light chain (SEQ ID NO:117) and a HER2 binding antibody including one or both of said chains may be embodied in or used in the various embodiments of the invention. The amino acid sequences of the heavy chain and the light chain of Pertuzumab reported by DrugBank Online are: heavy chain (SEQ ID NO:118) and light chain (SEQ ID NO:119) and a HER2 binding antibody including one or both of said chains may be embodied in or used in the various embodiments of the invention.

Accordingly, HER2 targeting agents that may be employed in the present invention include at least antibodies, antibody fragments, antibody mimetics, peptides, ligands, and/or small molecules, which may be radiolabeled, drug-conjugated, or unlabeled if therapeutically active without labeling. Such HER2 targeting agents may be used in combination with radiolabeled CD33 targeting agents of the invention for the treatment of HER2-expressing cancers. Exemplary radiotherapeutics include ARCs targeted to HER2, such as radiolabeled monoclonal antibodies against HER2 such as radiolabeled Trastuzumab and/or radiolabeled Pertuzumab. Applicants have successfully conjugated Trastuzumab with p-SCN-DOTA and radiolabeled the composition with $^{225}$Ac or $^{177}$Lu. Exemplary ADCs targeting HER2 that may be used include fam-trastuzumab deruxtecan-nxki (Enhertu®; AstraZeneca/Daiichi Sankyo) and Trastuzumab emtansine (Roche/Genentech).

HER3 Targeting Agents

The human epidermal growth factor receptor 3 (ErbB3, also known as HER3) is a receptor protein tyrosine kinase belonging to the epidermal growth factor receptor (EGFR) subfamily of receptor protein tyrosine kinases. The transmembrane receptor HER3 consists of an extracellular ligand-binding domain having a dimerization domain therein, a transmembrane domain, an intracellular protein tyrosine kinase-like domain and a C-terminal phosphorylation domain. Unlike the other HER family members, the kinase domain of HER3 displays very low intrinsic kinase activity.

The ligands neuregulin 1 or neuregulin 2 bind to the extracellular domain of HER3 and activate receptor-mediated signaling pathway by promoting dimerization with other dimerization partners such as HER2. Heterodimerization results in activation and transphosphorylation of HER3's intracellular domain and is a means not only for signal diversification but also signal amplification. In addition, HER3 heterodimerization can occur in the absence of activating ligands and this is commonly termed ligand-independent HER3 activation. For example, when HER2 is expressed at high levels as a result of gene amplification (e.g. in breast, lung, ovarian or gastric cancer) spontaneous HER2/HER3 dimers can be formed. In this situation the HER2/HER3 is considered the most active ErbB signaling dimer and is therefore highly transforming.

Increased HER3 has been found in several types of cancer such as breast, lung, gastrointestinal and pancreatic cancers. Significantly, a correlation between the expression of HER2/HER3 and the progression from a non-invasive to an invasive stage has been shown (Alimandi et al. (1995) *Oncogene* 10:1813-1821; DeFazio et al. (2000) *Cancer* 87:487-498).

Accordingly, HER3 targeting agents that may be employed in the present invention include at least antibodies, antibody fragments, antibody mimetics, peptides, ligands, and/or small molecules, which may be radiolabeled, drug-conjugated or unlabeled if therapeutically active without labeling. Such HER3 targeting agents may be used in combination with radiolabeled CD33 targeting agents of the invention for the treatment of HER3-expressing cancers. Exemplary antibodies against HER3 that may be used include at least the monoclonal antibodies Patritumab, Seribantumab, Lumretuzumab, Elgemtumab, US-1402, AV-203, CDX-3379, and GSK2849330, or the bispecific antibodies MM-111, MM-141/Istiratumab, MCLA-128, and MEHD7945A/Duligotumab. Exemplary radiotherapeutics include ARCs targeted to HER3, such as radiolabeled forms of any of the aforementioned monoclonal antibodies against HER3 (e.g., $^{225}$Ac-anti-HER3 mAb) or radiolabeled antigen-binding fragments of the antibodies. An exemplary ADC targeting HER3 that may be used is patritumab deruxtecan (U3-1402, HER3-DXd; Daiichi Sankyo).

The following exemplary HER3 targeting agents may also be used, radiolabeled, drug-conjugated or unlabeled if therapeutically active without labeling, in combination or conjunction with a radiolabeled CD33 targeting agent to treat a cancer associated with MDSCs.

An exemplary HER3 antibody includes a murine monoclonal antibody against HER3 including a heavy chain having the amino acid sequence as set forth in SEQ ID NO:9 or 11 and/or a light chain having the amino acid sequence as set forth in SEQ ID NO:10 or 12, or an antibody such as a humanized antibody derived from one or more of said sequences. An exemplary HER3 antibody that may be radiolabeled and embodied in and/or used in the presently disclosed invention may include or a heavy chain with an N-terminal region having the sequence set forth in SEQ ID NO:13 and/or a light chain with an N-terminal region having the sequence as set forth in SEQ ID NO:14. A HER3 antibody that may be similarly embodied or used in various aspect of the invention may, for example, include the heavy chain variable region having the amino acid sequence as set forth in SEQ ID NO:7, and/or a light chain variable region having an amino acid sequence as set forth in SEQ ID NO:8; and/or a heavy chain including one or more of CDR1, CDR2 and CDR3 having the amino acid sequences respectively set forth in SEQ ID NOS:1-3, and/or a light chain with one or more of the CDR1, CD2 and CDR3 having the amino acid sequences respectively set forth in SEQ ID NOS:4-6. A HER3 antibody embodied in and/or used in any of the aspects of the invention may, for example, include any combination of the aforementioned light chain sequences and/or heavy chain sequences.

An exemplary HER3 antibody includes an immunoglobulin heavy chain variable region including a CDR-H1 including SEQ ID NO:15, a CDR-H2 including SEQ ID NO:16, and a CDR-H3 including SEQ ID NO:17; and/or an immunoglobulin light chain variable region including a CDR-L1 including SEQ ID NO:18, a CDR-L2 including SEQ ID NO:19, and a CDR-L3 including SEQ ID NO:20. An exemplary An exemplary HER3 antibody includes an immunoglobulin heavy chain variable region including SEQ ID NO:21 and/or an immunoglobulin light chain variable region including SEQ ID NO:22. An exemplary HER3 antibody includes an immunoglobulin heavy chain amino acid sequence of SEQ ID NO:23 and/or an immunoglobulin light chain amino acid sequence of SEQ ID NO:24.

An exemplary HER3 antibody includes an immunoglobulin heavy chain variable region including a CDR-H1 including SEQ ID NO:25, a CDR-H2 including SEQ ID NO:26, and a CDR-H3 including SEQ ID NO:27; and/or an immunoglobulin light chain variable region including a CDR-L1 including SEQ ID NO:28, a CDR-L2 including SEQ ID NO:29, and a CDR-L3 including SEQ ID NO:30. An exemplary HER3 antibody includes an immunoglobulin heavy chain variable region including SEQ ID NO:31 and/or an immunoglobulin light chain variable region including SEQ ID NO:32. An exemplary HER3 antibody includes an immunoglobulin heavy chain amino acid sequence of SEQ ID NO:33 and/or an immunoglobulin light chain amino acid sequence of SEQ ID NO:34

An exemplary HER3 antibody includes an immunoglobulin heavy chain variable region including a CDR-H1 including SEQ ID NO:35, a CDR-H2 including SEQ ID NO:36, and a CDR-H3 including SEQ ID NO:37; and/or an immunoglobulin light chain variable region including a CDR-L1 including SEQ ID NO:38, a CDR-L2 including SEQ ID NO:39, and a CDR-L3 including SEQ ID NO:40. An exemplary HER3 antibody includes an immunoglobulin heavy chain variable region including SEQ ID NO:41, and/or an immunoglobulin light chain variable region SEQ ID NO:42. An exemplary HER3 antibody includes an immunoglobulin heavy chain amino acid sequence of SEQ ID NO:43 and an immunoglobulin light chain amino acid sequence of SEQ ID NO:44.

An exemplary HER3 antibody includes an immunoglobulin heavy chain variable region including a CDR-H1 including SEQ ID NO:45, a CDR-H2 including SEQ ID NO:46, and a CDR-H3 including SEQ ID NO:47; and/or an immunoglobulin light chain variable region including a CDR-L1 including SEQ ID NO:48, a CDR-L2 including SEQ ID NO:29, and a CDR-L3 including SEQ ID NO:49. An exemplary HER3 antibody includes an immunoglobulin heavy chain variable region including SEQ ID NO:50 and/or an immunoglobulin light chain variable region including SEQ ID NO:51. An exemplary HER3 antibody includes an immunoglobulin heavy chain amino acid sequence of SEQ ID NO:52 and/or an immunoglobulin light chain amino acid sequence of SEQ ID NO:53.

An exemplary HER3 antibody includes an immunoglobulin heavy chain variable region including a CDR-H1 including SEQ ID NO:54, a CDR-H2 including SEQ ID NO:55, and a CDR-H3 including SEQ ID NO:56; and/or an immunoglobulin light chain variable region including a CDR-L1 including SEQ ID NO:28, a CDR-L2 including SEQ ID NO:29, and a CDR-L3 including SEQ ID NO:30. An exemplary HER3 antibody includes an immunoglobulin heavy chain variable region including SEQ ID NO:57 and/or an immunoglobulin light chain variable region including SEQ ID NO:58. An exemplary HER3 antibody includes an immunoglobulin heavy chain amino acid sequence of SEQ ID NO:59 and/or an immunoglobulin light chain amino acid sequence of SEQ ID NO: 60.

An exemplary HER3 antibody includes an immunoglobulin heavy chain variable region including a CDR-H1 including SEQ ID NO:61, a CDR-H2 including SEQ ID NO:62, and a CDR-H3 including SEQ ID NO:63; and/or an immunoglobulin light chain variable region including a CDR-L1 including SEQ ID NO:64, a CDR-L2 including SEQ ID NO:65, and a CDR-L3 including SEQ ID NO:66. An exemplary HER3 antibody includes an immunoglobulin heavy chain variable region including SEQ ID NO:67, and/or an immunoglobulin light chain variable region including SEQ ID NO:68. An exemplary HER3 antibody includes an immunoglobulin heavy chain amino acid sequence of SEQ ID NO:69 and an immunoglobulin light chain amino acid sequence of SEQ ID NO:70.

An exemplary HER3 antibody includes an immunoglobulin heavy chain variable region including a CDR-H1 including SEQ ID NO:71, a CDR-H2 including SEQ ID NO:72, and a CDR-H3 including SEQ ID NO:66; and/or an immunoglobulin light chain variable region including a CDR-L1 including SEQ ID NO:28, a CDR-L2 including SEQ ID NO:29, and a CDR-L3 including SEQ ID NO:30. An exemplary HER3 antibody includes an immunoglobulin heavy chain variable region including SEQ ID NO:73, and/or an immunoglobulin light chain variable region including SEQ ID NO:74. An exemplary HER3 antibody includes an immunoglobulin heavy chain amino acid sequence of SEQ ID NO:75 and/or an immunoglobulin light chain amino acid sequence of SEQ ID NO:76.

An exemplary HER3 antibody includes an immunoglobulin heavy chain amino acid sequence of SEQ ID NO:77 and/or an immunoglobulin light chain amino acid sequence of SEQ ID NO:78.

An exemplary HER3 antibody includes an immunoglobulin light chain variable region including SEQ ID NOS:86, 87, 88, 89, 90 or 91 and/or a heavy chain variable region including SEQ ID NOS:79, 80, 81, 82, 83, 84 or 85.

An exemplary HER3 antibody includes an immunoglobulin heavy chain sequence including SEQ ID NO:92, 94, 95, 98 or 99 and/or an immunoglobulin light chain sequence including SEQ ID NO:93, 96, 97, 100 or 101.

Exemplary HER3 antibodies also include Barecetamab (ISU104) from Isu Abxis Co and any of the HER3 antibodies disclosed in U.S. Pat. No. 10,413,607.

Exemplary HER3 antibodies also include HMBD-001 (10D1F) from Hummingbird Bioscience Pte. and any of the HER3 antibodies disclosed in International Pub. Nos. WO 2019185164 and WO2019185878, U.S. Pat. No. 10,662,241; and U.S. Pub. Nos. 20190300624, 20210024651, and 20200308275.

Exemplary HER3 antibodies also include the HER2/HER3 bispecific antibody MCLA-128 (i.e., Zenocutuzumab) from Merus N.V.; and any of the HER3 antibodies, whether monospecific or multi-specific, disclosed in U.S. Pub. Nos. 20210206875, 20210155698, 20200102393, 20170058035, and 20170037145.

Exemplary HER3 antibodies also include the HER3 antibody Patritumab (U3-1287), an antibody including heavy chain sequence SEQ ID NO:106 and/or light chain sequence SEQ ID NO:107 which are reported chains of Patritumab, and any of the HER3 antibodies disclosed in U.S. Pat. Nos. 9,249,230 and 7,705,130 and International Pub. No. WO2007077028.

Exemplary HER3 antibodies also include the HER3 antibody MM-121 and any of the HER3 antibodies disclosed in U.S. Pat. No. 7,846,440 and International Pub. No. WO2008100624. Exemplary HER3 antibodies also include the EGFR/HER3 bispecific antibody DL1 and any of the HER3 antibodies, whether monospecific or multi-specific, disclosed in U.S. Pat. Nos. 9,327,035 and 8,597,652, U.S. Pub. No. 20140193414, and International Pub. No. WO2010108127.

Exemplary HER3 antibodies also include the HER2/HER3 bispecific antibody MM-111 and any of the HER3 antibodies, whether monospecific or multi-specific, disclosed in U.S. Pub. Nos. 20130183311 and 20090246206 and International Pub. Nos. WO2006091209 and WO2005117973.

According to certain aspects, the HER3 targeting agent includes an anti-HER3 antibody that binds to an epitope of HER3 recognized by Patritumab from Daiichi Sankyo, Seribantumab (MM-121) from Merrimack Pharmaceuticals, Lumretuzumab from Roche, Elgemtumab from Novartis, GSK2849330 from GlaxoSmithKline, CDX-3379 of Celldex Therapeutics, EV20 and MP-RM-1 from MediPharma, Barecetamab (ISU104) from Isu Abxis Co., HMBD-001 (10D1F) from Hummingbird Bioscience Pte., REGN1400 from Regeneron Pharmaceuticals, and/or AV-203 from AVEO Oncology. According to certain aspects, the anti-HER3 antibody is selected from one or more of Patritumab, Seribantumab or an antibody including heavy chain sequence SEQ ID NO:108 and/or light chain sequence SEQ ID NO:109 which are reported for Seribantumab, Lumretuzumab or an antibody including heavy chain sequence SEQ ID NO:110 and/or light chain sequence SEQ ID NO:111 which are reported for Lumretuzumab, Elgemtumab or an antibody including heavy chain sequence SEQ ID NO:112 and/or light chain sequence SEQ ID NO:113 which are reported for Elgemtumab, AV-203, CDX-3379, GSK2849330, EV20, MP-RM-1, ISU104, HMBD-001 (10D1F), and REGN1400.

TROP2 Targeting Agents

Tumor-associated calcium signal transducer 2, also known as Trop-2 and as epithelial glycoprotein-1 antigen (EGP-1), is a protein encoded by the human TACSTD2 gene which is overexpressed in carcinomas. Overexpression of TROP2 is associated with poor survival in human solid tumor patients. Cancers that may be targeted with a TROP2 targeting agent and treated with a radiolabeled or drug-conjugated TROP2 targeting agent in conjunction with a radiolabeled CD33 targeting agent according to the invention include but are not limited to carcinomas, squamous cell carcinomas, adenocarcinomas, non-small cell lung cancer (NSCLC), Small-cell lung cancer (SCLC), colorectal cancer, gastric adenocarcinoma, esophageal cancer, hepatocellular carcinoma, cholangiocarcinoma, ovarian epithelial cancer, breast cancer, metastatic breast cancer, triple negative breast cancer (TNBC), prostate cancer, hormone-refractory prostate cancer, pancreatic ductal adenocarcinoma, head and neck cancers, renal cell cancer, urinary bladder neoplasms, cervical cancer, endometrial cancer, uterine cancer, follicular thyroid cancer, and glioblastoma multiforme.

Exemplary TROP2 targeting agents that may be radiolabeled and/or drug-conjugated and used in conjunction with a radiolabeled CD33 targeting agent in the treatment of a proliferative disorder include the monoclonal antibodies Sacituzumab and Datopotamab, antibodies having one or both of the heavy chain and light chain of said antibodies, and antibodies having one or both of the heavy chain CDRs and the light chain CDRs of said antibodies, or TROP2-binding fragments of any of the aforementioned antibodies. Sacituzumab biosimilar is commercially available as Catalog No. A2175 from BioVision Incorporated (an Abcam company, Waltham, MA, USA). Datopotamab biosimilar is commercially available as Catalog No. PX-TA1653 from ProteoGenix (Schiltigheim, France). The TROP2 targeting agent used in conjunction with a radiolabeled CD33 targeting agent may, for example, include the ADC Sacituzumab govitecan (Trodelvy®, Daiichi Sankyo).

Exemplary TROP2 targeting agents that may be radiolabeled and/or drug conjugated and used in conjunction with a radiolabeled CD33 targeting agent in the treatment of a proliferative disorder include a monoclonal antibody having a heavy chain SEQ ID NO:120 and/or a light chain SEQ ID NO:125 (reported as the heavy and light chains of Sacituzumab), or an antibody including one or both of the heavy chain variable region (SEQ ID NO:121) or the light chain variable region (SEQ ID NO:126) of said chains, or an antibody including 1, 2, or 3 of the heavy chain CDRs of said heavy chain (CDR H1-3: SEQ ID NOS:122-124 respectively) and/or 1, 2 or 3 of the light chain CDRs of said light chain (CDR L1-3: SEQ ID NOS:127-129 respectively), and any of the anti-human TROP antibodies disclosed in U.S. Pat. No. 7,238,785 (hRS7), U.S. Pat. Nos. 9,492,566, 10,195,517, or 11,116,846, or an antibody including one or both of the heavy chain and light chain variable regions of said antibodies, or an antibody including a heavy chain including 1, 2 or 3 of the heavy chain CDRs of any of said antibodies and/or a light chain including 1, 2, or 3 of the light chain CDRs of any of said antibodies.

CD79 or CD19 respectively or radiolabeled antigen-binding fragments thereof, for example, $^{225}$Ac labeled forms thereof. Table 2 shows exemplary FDA-approved ADCs, their approved indications, and their targets that may be used in combination with a radiolabeled CD33 targeting agent according to the invention for the treatment of lymphomas and lymphocytic leukemias for cancers or precancerous proliferative disorders expressing the respective target for the agent.

TABLE 2

| Drug | Maker | FDA Approved Indication | Trade name | Target |
|---|---|---|---|---|
| Brentuximab vedotin | Seattle Genetics, Millennium/Takeda | relapsed HL and relapsed sALCL | Adcetris ® | CD30 |
| Inotuzumab ozogamicin | Pfizer/Wyeth | relapsed or refractory CD22-positive B-cell precursor acute lymphoblastic leukemia | Besponsa ® | CD22 |
| Polatuzumab vedotin-piiq | Genentech, Roche | relapsed or refractory (R/R) diffuse large B-cell lymphoma (DLBCL) | Polivy ® | CD79 |
| Loncastuximab tesirine-lpyl | ADC Therapeutics | Large B-cell lymphoma | Zynlonta ® | CD19 |

Further exemplary TROP2 targeting agents that may be radiolabeled and/or drug conjugated and used in conjunction with a radiolabeled CD33 targeting agent in the treatment of a proliferative disorder include a monoclonal antibody heavy chain SEQ ID NO:130 and/or a light chain SEQ ID NO:135 (reported as the heavy and light chains of Datopotamab), or an antibody including one or both of the variable region of said heavy chain (SEQ ID NO:131) and the variable region of said light chain (SEQ ID NO:136, or an antibody including 1, 2, or 3 of the heavy chain CDRs of said heavy chain (CDRs 1-3: SEQ ID NOS:132-134 respectively) and/or 1, 2 or 3 of the light chain CDRs of the said light chain (CDR H1-3: SEQ ID NOS:137-139 respectively), and any of the anti-human TROP antibodies disclosed in Int'l Pub. No. WO2015098099 or U.S. Pub. No. 20210238303, or an antibody including one or both of the heavy chain and light chain variable regions of said antibodies, or an antibody including a heavy chain including 1, 2 or 3 of the heavy chain CDRs of any of said antibodies and/or a light chain including 1, 2, or 3 of the light chain CDRs of any of said antibodies.

Targeting Agents for the Treatment of Lymphomas and Lymphocytic Leukemias

A number of different antigens including CD20, CD30, CD22, CD79 and CD19 may be used to preferentially target lymphoma and lymphocytic leukemia cells.

Accordingly, targeting agents that may be employed in the present invention include at least antibodies, antibody fragments, antibody mimetics peptides, and/or small molecules that target one or more of CD30, CD22, CD79 and CD19, and which may be radiolabeled, drug-conjugated or unlabeled. Such targeting agents may be used in combination with radiolabeled CD33 targeting agents of the invention for the treatment of CD20-, CD30-, CD22-, CD79- and CD19-expressing cancers. Exemplary monoclonal antibodies include: Rituximab (Rituxan®), Tositumomab (Bexxar®), and Ofatumumab (Arzerra®) targeting CD20; Brentuximab targeting CD30; Inotuzumab targeting CD22; Polatuzumab targeting CD79; and Loncastuximab targeting CD19. Exemplary radiotherapeutics that may be used include ARCs targeting one or more of CD20, CD30, CD22, CD79 and CD19, such as radiolabeled forms of any of the aforementioned monoclonal antibodies against CD20, CD30, CD22, MUC1 Targeting Agents Exemplary MUC1 targeting agents that may be radiolabeled and used in combination or conjunction with a radiolabeled CD33 targeting agent such as any of those disclosed herein for the treatment of a proliferative disorder such as a MUC1 expressing cancer, include hTAB004 (OncoTAb, Inc.) and any of the anti-MUC1 antibodies disclosed in any of U.S. Pub. No. 20200061216 and U.S. Pat. Nos. 8,518, 405; 9,090,698; 9,217,038; 9,546,217; 10,017,580; 10,507, 251 10,517,966; 10,919,973; 11,136,410; and 11,161,911. An exemplary radiolabeled MUC1 targeting agent that may be used in combination or conjunction with a radiolabeled CD33 targeting agent according to the invention is $^{90}$Y IMMU-107 (hPAM4-Cide; Immunomedics, Inc.; Gilead Sciences, Inc.), or $^{177}$Lu or $^{225}$Ac alternatively labeled versions thereof. Radiolabeled MUC1 targeting agents may be used in the treatment of MUC1 overexpressing cancers, such as MUC1 overexpressing solid tumors, such as pancreatic cancer, locally advanced or metastatic pancreatic cancer and breast cancer, such as metastatic breast cancer, tamoxifen-resistant breast cancer, HER2-negative breast cancer, and triple negative breast cancer (TNBC).

LYPD3 (C4.4A) Targeting Agents

Exemplary LYPD3 (C4.4A) targeting agents that may be used, e.g., as radioconjugates or drug conjugates, in combination or conjunction with a radiolabeled CD33 targeting agent according to the invention include, for example, BAY 1129980 (a/k/a Lupartumab amadotin; Bayer AG, Germany) an Auristatin-based anti-C4.4A (LYPD3) ADC or its antibody component Lupartumab, IgG$_1$ mAb GT-002 (Glycotope GmbH, Germany) and any of those disclosed in U.S. Pub. No. 20210309711, 20210238292, 20210164985, 20180031566, 20170158775, or 20150030618, 20120321619, Canadian Patent Application No. CA3124332A1, Taiwan Application No. TW202202521A, or Int'l Pub. No. WO2021260208, WO2007044756, WO2022042690, or WO2020138489. Such use may, for example, be for the treatment of a LYPD3-expressing hematological or solid tumor cancer in a mammal, such as carcinomas, primary and metastatic transitional cell carcinomas (TCCs), adenocarcinomas, lung cancer, lung adenocarcinoma, non-small cell lung cancer (NSCLC), hepatocellular carcinoma (HCC), breast cancer, endocrine therapy-resistant breast cancer (such as tamoxifen-resistant breast cancer), HER2-positive breast cancer, triple negative breast cancer (TNBC), esophageal cancer, renal cell carcinomas, colorectal cancer, cervical cancer, head and neck cancer, urothelial cancer, skin cancer, melanoma, and acute myelogenous leukemia (AML).

It should be understood that wherever in this disclosure specific antibodies, specific antibody heavy chains and specific antibody light chains are disclosed, against CD33, 5T4, DR5, HER2, HER3, TROP2 or against any target, also intended to be disclosed for embodiment in or use in the various aspects of the invention are antibodies, such as but not limited to immunoglobulins, such as but not limited to IgG, that (i) include the heavy chain variable region of the disclosed antibody or heavy chain, (ii) include 1, 2 or 3 of the heavy chain CDRs (e.g., by Kabat definition) of the disclosed antibody or heavy chain, (iii) include the light chain variable region of the disclosed antibody or light chain, and/or (iv) include 1, 2 or 3 of the light chain CDRs (e.g., by Kabat definition) of the disclosed antibody or light chain. It should also be understood that wherever in this disclosure an antibody heavy chain or an antibody light chain is disclosed that includes an N-terminal leader sequence, also intended to be disclosed for embodiment in and use in the various aspects of the invention are corresponding heavy chains and corresponding light chains that lack the leader sequence.

PSMA Targeting Agents

In one aspect of the invention a radiolabeled PSMA-targeting agent is used in combination or conjunction with a radiolabeled CD33 targeting agent for the treatment of a proliferative disorder. Radiolabeled PSMA-targeting agents that may be used include, for example, a radiolabeled anti-PSMA monoclonal antibody such as J591 labeled for example with $^{177}$Lu or $^{225}$Ac or Rosopatamab labeled for example with $^{177}$Lu or $^{225}$Ac, or a radiolabeled PSMA-binding small molecule such as PSMA-617 labeled for example with $^{177}$Lu or $^{225}$Ac, PSMA I&T labeled for example with $^{177}$Lu or $^{225}$Ac, FrhPSMA-7 labeled for example with $^{177}$Lu, 64/67Cu-SAR-bisPSMA (Clarity Pharmaceuticals), CONV 01-α (Convergent Therapeutics, Inc.) labeled for example with $^{225}$Ac, $^{177}$Lu-PSMA I&T-β+$^{225}$A-CONV01-α combination (Convergent Therapeutics, Inc.), $^{131}$I-1095 (Lantheus Holdings/Progenics Pharmaceuticals, Inc.), $^{131}$I PSMA-PK-Rx (Noria Therapeutics, Inc.; Bayer), or PSMA-R2 labeled for example with $^{177}$Lu, CTT1403 (Cancer Targeted Technology LLC) labeled for example with $^{177}$Lu, PNT2002/Lu-177-PSMA-I&T (Point Biopharma Global Inc.), PNT2002/Lu-177-PSMA-I&T+$^{225}$Ac-J591, TLX591 ($^{177}$Lu-Rosopatamab; Telix Pharmaceuticals Ltd.), TLX-591-CHO (Telix Pharmaceuticals Ltd.), and $^{177}$Lu-EB-PSMA-617 (Sinotau Radiopharmaceutical). Such agents may, for example, be used in combination or conjunction with a radiolabeled CD33 targeting agent for the treatment of prostate cancer, such as metastatic prostate cancer, castration-resistant prostate cancer (CRPC), metastatic CRPC (mCRPC), and/or hormone therapy resistant prostate cancer (anti-androgen therapy resistant prostate cancer). Any of the agents that include DOTA or a DOTA derivative as a chelator may alternatively be labeled with any therapeutically active radionuclide that can be chelated by DOTA, such as $^{225}$Ac, $^{177}$Lu and $^{90}$Y.

Other Radiolabeled Cancer Targeting Agents

Still other radiolabeled cancer targeting agents may be used in combination or conjunction with a radiolabeled CD33 targeting agent, such as any of the following radiolabeled targeting agents:

a radiolabeled FAP targeting agent such as $^{177}$Lu-FAP-2286 (Clovis Oncology, Inc.) to treat, for example, solid tumors or any of the cancers disclosed herein;

a radiolabeled CCK2R targeting agents such as DEBIO 1124/$^{177}$Lu-DOTA-PP-F11N (Debiopharm International SA) to treat, for example, advanced, unresectable pulmonary extrapulmonary small cell carcinoma, and thyroid cancer such as metastatic thyroid cancer, or any of the cancers disclosed herein;

a radiolabeled CDH3 (cadherin-3, P-cadherin) targeting agent such as $^{90}$Y labeled FF-21101 (FujiFilm Holdings Corporation/FujiFilm Toyama Chemical) to treat, for example, solid tumors such as epithelial ovarian peritoneal or fallopian tube carcinoma, TNBC, head and neck squamous cell carcinoma (HNSCC), cholangiocarcinoma, pancreatic, colorectal cancer, or any of the cancers disclosed herein;

a radiolabeled IGF-R1 targeting agent such as $^{225}$Ac FPI-1434 (Fusion Pharmaceuticals, Inc.) to treat, for example, solid tumors expressing IGF-R1, or any of the cancers disclosed herein;

a radiolabeled CEACAM5 targeting agent such as $^{90}$Y-hMN14 and $^{90}$Y TF2 (Immunomedics, Inc.; Gilead Sciences Inc.) to treat, for example, solid tumors such as colon cancer, colorectal cancer, pancreatic cancer, breast cancer such as HER-negative breast cancer, and thyroid cancer such medullary thyroid carcinoma, or any of the cancers disclosed herein;

a radiolabeled CD22 targeting agent such as WIMU-102 ($^{90}$Y-epratuzumab) (Immunomedics, Inc.; Gilead Sciences Inc.) to treat, for example, hematological malignancies such as CD22-positive acute lymphoblastic leukemia, non-Hodgkin lymphoma (NHL), stage III/IV DLBCL, follicular lymphoma, or any of the cancers disclosed herein;

a radiolabeled SSTR2 targeting agent such as Lutathera™ (lutetium Lu 177 dotatate; 177Lu-DOTA0-Tyr3-Octreotate; Novartis), Lutathera™ (lutetium Lu 177 dotatate)+$^{90}$Y-DOTATATE combination (Novartis), $^{177}$LU-OPS201 (Ipsen Pharmaceuticals) the combination $^{177}$LU-OPS201/$^{177}$Lu-IPN01072 (Ipsen Pharmaceuticals), EB TATE ($^{177}$Lu-DOTA-EB-TATE; Molecular Targeting Technologies, Inc.), ORM2110 (AlphaMedix™; Orano Med), and PNT2003 labeled for example with $^{177}$Lu (Point Biopharma Global Inc.), for the treatment of SSTR2 expressing cancers such as solid tumors, for example, neuroendocrine tumors, small cell lung cancer, breast cancer, prostate cancer such as metastatic prostate cancer, such as metastatic castration-resistant prostate cancer, neuroendocrine tumors, gastroenteropancreatico neuroendocrine tumors (GEP-NET), as well as such as locally advanced or metastatic forms thereof, or any of the cancers disclosed herein;

a radiolabeled SSTR2 and SSTR5 targeting agent such as Solucin™ ($^{177}$Lu-Edotreotide; Isotopen Technologien Munchen AG (ITM)) to treat, for example, neuroendocrine tumors, or any of the cancers disclosed herein;

a radiolabeled Neurotensin receptor type 1 (NTSR1) targeting agent such as $^{177}$Lu-IPN01087/$^{177}$Lu-3BP-227 or (Ipsen Pharmaceuticals) to treat, for example, solid tumors expressing NTSR1 such as pancreatic ductal adenocarcinoma, colorectal cancer, gastric cancer, squamous cell carcinoma of the head and neck, bone cancer, advanced cancer, recurrent disease, metastatic tumors, or any of the cancers disclosed herein;

a radiolabeled human Kallikrein-2 (hK2) targeting agent such as JNJ-69086420 (Janssen/Janssen Pharmaceutica NV) labeled for example with $^{225}$Ac, to treat, for example, prostate cancer such as locally advance or metastatic prostate cancer, or any of the cancers disclosed herein;

a radiolabeled NET (via norepinephrine transporter) targeting agent such as $^{131}$I-MIBG (Jubilant Radioharma) to treat, for example, neuroblastoma such as relapsed/refractory neuroblastoma, or any of the cancers disclosed herein;

a radiolabeled neuroepinephrine transporter targeting agents such as Azedra™ (iobenguane $^{131}$I; Lantheus Holdings/Progenics Pharmaceuticals, Inc.) to treat, for example, glioma, paraglioma, malignant pheochromocytoma/paraganglioma, and malignant relapsed/refractory pheochromocytoma/paraganglioma, or any of the cancers disclosed herein;

a radiolabeled Integrin αVβ6 targeting agent such as DOTA-ABM-5G, αVβ6 Binding Peptide (ABP; Luminance Biosciences, Inc.) labeled for example with $^{177}$Lu, $^{225}$Ac or $^{90}$Y, to treat, for example, solid tumors such as pancreatic cancer, or any of the cancers disclosed herein;

a radiolabeled CD37 targeting agent such as Betalutin™ ($^{177}$Lu-lilotomab satetraxetan; Nordic Nanovector ASA) to treat, for example, hematological malignancies such as lymphomas, such as follicular lymphoma or non-Hodgkin lymphoma (NHL) such as relapsed and/or refractory forms thereof, or any of the cancers disclosed herein;

a radiolabeled GRPR targeting agent such as $^{177}$Lu-NeoB (Novartis) and $^{212}$Pb-DOTAM-GRPR1 (Orano Med) to treat GRPR-expressing cancers, for example, prostate cancer, such as advanced prostate cancer, locally advanced prostate cancer, metastatic prostate cancer, and castration-resistant prostate cancer, or any of the cancers disclosed herein;

a radiolabeled CXCR4 targeting agents such as PentixaTher™ (PentixaPharm GmbH) labeled with $^{177}$Lu, $^{90}$Y or $^{225}$Ac to treat, for example, lymphoproliferative or myeloid malignancies, including relapsed and/or refractory forms thereof, or any of the cancers disclosed herein;

a radiolabeled Tenascin-C targeting agent such as $^{131}$I-F16SIP (Philogen S.p.A.) to treat, for example, solid tumors or hematological malignancies such as any of those disclosed herein;

a radiolabeled Fibronectin extradomain B (EBD) targeting agent such as $^{131}$I-L19SIP (Philogen S.p.A.)) to treat, for example, solid tumors such as solid tumor brain metastases and non-small cell lung cancer (NSCLC), or any of the cancers disclosed herein;

a radiolabeled LAT-1 targeting agent such as 4-$^{131}$Iodo-L-phenylalanine (Telix Pharmaceuticals Ltd.) to treat, for example, glioblastoma such as recurrent glioblastoma, or any of the cancers disclosed herein;

a radiolabeled Carbonic Anhydrase IX (CAIX) targeting agent such as radiolabeled Girentuxumab (cG250) such as DOTA conjugated Girentuxumab (cG250) labeled for example with $^{177}$Lu (such as TLX250; Telix Pharmaceuticals Ltd.), $^{225}$Ac or $^{90}$Y, to treat, for example, renal cell carcinoma, such as ccRCC, or any of the cancers disclosed herein;

a radiolabeled CD66 targeting agent such as $^{90}$Y-besilesomab ($^{90}$Y-anti-CD66-MTR; Telix Pharmaceuticals Ltd.) to treat, for example, leukemias, myelomas and lymphomas, such as any of those disclosed herein including pediatric and adult forms, or any of the cancers disclosed herein;

a radiolabeled B7-H3 targeting agents such as radiolabeled omburtumab, such $^{131}$I-8H9 (131I-omburtumab; Y-mAbs Therapeutics, Inc.) and $^{177}$Lu-omburtamab (Y-mAbs Therapeutics, Inc.) to treat, for example, gliomas such as non-progressive diffuse pontine gliomas, such as non-progressive diffuse pontine gliomas previously treated with external beam radiation therapy, brain tumors, central nervous system tumors, neuroblastomas, sarcomas, leptomeningeal metastasis from solid tumors, and medulloblastoma, including in pediatric and adult forms, or any of the cancers disclosed herein;

a radiolabeled NKG2D ligand targeting agent such as a radiolabeled recombinant human NKG2D Fc chimeric protein, for example, Catalog No. 1299-NK from Biotechne (R&D Systems, Inc., Minneapolis, MN, USA) which includes Phe78-Val216 of Human NKG2D (Accession #P26718) or a radiolabeled recombinant human NKG2D Fc chimeric protein including SEQ ID NO:140 plus/minus an amino-terminal histidine tag such as $(His)_6$, or a radiolabeled antibody or antigen-binding fragment thereof against an NKG2D ligand such as MICA, MICB, RAET1E/ULBP4, RAET1G/ULBP5, RAET1H/ULBP2, RAET1/ULBP1, RAET1L/ULBP6, or RAET1N/ULBP3—to treat, for example solid tumors or hematological malignancies expressing one or more NKG2D ligands, or any of the cancers disclosed herein;

a radiolabeled GD2 targeting agent such as GD2-SADA: $^{177}$Lu-DOTA (Y-mAbs Therapeutics, Inc.) to treat, for example, SCLC, melanoma, sarcoma or any of the cancers disclosed herein;

a radiolabeled Folate receptor alpha (FOLR1) targeting agent such as a radiolabeled anti-FOLR1 antibody such as radiolabeled Mirvetuximab or Farletuzumab, to treat, for example, solid cancers such as ovarian cancer, lung cancer, NSCLC, breast cancer, TNBC, brain cancer, glioblastoma, colorectal cancer or any of the cancers disclosed herein;

a radiolabeled Nectin-4 targeting agent, such as a radiolabeled anti-Nectin-4 monoclonal antibody such as radiolabeled Enfortumab or radiolabeled forms of any of the anti-Nectin-4 antibodies or targeting agents disclosed in U.S. Pub. No. 20210130459, U.S. Pub. No. 20200231670, U.S. Pat. No. 10,675,357, or Int'l Pub. No. WO2022051591, to treat, for example, solid tumors such as urothelial carcinoma, bladder carcinoma, breast cancer, TNBC, lung cancer, NSCLC, colorectal cancer, pancreatic cancer, endometrial cancer, ovarian cancer or any of the cancers disclosed herein;

a radiolabeled CUB-domain containing protein 1 (CDCP1) targeting agent such as a radiolabeled monoclonal antibody such as radiolabeled forms of any of the CDCP1 targeting agents and antibodies disclosed in U.S. Pub. No. 20210179729, U.S. Pub. No. 20200181281, U.S. Pub. No. 20090196873, U.S. Pat. Nos. 8,883,159, 9,346,886, or Int'l Pub No. WO2021087575, to treat, for example, solid cancers such as breast cancer, TNBC, lung cancer, colorectal cancer, ovarian cancer, kidney cancer, liver cancer, HCC, pancreatic cancer, skin cancer, melanoma, or a hematological malignancy such as acute myeloid leukemia, or any of the cancers disclosed herein;

a radiolabeled Glypican-3 (GPC3) targeting agent such as a radiolabeled anti-GPC3 mAb such as the radiolabeled humanized IgG₁ mAb GC33 (a/k/a Codrituzumab; commercially available as Catalog No. TAB-H14 from Creative Biolabs), such as $^{225}$Ac-Macropa-GC33 (Bell et al., Glypican-3-Targeted Alpha Particle Therapy for Hepatocellular Carcinoma. Molecules. 2020 Dec. 22; 26(1):4.) or a radiolabeled form of any of the anti-GPC3 antibodies or other targeting agents disclosed in U.S. Pat. Nos. 10,118,959, 10,093,746, 10,752,697, 9,932,406, 9,217,033, 8,263,077, 7,871,613, 7,867,734, U.S. Pub. No. 20190046659, U.S. Pub. No. 20180243451, U.S. Pub. No. 20170369561, or U.S. Pub. No. 20150315278, to treat GPC3-expressing cancers such as hepatocellular carcinoma, ovarian clear cell carcinoma, melanoma, NSCLC, squamous cell carcinoma of the lung, hepatoblastoma, nephroblastoma (Wilms tumor), yolk sac tumor, gastric carcinoma, colorectal carcinoma, head and neck cancer, and breast cancer.

a radiolabeled urokinase plasminogen activator receptor (uPAR) targeting agent, such as a radiolabeled monoclonal antibody such as radiolabeled MNPR-101 (huATN-658) such as MNPR-101-PTCA-Ac225 (Monopar Therapeutics, Inc., Wilmette, IL, USA) or radiolabeled forms of any of the anti-uPAR antibodies or targeting agents disclosed in U.S. Pat. No. 9,029,509, U.S. Pub. No. 20080199476, U.S. Pub. No. 20040204348 or Int'l Pub. No. WO2021257552, to treat, for example, solid cancers or hematological malignancies such as any of those disclosed herein; and/or a radiolabeled LewisY antigen (LeY) targeting agent such as a radiolabeled anti-LeY monoclonal antibody such as radiolabeled forms of 3S1931 and/or of a humanized version thereof such as Hu3S1933, or of any of monoclonal antibodies B34, BR55-2, BR55/BR96, and IGN 133, or antigen binding fragments of any of the preceding antibodies, to treat, for example, solid tumors such as squamous cell lung carcinoma, lung adenocarcinoma, ovarian carcinoma, or colorectal adenocarcinoma or any of the cancers disclosed herein.

In still further embodiments of the invention, a radiolabeled targeting agent used in combination or conjunction a radiolabeled CD33 targeting agent for the treatment of a cancer or proliferative disorder such as any of those disclosed herein in a mammal, such as a human, includes a phospholipid-based cancer targeting agent. In certain embodiments, the phospholipid-based cancer targeting agent includes any of the radioactive phospholipid metal chelates disclosed in U.S. Pub. No. 20200291049, incorporated by reference herein, such as but not limited to

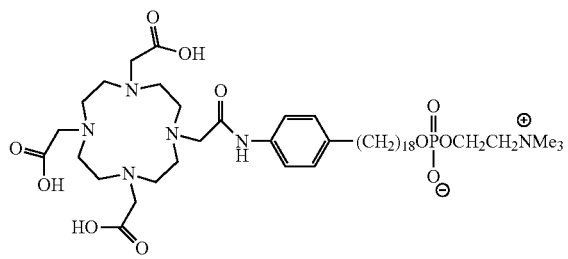

(a/k/a NM600) or a pharmaceutically acceptable salt thereof, chelated with a radionuclide, such as $^{225}$Ac, $^{177}$Lu, or $^{90}$Y.

In certain aspects, the lipid based radiolabeled targeting agent used in combination or conjunction with a CD33 targeting agent includes any of the radiolabeled phospholipid compounds disclosed in U.S. Pub. No. 20140030187 or U.S. Pat. No. 6,417,384, each incorporated by reference herein, such as but not limited to

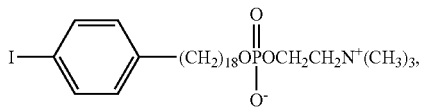

i.e., 18-(p-iodophenyl)octadecyl phosphocholine, wherein iodine is $^{131}$I (a/k/a NM404 I-131, and CLR 131), or a pharmaceutically acceptable salt thereof. In certain aspects, the phospholipid-based radiolabeled targeting agent used in conjunction with one or more CD47 blockades includes any of the phospholipid drug conjugate compounds disclosed in U.S. Pat. No. 9,480,754, incorporated by reference herein.

Administration Regimes for the Radiotherapeutic(s)

While one exemplary radiotherapeutic disclosed herein includes only one or more radiolabeled CD33 targeting agents, aspects involving combination use of the radiolabeled CD33 targeting agent(s) with one or more radiolabeled targeting agents against different proliferative disorder-associated antigens are also provided. In addition, further aspects provide a multi-specific CD33 targeting agent, such as an antibody, having CD33 as one target specificity and at least one other target specificity against a different cancer-associated antigen such as but not limited to DR5, 5T4, HER2, HER3, or TROP2. In certain aspects, a radiolabeled multi-specific targeting agent may include a multi-specific antibody against a first epitope of CD33 and one or more further epitopes of CD33, and/or against an epitope of CD33 and an epitope of one or more additional different antigens such as but not limited to DR5, 5T4, HER2, HER3, or TROP2. Thus, the ARC may include a multi-specific antibody including at least a first target recognition component which specifically binds to an epitope of a first epitope of CD33, and one or more further target recognition components that specifically bind to one or more different epitopes of CD33 and/or to one or more different (non-CD33) antigens such as but not limited to DR5, 5T4, HER2, HER3, or TROP2.

Different antigens that may be targeted (in addition to CD33) using radiolabeled targeting agents, drug-conjugated targeting agents such as ADCs, or as unlabeled targeting agents if therapeutically active, or targeted by use of a bi- or multi-specific targeting agent targeting CD33 and the different antigen(s) include, for example, those differentially expressed on cells involved in hematological diseases or disorders, and/or cells involved in solid tumors. Different antigens that may be targeted include, for example, DR5, 5T4, HER2 (ERBB2; Her2/neu), HER3, TROP2, mesothelin, TSHR, CD19, CD123, CD22, CD30, CD45, CD171, CD138, CS-1, CLL-1, GD2, GD3, B-cell maturation antigen (BCMA), T antigen (T Ag), Tn Antigen (Tn Ag), prostate specific membrane antigen (PSMA), ROR1, FLT3, fibroblast activation protein (FAP), a Somatostatin receptor, Somatostatin Receptor 2 (SSTR2), Somatostatin Receptor 5 (SSTR5), gastrin-releasing peptide receptor (GRPR), NKG2D ligands (such as MICA, MICB, RAET1E/ULBP4, RAET1G/ULBP5, RAET1H/ULBP2, RAET1/ULBP1, RAET1L/ULBP6, and RAET1N/ULBP3), tenascin, tenascin-C, CEACAM5, Cadherin-3, CCK2R, Neurotensin receptor type 1 (NTSR1), human Kallikrein 2 (hK2), norepinephrine transporter, Integrin alpha-V-beta-6, CD37, CD66, CXCR4, Fibronectin extradomain B (EBD), LAT-1, Carbonic anhydrase IX (CAIX), B7-H3 (a/k/a CD276), Disialoganglioside GD2 Antigen (GD2), calreticulin, phosphatidylserine, GRP78 (BiP), TAG72, CD38, CD44v6, CEA, EPCAM, B7H3, KIT, IL-13Ra2, interleukin-11 receptor a (IL-1 1Ra), PSCA, PRSS21, VEGFR2, LewisY, CD24, platelet-derived growth factor receptor-beta (PDGFR-beta), SSEA-4, CD20, Folate receptor alpha (FRa), LYPD3 (C4.4A), MUC1, epidermal growth factor receptor (EGFR), EGFRvIII, NCAM, Prostase, PAP, ELF2M, Ephrin B2, IGF-I receptor, CAIX, LMP2, gplOO, bcr-abl, tyrosinase, EphA2, Fucosyl GM1, sLe, GM3, TGS5, HMWMAA, o-acetyl-GD2, Folate receptor beta, TEM1/CD248, TEM7R, CLDN6, GPRC5D, CXORF61, CD97, CD 179a, ALK, Polysialic acid, PLAC1, GloboH, NY-BR-1, UPK2, HAVCR1, ADRB3, PANX3, GPR20, LY6K, OR51E2, TARP, WT1, NY-ESO-1, LAGE-la, MAGE-A1, legumain, HPV E6,E7, MAGE A1, MAGEA3, MAGEA3/A6, ETV6-AML, sperm protein 17, XAGE1, Tie 2, MAD-CT-1, MAD-CT-2, Fos-related antigen 1, prostein, survivin and telomerase, PCTA-1/Galectin 8, KRAS, MelanA/MART1, Ras mutant, hTERT, sarcoma translocation breakpoints, ML-IAP, ERG (TMPRSS2 ETS fusion gene), NA17, PAX3, Androgen receptor, Cyclin B 1, MYCN, RhoC, TRP-2, CYP1B 1, BORIS, SART3, PAX5, OY-TES 1, LCK, AKAP-4, SSX2, RAGE-1, human telomerase reverse transcriptase, RU1, RU2, intestinal carboxyl esterase, mut hsp70-2, CD79a, CD79b, CD72, LAIR1, FCAR, LILRA2, CD300LF, CLEC12A, BST2, EMR2, LY75, GPC3, FCRL5, GPA7, and IGLL1.

In bi-/multi-specific antibody aspects of the invention, the first target recognition component may, for example, include one of: a first full-length heavy chain and a first full-length light chain, a first Fab fragment, or a first single-chain variable fragment (scFvs). Moreover, the first target recognition component may be derived from any of the monoclonal antibodies disclosed herein that are directed against CD33. Similarly, the second target recognition component may include one of: a second full length heavy chain and a second full length light chain, a second Fab fragment, or a second single-chain variable fragment (scFvs) and may, for example, be derived from targeting agents targeting, DR5, 5T4, HER2, HER3, TROP2, or any of the aforementioned different cancer-associated antigens.

Also provided are methods that include administration of one or more antibody radioconjugates (ARCs) against CD33 (which may have different epitope specificities) and administration of (i) one or more further ARCs against one or more different (non-CD33) antigens, and/or (i) at least two different ARCs against different epitopes of the same different (non-CD33) antigen.

According to certain aspects, the effective amount of the radiotherapeutic(s), such as any of the ARCs disclosed herein, is a maximum tolerated dose (MTD) of the single agent or combination.

According to certain aspects, when more than one ARC is administered, the ARCs may be administered at the same time. As such, according to certain aspects of the present invention, the ARCs may be provided in a single composition. Alternatively, the two ARCs may be administered sequentially. As such, a first ARC may be administered before a second ARC, after the second ARC, or both before and after the second ARC. Moreover, the second ARC may be administered before the first ARC, after the first ARC, or both before and after the first ARC.

According to certain aspects, the ARC may be administered according to a dosing schedule selected from the group consisting of one every 7, 10, 12, 14, 20, 24, 28, 35, and 42 days throughout a treatment period, wherein the treatment period includes at least two doses.

According to certain aspects, the ARC may be administered according to a dose schedule that includes 2 doses, such as on days 1 and 5, 6, 7, 8, 9, or 10 of a treatment period, or days 1 and 8 of a treatment period.

Administration of the ARCs of the present invention, in addition to other therapeutic agents, may be provided in a number of ways depending upon whether local or systemic treatment is desired and upon the area to be treated. Administration may be intratracheal, intranasal, epidermal and transdermal, oral or parenteral. Parenteral administration includes intravenous, intra-arterial, subcutaneous, intraperitoneal or intramuscular injection or infusion; or intracranial, e.g., intrathecal or intraventricular, administration. In some embodiments a slow-release preparation including the targeting agents(s) and/or other therapeutic agents may be administered. The various agents may be administered as a single treatment or in a series of treatments that continue as needed and for a duration of time that causes one or more symptoms of the cancer to be reduced or ameliorated, or that achieves another desired effect.

The dose(s) may vary, for example, depending upon the identity, size, and condition of the subject, further depending upon the route by which the composition is to be administered and the desired effect. Appropriate doses of a therapeutic agent depend upon the potency with respect to the expression or activity to be modulated. The therapeutic agents may, for example, be administered to an animal (e.g., a human) at a relatively low dose at first, with the dose subsequently increased until an appropriate response is obtained.

The radiotherapeutics disclosed herein, such as any of the ARCs, may be administered simultaneously or sequentially with the one or more additional therapeutic agents. Moreover, when more than one additional therapeutic agent is included, the additional therapeutic agents may be administered simultaneously or sequentially with each other and/or with the radiotherapeutic.

Radiolabeling the Targeting Agent(s)

The targeting agent(s) may be labeled with a radioisotope such as an alpha emitter (e.g., $^{225}$Ac) through conjugation of a chelator molecule, and chelation of the radioisotope.

According to certain aspects, the radiotherapeutic may be an antibody that may have reduced disulfide bonds such as by using reducing agents, which may then be converted to dehydroalanine for the purpose of conjugating with a bifunctional chelator molecule.

According to certain aspects, the radiotherapeutic may be an antibody that may have reduced disulfide bonds, such as by use of reducing agents, followed by conjugation via aryl bridges with a bifunctional chelator molecule. For example, according to certain aspects a linker molecule such as 3,5-bis(bromomethyl)benzene may bridge the free sulfhydryl groups on the antibody.

According to certain aspects, the radiotherapeutic may be an antibody that may have certain specific existing amino acids replaced with cysteine(s) that then can be used for site-specific labeling, for example, using the compositions and methods described in U.S. Pat. No. 11,000,604, incorporated by reference herein.

According to certain aspects, the radiotherapeutic may be radiolabeled through site-specific conjugation of suitable bifunctional chelators. Exemplary chelator molecules that may be used include at least p-SCN-Bn-DOTA, $NH_2$-DOTA, $NH_2$—$(CH_2)_{1-20}$-DOTA, $NH_2$-$(PEG)_{1-20}$-DOTA, HS-DOTA, HS—$(CH_2)_{1-20}$-DOTA, HS-$(PEG)_{1-20}$-DOTA, dibromo-S-$(CH_2)_{1-20}$-DOTA, dibromo-S-$(PEG)_{1-20}$-DOTA, p-SCN-Bn-DOTP, $NH_2$-DOTP, $NH_2$—$(CH_2)_{1-20}$-DOTP, $NH_2$-$(PEG)_{1-20}$-DOTP, HS-DOTP, HS-$(CH_2)_{1-20}$-DOTP, HS-$(PEG)_{1-20}$-DOTP, dibromo-S-$(CH_2)_{1-20}$-DOTP, and dibromo-S-$(PEG)_{1-20}$-DOTP.

According to certain aspects, the chelator molecules may be attached to the radiotherapeutic targeting agent through a linker molecule.

Methods for conjugation and chelation of an exemplary radionuclide are discussed in more detail in Example 1.

CD47 Blockades

The additional agent(s) administered with the radiolabeled CD33 targeting agent may include one or more CD47 blockades, such as any agent that interferes with, or reduces the activity and/or signaling between CD47 (e.g., on a target cell) and SIRPα (e.g., on a phagocytic cell) through interaction with either CD47 or SIRPα. Non-limiting examples of suitable CD47 blockades include CD47 and/or SIRPα reagents, including without limitation SIRPα polypeptides, anti-SIRPα antibodies, soluble CD47 polypeptides, and anti-CD47 antibodies or antibody fragments.

As used herein, the term "CD47 blockade" refers to any agent that reduces the binding of CD47 (e.g., on a target cell) to SIRPα (e.g., on a phagocytic cell) or otherwise down-regulates the "don't eat me" signal of the CD47–. SIRPα pathway. Non-limiting examples of suitable anti-CD47 blockades include SIRPα reagents, including without limitation SIRPα polypeptides, anti-SIRPα antibodies, soluble CD47 polypeptides, and anti-CD47 antibodies or antibody fragments. According to certain aspects, a suitable anti-CD47 agent (e.g. an anti-CD47 antibody, a SIRPα reagent, etc.) specifically binds CD47 to reduce the binding of CD47 to SIRPα.

A CD47 blockade agent for use in the methods of the invention may, for example, up-regulate phagocytosis by at least 10% (e.g., at least 20%, at least 30%, at least 40%, at least 50%, at least 60%, at least 70%, at least 80%, at least 90%, at least 100%, at least 120%, at least 140%, at least 160%, at least 180%, or at least 200%) compared to phagocytosis in the absence of the agent. Similarly, an in vitro assay for levels of tyrosine phosphorylation of SIRPα may, for example, show a decrease in phosphorylation by at least 5% (e.g., at least 10%, at least 15%, at least 20%, at least 30%, at least 40%, at least 50%, at least 60%, at least 70%, at least 80%, at least 90%, or 100%) compared to phosphorylation observed in absence of the agent.

According to certain aspects, a SIRPα reagent may include the portion of SIRPα that is sufficient to bind CD47 at a recognizable affinity, which normally lies between the signal sequence and the transmembrane domain, or a fragment thereof that retains the binding activity. Accordingly, suitable CD47 blockades that may be employed include any of the SIRPα-IgG Fc fusion proteins and others disclosed in U.S. Pat. No. 9,969,789 including without limitation the SIRPα-IgG Fc fusion proteins TTI-621 and TTI-622 (Trillium Therapeutics, Inc.), both of which preferentially bind CD47 on tumor cells while also engaging activating Fc receptors. A SIRPα-IgG Fc fusion protein including the amino acid sequence SEQ ID NO:141, SEQ ID NO:142, or SEQ ID NO:143 may, for example, be used. Still other SIRPα Fc domain fusions proteins that may be used include ALX148 from Alx Oncology or any of those disclosed in Int'l Pub. No WO2017027422 or U.S. Pat. No. 10,696,730.

According to certain aspects, an anti-CD47 agent includes an antibody that specifically binds CD47 (i.e., an anti-CD47 antibody) and reduces the interaction between CD47 on one cell (e.g., an infected cell) and SIRPα on another cell (e.g., a phagocytic cell). Non-limiting examples of suitable antibodies include clones B6H12, 5F9, 8B6, and C3 (for example as described in International Pub. No. WO 2011/143624). Suitable anti-CD47 antibodies include fully human, humanized or chimeric versions of such antibodies.

Exemplary human or humanized antibodies useful for in vivo applications in humans due to their low antigenicity include at least monoclonal antibodies against CD47, such as Hu5F9-G4, a humanized monoclonal antibody available from Gilead as Magrolimab (Sikic, et al. (2019) Journal of Clinical Oncology 37:946); Lemzoparlimab and TJC4 from I-Mab Biopharma; AO-176 from Arch Oncology, Inc; AK117 from Akesobio Australia Pty; IMC-002 from Innovent Biologics; ZL-1201 from Zia Lab; SHR-1603 from Jiangsu HengRui Medicine Co.; and SRF231 from Surface Oncology. Bispecific monoclonal antibodies are also available, such as IBI-322, targeting both CD47 and PD-L1 from Innovent Biologics. An anti-huCD47 antibody that may be used in the various aspects of the invention may, for example, include the heavy chain set forth in SEQ ID NO:145 and the light chain set forth in SEQ ID NO:146, or be an antibody having a heavy chain including the three CDRs present in SEQ ID NO:145 and a light chain including the three CDRs present in SEQ ID NO:146, or be an antibody fragment such as an Fab, Fab2 or corresponding scFv molecule of any of the aforementioned antibodies.

AO-176, in addition to inducing tumor phagocytosis through blocking the CD47-SIRPα interaction, has been found to preferentially bind tumor cells versus normal cells (particularly RBCs where binding is negligible) and directly kills tumor versus normal cells.

Antibodies against SIRPα may also be used as CD47 blockades. Without limitation, anti-SIRPα antibodies (also referred to as SIRPα antibodies herein) that may be used in or embodied in any of the aspects of the invention include but are not limited to the following anti-SIRPα antibodies, antibodies that include one or both of the heavy chain and light chain variable regions of the following anti-SIRPα antibodies, antibodies that include one or both of the heavy chain and the light chain CDRs of any of the following anti-SIRPα antibodies, and antigen-binding fragments of any of said anti-SIRPα antibodies:

(1) ADU-1805 (Sairopa B. V.; Aduro) and any of the SIRPα antibodies disclosed in Intl. Pub. No. WO2018190719 or U.S. Pat. No. 10,851,164;

(2) AL008 (Alector LLC) and any of the SIRPα antibodies disclosed in Intl. Pub. No. WO2018107058, U.S. Pub. No. 20190275150, or U.S. Pub. No. 20210179728;

(3) AL008 (Apexigen, Inc.) and any of the SIRPα antibodies disclosed in Intl. Pub. No. WO2021174127 or U.S. App. No. 63/108,547;

(4) SIRP-1 and SIRP-2 (Arch Oncology, Inc.) and any of the SIRPα antibodies disclosed in Intl. Pub. No. WO2021222746, U.S. App. No. 63/107,200 or U.S. Pub. No. 20200297842;

(5) OSE-172 (a/k/a BI 765063; Boehringer Ingelheim) and any of the SIRPα antibodies disclosed in Intl. Pub. No. WO2017178653 or U.S. Pub. No. 20190127477;
(6) CC-95251 (Bristol Myers Squibb; Celgene) and any of the SIRPα antibodies disclosed in Intl. Pub. No. WO2020068752 or U.S. Pub. No. 20200102387;
(7) ES004 (Elpiscience Biopharma) and any of the SIRPα antibodies disclosed in Intl. Pub. No. WO2021032078 or U.S. Pub. No. 20210347908;
(8) FSI-189 (Gilead Sciences, Inc.; Forty Seven) and any of the SIRPα antibodies disclosed in Intl. Pub. No. WO2019023347, U.S. Pat. No. 10,961,318 or U.S. Pub. No. 20210171654;
(9) BYON4228 (Byondis B. V.; Synthon) and any of the SIRPα antibodies disclosed in Intl. Pub. No. WO2018210793, Intl. Pub. No. WO2018210795, or U.S. Pub. No. 20210070874;
(10) any of the SIRPα antibodies disclosed in Intl. Pub. No. WO2018057669, U.S. Pat. No. 11,242,404 or U.S. Pub. No. 20220002434 (Alexo Therapeutics Inc., now ALX Oncology Inc.);
(11) any of the SIRPα antibodies disclosed in Intl. Pub. No. WO2015138600, U.S. Pat. No. 10,781,256 or 10,081,680 (Leland Stanford Junior University);
(12) BR105 (Bioray Pharma); or
(13) BSI-050 (Biosion, Inc.).

The CD47 blockade may alternatively, or additionally, include agents that modulate the expression of CD47 and/or SIRPα, such as phosphorodiamidate morpholino oligomers (PMO) that block translation of CD47 such as MBT-001 (PMO, morpholino, Sequence: 5'-CGT-CACAGGCAGGACCCACTGCCCA-3') [SEQ ID NO:144] or any of the PMO oligomer CD47 inhibitors disclosed in any of U.S. Pat. Nos. 8,557,788, 8,236,313, 10,370,439 and Int'l Pub. No. WO2008060785.

Small molecule inhibitors of the CD47-SIRPα axis may also be used, such as RRx-001 (1-bromoacetyl-3,3 dinitroazetidine) from EpicentRx and Azelnidipine (CAS number 123524-52-7), or pharmaceutically acceptable salts thereof. Such small molecule CD47 blockades may, for example, be administered at a dose of 5-100 mg/m$^2$, 5-50 mg/m$^2$, 5-25 mg/m$^2$, 10-25 mg/m$^2$, or 10-20 mg/m$^2$, or in any of the dose ranges or at any of the doses described herein. Administration of RRx-001 may, for example, be once or twice weekly and be by intravenous infusion. The duration of administration may, for example, be at least four weeks.

Various CD47 blockades that may be used are found in Table 1 of Zhang, et al., (2020), *Frontiers in Immunology* vol 11, article 18, and in Table 3 below.

TABLE 3

| Company | Approach | Agent/Program |
|---|---|---|
| Akesobio Australia Pty Ltd | CD47 mAb | AK117 |
| Arch Oncology (Tioma Therapeutics) | CD47 mAb | AO-176 |
| Elpiscience Biopharma Inc. | CD47 | ES004 |
| EpicentRx | Small molecule inhibitor of dinitroazetidine hypoxia sensor to downregulate CD47/SIRPα | RRx-001 (1-bromoacetyl-3,3 dinitroazetidine) |
| ImmuneOncia Therapeutics | CD47 mAb human | IMC-002 |
| Innovent | CD47 mAb | IBI-188 (CD47 mAb) |

TABLE 3-continued

| Company | Approach | Agent/Program |
|---|---|---|
| Biologics | CD47/PD-L1 bispecific mAb | IBI-322 (Bispecific) |
| OSE | SIRPα mAb | BI 765063 (OSE-172) |
| Zai Lab | CD47 mAb | ZL-1201 |
| Alx Oncology | High-affinity SIRPα-Fc | ALX148 |
| Gilead/Forty Seven | CD47 mAb SIRPα mAb | Magrolimab FSI-189 |
| I-Mab Biopharma | CD47 mAb | TJC4 |
| Jiangsu HengRui Medicine Co., Ltd. | CD47 mAb | SHR-1603 |
| Surface Oncology | CD47 mAb human | SRF231 |
| Morphiex | CD47 targeting phosphorodiamidate morpholino oligomers | MBT-001 |

Therapeutically effective doses of an anti-CD47 antibody or other protein CD47 blockade may, for example, be a dose that leads to sustained serum levels of the protein of about 40 μg/ml or more (e.g., about 50 ug/ml or more, about 60 ug/ml or more, about 75 ug/ml or more, about 100 ug/ml or more, about 125 ug/ml or more, or about 150 ug/ml or more). Therapeutically effective doses or administration of a CD47 blockade, such as an anti-CD47 antibody or SIRPα fusion protein or small molecule, include, for example, amounts of 0.05-10 mg/kg (agent weight/subject weight), such as at least 0.1 mg/kg, 0.5 mg/kg, 1.0 mg/kg, 1.5 mg/kg, 2.0 mg/kg, 2.5 mg/kg, 3.0 mg/kg, 3.5 mg/kg, 4.0 mg/kg, 4.5 mg/kg, 5.0 mg/kg, 5.5 mg/kg, 6.0 mg/kg, 6.5 mg/kg, 7.0 mg/kg, 7.5 mg/kg, 8.0 mg/kg, 8.5 mg/kg, 9.0 mg/kg; or not more than 10 mg/kg, 9.5 mg/kg, 9.0 mg/kg, 8.5 mg/kg, 8.0 mg/kg, 7.5 mg/kg, 7.0 mg/kg, 6.5 mg/kg, 6.0 mg/kg, 5.5 mg/kg, 5.0 mg/kg, 4.5 mg/kg, 4.0 mg/kg, 3.5 mg/kg, 3.0 mg/kg, 2.5 mg/kg, 2.0 mg/kg, 1.5 mg/kg, 1.0 mg/kg, or any combination of these upper and lower limits. Therapeutically effective doses of a small molecule CD47 blockade such as those disclosed herein also, for example, include 0.01 mg/kg to 1,000 mg/kg and any subrange or value of mg/kg therein such as 0.01 mg/kg to 500 mg/kg or 0.05 mg/kg to 500 mg/kg, or 0.5 mg/kg to 200 mg/kg, or 0.5 mg/kg to 150 mg/kg, or 1.0 mg/kg to 100 mg/kg, or 10 mg/kg to 50 mg/kg.

According to certain aspects, the anti-CD47 agent is a soluble CD47 polypeptide that specifically binds SIRPα and reduces the interaction between CD47 on one cell (e.g., an infected cell) and SIRPα on another cell (e.g., a phagocytic cell). A suitable soluble CD47 polypeptide can bind SIRPα without activating or stimulating signaling through SIRPα because activation of SIRPα would inhibit phagocytosis. Instead, suitable soluble CD47 polypeptides facilitate the preferential phagocytosis of infected cells over non-infected cells. Those cells that express higher levels of CD47 (e.g., infected cells) relative to normal, non-target cells (normal cells) will be preferentially phagocytosed. Thus, a suitable soluble CD47 polypeptide specifically binds SIRPα without activating/stimulating enough of a signaling response to inhibit phagocytosis. In some cases, a suitable soluble CD47 polypeptide can be a fusion protein (for example, as described in U.S. Pub. No. 20100239579). Applicant's U.S. Pub. No. 20220211886 and U.S. provisional application Ser. No. 63/104,386 filed Oct. 22, 2020, each entitled Combination Radioimmunotherapy and CD47 Blockade in the Treatment of Cancer are incorporated by reference in their entireties herein.

Other Immune Checkpoint Inhibitors

The following further immune checkpoint inhibitors may be used in combination with a radiolabeled CD33 targeting agent.

The immune checkpoint therapy may, for example, include an antibody against PD-1 such as nivolumab, or any of the inhibitors of PD-1 biological activity (or its ligands) disclosed in U.S. Pat. No. 7,029,674. Other exemplary antibodies against PD-1 that may be used include: Anti-mouse PD-1 antibody Clone J43 (Cat #BE0033-2) from BioXcell; Anti-mouse PD-1 antibody Clone RMP1-14 (Cat #BE0146) from BioXcell; mouse anti-PD-1 antibody Clone EH12; Merck's MK-3475 anti-mouse PD-1 antibody (Keytruda, pembrolizumab, lambrolizumab); and Anaptys-Bio's anti-PD-1 antibody, known as ANB011; antibody MDX-1 106 (ONO-4538); Bristol-Myers Squibb's human IgG4 monoclonal antibody nivolumab (Opdivo®, BMS-936558, MDX1106); AstraZeneca's AMP-514, and AMP-224; and Pidilizumab (CT-011), CureTech Ltd.

The immune checkpoint therapy may, for example, include an inhibitor of PD-L1 such as an antibody (e.g., an anti-PD-L1 antibody, i.e., ICI antibody), RNAi molecule (e.g., anti-PD-L1 RNAi), antisense molecule (e.g., an anti-PD-L1 antisense RNA), dominant negative protein (e.g., a dominant negative PD-L1 protein), and/or small molecule inhibitor. An exemplary anti-PD-L1 antibody includes clone EH12, or any of Genentech's MPDL3280A (RG7446); anti-mouse PD-L1 antibody Clone 10F.9G2 (Cat #BE0101) from BioXcell; anti-PD-L1 monoclonal antibody MDX-1105 (BMS-936559) and BMS-935559 from Bristol-Meyer's Squibb; MSB0010718C; mouse anti-PD-L1 Clone 29E.2A3; and AstraZeneca's MEDI4736 (Durvalumab).

The immune checkpoint therapy may, for example, include an inhibitor of PD-L2 or may reduce the interaction between PD-1 and PD-L2. Exemplary inhibitors of PD-L2 include antibodies (e.g., an anti-PD-L2 antibody, i.e., ICI antibody), RNAi molecules (e.g., an anti-PD-L2 RNAi), antisense molecules (e.g., an anti-PD-L2 antisense RNA), dominant negative proteins (e.g., a dominant negative PD-L2 protein), and small molecule inhibitors. Antibodies include monoclonal antibodies, humanized antibodies, deimmunized antibodies, and Ig fusion proteins.

The immune checkpoint therapy may, for example, include an inhibitor of CTLA-4, such as an antibody against CTLA-4. An exemplary antibody against CTLA-4 includes ipilimumab. The anti-CTLA-4 antibody may block the binding of CTLA-4 to CD80 (B7-1) and/or CD86 (B7-2) expressed on antigen presenting cells. Exemplary antibodies against CTLA-4 further that may be used include: Bristol Meyers Squibb's anti-CTLA-4 antibody ipilimumab (also known as Yervoy®, MDX-010, BMS-734016 and MDX-101); anti-CTLA4 Antibody, clone 9H10 from Millipore; Pfizer's tremelimumab (CP-675,206, ticilimumab); and anti-CTLA-4 antibody clone BNI3 from Abcam. The immune checkpoint inhibitor may be a nucleic acid inhibitor of CTLA-4 expression.

The immune checkpoint therapy may, for example, include an inhibitor of LAG3. Lymphocyte activation gene-3 (LAG3) functions as an immune checkpoint in mediating peripheral T cell tolerance. LAG3 (also called CD223) is a transmembrane protein receptor expressed on activated CD4 and CD8 T cells, γδ T cells, natural killer T cells, B-cells, natural killer cells, plasmacytoid dendritic cells and regulatory T cells. The primary function of LAG3 is to attenuate the immune response. LAG3 binding to MHC class II molecules results in delivery of a negative signal to LAG3-expressing cells and down-regulates antigen-dependent CD4 and CD8 T cell responses. Thus, LAG3 negatively regulates the ability of T cells to proliferate, produce cytokines, and lyse target cells, termed as 'exhaustion' of T cells, and inhibition of LAG3 function may enhance T cell proliferation.

Monoclonal antibodies to LAG3 that may be used are known in the art and have been described, for example, in U.S. Pat. Nos. 5,976,877, 6,143,273, 6,197,524, 8,551,481, 10,898,571, and U.S. Appl. Pub. Nos. 20110070238, 20110150892, 20130095114, 20140093511, 20140127226, 20140286935, and in WO95/30750, WO97/03695, WO98/58059, WO2004/078928, WO2008/132601, WO2010/019570, WO2014/008218, EP0510079B1, EP0758383B1, EP0843557B1, EP0977856B1, EP1897548B2, EP2142210A1, and EP2320940B1. Additionally, peptide inhibitors of LAG3 that may be used are also known and described in U.S. Pub. No. 20200369766.

The immune checkpoint therapy may, for example, include an inhibitor of the TIM3 protein. T-cell immunoglobulin and mucin-domain containing-3 (TIM3), also known as hepatitis A virus cellular receptor 2 (HAVCR2), is a type-I transmembrane protein that functions as a key regulator of immune responses. TIM3 has been shown to induce T cell death or exhaustion after binding to galectin-9, and to play an important in regulating the activities of many innate immune cells (e.g., macrophages, monocytes, dendritic cells, mast cells, and natural killer cells; Han, 2013). Like many inhibitory receptors (e.g., PD-1 and CTLA-4), TIM3 expression has been associated with many types of chronic diseases, including cancer. TIM3+ T cells have been detected in patients with advanced melanoma, non-small cell lung cancer, or follicular B-cell non-Hodgkin lymphoma. And the presence of TIM3+ regulatory T cells have been described as an effective indicator of lung cancer progression. Thus, inhibition of TIM3 may enhance the functions of innate immune cells. Exemplary TIM3 inhibitors include antibodies, peptides, and small molecules that bind to and inhibit TIM3.

The immune checkpoint therapy may, for example, include an inhibitor of the VISTA protein. The V-domain Ig suppressor of T cell activation (VISTA or PD-L3) is primarily expressed on hematopoietic cells, and its expression is highly regulated on myeloid antigen-presenting cells (APCs) and T cells. Expression of VISTA on antigen presenting cells (APCs) suppresses T cell responses by engaging its counter-receptor on T cells during cognate interactions between T cells and APCs. Inhibition of VISTA would enhance T cell-mediated immunity and anti-tumor immunity, suppressing tumor growth. In this regard, therapeutic intervention of the VISTA inhibitory pathway represents a novel approach to modulate T cell-mediated immunity, such as in combination with the presently disclosed radiolabeled calreticulin targeting agents.

The immune checkpoint therapy may, for example, include an inhibitor of A2aR, or an A2aR blockade. The tumor microenvironment exhibits high concentrations of adenosine due to the contribution of immune and stromal cells, tissue disruption, and inflammation. A predominant driver is hypoxia due to the lack of perfusion that can lead to cellular stress and secretion of large amounts of ATP. Multiple small molecule inhibitors and antagonistic antibodies against these targets, which may be employed in the various aspects of the present invention, have been developed and show promising therapeutic efficacy against different solid tumors in clinical trials. For example, A2aR antagonists SYN115 and Istradefylline have been shown to improve motor function in patients with Parkinson's disease, and CPI-444 (NCT02655822, NCT03454451), PBF-509 (NCT02403193), NIR178 (NCT03207867), and AZD4635 (NCT02740985, NCT03381274) have been trialed for the treatment of various cancers. CPI-444 in combination with anti-PD-1 and anti-CTLA4 was highly effective in promoting CD8+ T cell responses and eliminating tumors in a preclinical. Additional exemplary A2aR inhibitors include, without limitation, the small molecule inhibitors SCH58261, ZM241365, and FSPTP.

The immune checkpoint therapy may, for example, include one or more modulators of an immune checkpoint protein or of more than one different immune checkpoint proteins. As such, the immune checkpoint therapy may include a first antibody or inhibitor against a first immune checkpoint protein and a second antibody or inhibitor against a second immune checkpoint protein.

DNA Damage Response Inhibitors (DDRi)

The additional agents administered with the radiolabeled calreticulin targeting agent may be a DNA damage response inhibitor (DDRi). DNA damage can be due to endogenous factors, such as spontaneous or enzymatic reactions, chemical reactions, or errors in replication, or may be due to exogenous factors, such as UV or ionizing radiation or genotoxic chemicals. The repair pathways that overcome this damage are collectively referred to as the DNA damage response or DDR. This signaling network acts to detect and orchestrate a cell's response to certain forms of DNA damage, most notably double strand breaks and replication stress. Following treatment with many types of DNA damaging drugs and ionizing radiation, cells are reliant on the DDR for survival. It has been shown that disruption of the DDR can increase cancer cell sensitivity to these DNA damaging agents and thus may improve patient responses to such therapies.

Within the DDR, there are several DNA repair mechanisms, including base excision repair, nucleotide excision repair, mismatch repair, homologous recombinant repair, and non-homologous end joining. Approximately 450 human DDR genes code for proteins with roles in physiological processes. Dysregulation of DDR leads to a variety of disorders, including genetic, neurodegenerative, immune, cardiovascular, and metabolic diseases or disorders and cancers. For example, the genes OGG1 and XRCC1 are part of the base excision repair mechanism of DDR, and mutations in these genes are found in renal, breast, and lung cancers, while the genes BRCA1 and BRCA2 are involved in homologous recombination repair mechanisms and mutations in these genes leads to an increased risk of breast, ovarian, prostate, pancreatic, as well as gastrointestinal and hematological cancers, and melanoma.

Exemplary DDRi's that may be employed include at least one or more antibodies or small molecules targeting poly (ADP-ribose) polymerase (i.e., a poly(ADP-ribose) polymerase inhibitor or PARPi). The PARPi may be a small molecule therapeutic selected from the group consisting of olaparib, niraparib, rucaparib, talazoparib, and a combination thereof. The PARPi may, for example, be provided in a subject effective amount including 0.1 mg/day-1200 mg/day, such as 0.100 mg/day-600 mg/day, or 0.25 mg/day-1 mg/day. Exemplary subject effective amounts include 0.1 mg, 0.25 mg, 0.5 mg, 0.75 mg, 1.0 mg, 100 mg, 200 mg, 300 mg, 400 mg, 500 mg, 600 mg, 700 mg, 750 mg, 800 mg, 900 mg, and 1000 mg, taken orally in one or two doses per day. Another exemplary DDRi includes an inhibitor of Ataxia telangiectasia mutated (ATM), Ataxia talangiectasia mutated and Rad-3 related (ATR), or Weel. Exemplary inhibitors of ATM that may be employed include KU-55933, KU-59403, wortmannin, CP466722, and KU-60019. Exemplary inhibitors of ATR include at least Schisandrin B, NU6027, NVP-BEA235, VE-821, VE-822, AZ20, and AZD6738. Exemplary inhibitors of Weel include AZD-1775 (i.e., adavosertib).

Other Therapeutic Agents

Further types of additional therapeutic agents relevant to treatment of the disease or condition being treated may be administered, for use in combination with the radiolabeled CD33 targeting agent. Such administration may be simultaneous, separate or sequential with the administration of the radiolabeled CD33 targeting agent. For simultaneous administration, the agents may be administered as one composition, or as separate compositions, as appropriate.

Exemplary additional therapeutic agents that may be used include but are not limited to chemotherapeutic agents, anti-inflammatory agents, immunosuppressive agents, immunomodulatory agents, or any combination thereof. Exemplary additional agents that may be used also include but are not limited to other targeted biologic agents such as unlabeled ("naked") therapeutic antibodies (i.e., without a drug or radionuclide payload), antibody drug conjugates (ADCs), soluble receptors and soluble receptor fusion proteins both unlabeled and conjugated to a drug or radionuclide, and soluble receptor ligands and soluble receptor ligand fusion proteins both unlabeled and conjugated to a drug or radionuclide.

In one aspect of the invention, the further additional agent(s) includes one or more of dexamethasone, doxorubicin, bortezomib, lenalidomide, prednisone, carmustine, etoposide, cisplatin, vincristine, cyclophosphamide, and thalidomide.

According to certain aspects of the present invention, the methods may include administration of a cytokine such as granulocyte colony-stimulating factor (GCSF) after administration of the radiotherapeutic with or without one or more of the other agents or treatments described herein. The GCSF may be administered, for example, 7, 8, 9, 10, or 11 days after administration of the radiolabeled CD33 targeting agent.

Exemplary chemotherapeutic agents include, but are not limited to, anti-neoplastic agents including alkylating agents including: nitrogen mustards, such as mechlorethamine, cyclophosphamide, ifosfamide, melphalan and chlorambucil; nitrosoureas, such as carmustine (BCNU), lomustine (CCNU), and semustine (methyl-CCNU); Temodal™ (temozolamide), ethylenimines/methylmelamine such as thriethylenemelamine (TEM), triethylene, thiophosphoramide (thiotepa), hexamethylmelamine (HMM, altretamine); alkyl sulfonates such as busulfan; triazines such as dacarbazine (DTIC); antimetabolites including folic acid analogs such as methotrexate and trimetrexate, pyrimidine analogs such as 5-fluorouracil (5FU), fluorodeoxyuridine, gemcitabine, cytosine arabinoside (AraC, cytarabine), 5-azacytidine, 2,2'-difluorodeoxycytidine, purine analogs such as 6-mercaptopurine, 6-thioguamne, azathioprine, T-deoxycoformycin (pentostatin), erythrohydroxynonyladenine (EHNA), fludarabine phosphate, and 2-chlorodeoxyadenosine (cladribine, 2-CdA); natural products including antimitotic drugs such as paclitaxel, vinca alkaloids including vinblastine (VLB), vincristine, and vinorelbine, taxotere, estramustine, and estramustine phosphate; pipodophylotoxins such as etoposide and teniposide; antibiotics such as actinomycin D, daunomycin (rubidomycin), doxorubicin, mitoxantrone, idarubicin, bleomycins, plicamycin (mithramycin), mitomycin C, and actinomycin; enzymes such as L-asparaginase; biological response modifiers such as interferon-alpha, IL-2, G-CSF and GM-CSF; miscellaneous agents including platinum coordination complexes such as oxaliplatin, cisplatin and carboplatin, anthracenediones such as mitoxantrone, substituted urea such as hydroxyurea, methylhydrazine derivatives including N-methylhydrazine (MIH) and procarbazine, adrenocortical suppressants such as mitotane (o, p-DDD) and aminoglutethimide; hormones and antagonists including adrenocorticosteroid antagonists such as prednisone and equivalents, dexamethasone and aminoglutethimide; Gemzar™ (gemcitabine), progestin such as hydroxyprogesterone caproate, medroxyprogesterone acetate and megestrol acetate; estrogen such as diethylstilbestrol and ethinyl estradiol equivalents; antiestrogen such as tamoxifen; androgens including testosterone propionate and fluoxymesterone/equivalents; antiandrogens such as flutamide, gonadotropin-releasing hormone analogs and leuprolide; and non-steroidal antiandrogens such as flutamide. Therapies targeting epigenetic mechanism including, but not limited to, histone deacetylase inhibitors, demethylating agents (e.g., Vidaza) and release of transcriptional repression (ATRA) therapies can also be combined with antibodies of the invention.

According to certain aspects, the chemotherapeutic agent may include an agent selected from the group consisting of taxanes (e.g., paclitaxel (Taxol), docetaxel (Taxotere), modified paclitaxel (e.g., Abraxane and Opaxio), doxorubicin, sunitinib (Sutent), sorafenib (Nexavar), and other multikinase inhibitors, oxaliplatin, cisplatin and carboplatin, etoposide, gemcitabine, and vinblastine. In one embodiment the chemotherapeutic agent is selected from the group consisting of taxanes (like e.g. taxol (paclitaxel), docetaxel (Taxotere), modified paclitaxel (e.g. Abraxane and Opaxio)).

According to aspects of the presently disclosed invention, the chemotherapeutic agent may include an agent selected from 5-fluorouracil (5-FU), leucovorin, irinotecan, and oxaliplatin. According to certain aspects, the chemotherapeutic agent includes 5-fluorouracil, leucovorin and irinotecan (FOLFIRI). According to other aspects, the chemotherapeutic agent includes 5-fluorouracil, and oxaliplatin (FOLFOX).

According to aspects of the presently disclosed invention, the chemotherapeutic agent includes one or more agents selected from taxanes (e.g., docetaxel or paclitaxel) or a modified paclitaxel (e.g., Abraxane or Opaxio), doxorubicin), capecitabine and/or bevacizumab (Avastin) for the treatment of breast cancer; therapies with carboplatin, oxaliplatin, cisplatin, paclitaxel, doxorubicin (or modified doxorubicin (Caelyx or Doxil)), or topotecan (Hycamtin) for the treatment of ovarian cancer; therapies with a multi-kinase inhibitor, MKI, (Sutent, Nexavar, or 706) and/or doxorubicin for the treatment of kidney cancer; therapies with oxaliplatin, cisplatin and/or radiation for the treatment of squamous cell carcinoma; and therapies with taxol and/or carboplatin for the treatment of lung cancer.

The therapeutic agents may, for example, be administered according to any standard dose regime known in the field. For example, therapeutic agents may be administered at concentrations in the range of 1 to 500 mg/m$^2$, the amounts being calculated as a function of patient surface area (m$^2$). For example, exemplary doses of the chemotherapeutic paclitaxel may include 15 mg/m$^2$ to 275 mg/m$^2$, exemplary doses of docetaxel may include 60 mg/m$^2$ to 100 mg/m$^2$, exemplary doses of epithilone may include 10 mg/m$^2$ to 20 mg/m$^2$, and an exemplary dose of calicheamicin may include 1 mg/m$^2$ to 10 mg/m$^2$. While exemplary doses are disclosed herein which may be used, such are only provided for example and reference and are not intended to limit the dose ranges of the drug agents of the presently disclosed invention that may be used.

Exemplary anti-inflammatory agents that may be used may be selected from a steroidal drug and a NSAID (non-steroidal anti-inflammatory drug). Other anti-inflammatory agents may be selected from aspirin and other salicylates, Cox-2 inhibitors (such as rofecoxib and celecoxib), NSAIDs (such as ibuprofen, fenoprofen, naproxen, sulindac, diclofenac, piroxicam, ketoprofen, diflunisal, nabumetone, etodolac, oxaprozin, and indomethacin), anti-IL6R antibodies, anti-IL8 antibodies, anti-IL15 antibodies, anti-IL15R antibodies, anti-CD4 antibodies, anti-CD11a antibodies (e.g., efalizumab), anti-alpha4/beta-1 integrin (VLA4) antibodies (e.g natalizumab), CTLA4-1 g for the treatment of inflammatory diseases, prednisolone, prednisone, disease modifying antirheumatic drugs (DMARDs) such as methotrexate, hydroxychloroquine, sulfasalazine, pyrimidine synthesis inhibitors (such as leflunomide), IL-1 receptor blocking agents (such as anakinra), TNF-α blocking agents (such as etanercept, infliximab, and adalimumab) and similar agents.

Exemplary immunosuppressive and/or immunomodulatory agents that may be used include cyclosporine, azathioprine, mycophenolic acid, mycophenolate mofetil, corticosteroids such as prednisone, methotrexate, gold salts, sulfasalazine, antimalarials, brequinar, leflunomide, mizoribine, 15-deoxyspergualine, 6-mercaptopurine, cyclophosphamide, rapamycin, tacrolimus (FK-506), OKT3, antithymocyte globulin, thymopentin, thymosin-α and similar agents.

According to certain aspects of the presently disclosed invention, the additional therapeutic agents may include an antimyeloma agent. Exemplary antimyeloma agents include dexamethasone, melphalan, doxorubicin, bortezomib, lenalidomide, prednisone, carmustine, etoposide, cisplatin, vincristine, cyclophosphamide, and thalidomide, several of which are indicated above as chemotherapeutic agents, anti-inflammatory agents, or immunosuppressive agents.

According to certain aspects of the presently disclosed invention, the additional therapeutic agents may include allopurinol, administered at a dose of 300-600 mg/day orally starting on day 1 of the treatment period and continuing for at least 7 days after the CD33 targeting agent. Prophylactic antibiotics and antifungal therapies may, for example, be included for those patients who have an absolute neutrophil count of less than 500/μl. Analgesics and antihistamines may also be included prior at administration of the CD33 targeting agent by infusion to reduce infusion-related reactions.

The additional therapeutic agents may be administered according to any standard dose regime known in the field. For example, therapeutic agents may be administered at concentrations in the range of 1 to 500 mg/m$^2$, the amounts being calculated as a function of patient body surface area (m$^2$). For example, exemplary doses of paclitaxel may include 15 mg/m$^2$ to 275 mg/m$^2$, exemplary doses of docetaxel may include 60 mg/m$^2$ to 100 mg/m$^2$, exemplary doses of epithilone may include 10 mg/m$^2$ to 20 mg/m$^2$, and an exemplary dose of calicheamicin may include 1 mg/m$^2$ to 10 mg/m$^2$. While exemplary doses are disclosed herein, such are only provided for example reference and are not intended to limit the dose ranges of the drug agents of the presently disclosed invention.

Without limitation, the following aspects of the invention are also disclosed in this application:

Aspect 1. Use of a radiolabeled molecule that specifically binds to CD33 in the preparation of a medicament for the treatment of (a) a solid tumor cancer or solid tumor premalignancy, such as any of those disclosed herein, in a mammalian subject, such as a human patient, not afflicted with a myeloid-derived hematological cancer or myeloid-derived hematological premalignancy, or (b) haemophagocytic lymphohistiocytosis (HLH) or macrophage activation syndrome (MAS) in a mammalian subject, such as a human patient.

Aspect 2. The use of aspect 1, wherein the radiolabeled molecule is a radiolabeled antibody, antibody fragment, antibody mimetic, peptide, ligand, or small molecule.

Aspect 3. The use of aspect 2, wherein the radiolabeled molecule is a radiolabeled antibody or antibody fragment.

Aspect 4. The use of aspect 3, wherein the radiolabeled antibody includes radiolabeled lintuzumab, radiolabeled gemtuzumab, radiolabeled vadastuximab, a radiolabeled CD33-binding fragment of lintuzumab, gemtuzumab, or vadastuximab, or any combination thereof.

Aspect 5. The use of any one of the preceding aspects, wherein the radiolabeled molecule includes a radiolabel selected from $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Po, $^{211}$At, $^{212}$Bi, $^{213}$Bi, $^{223}$Ra, $^{227}$Th, $^{149}$Tb, $^{161}$Tb, $^{47}$Sc, $^{67}$Cu, $^{134}$Ce, $^{137}$Cs, $^{212}$Pb or $^{103}$Pd, or any combination thereof.

Aspect 6. The use of any one of the preceding aspects, wherein the radiolabeled molecule includes the radiolabel $^{225}$AC.

Aspect 7. The use of any one of the preceding aspects, wherein the radiolabeled molecule includes a chelator that binds the radiolabel by chelation.

Aspect 8. The use of aspect 7, wherein the chelator comprises DOTA or a DOTA derivative.

Aspect 9. The use of aspect 8, wherein the radiolabeled molecule is $^{225}$Ac-labeled lintuzumab or an $^{225}$Ac-labeled CD33-binding fragment of lintuzumab.

Aspect 10. The use of any one of the preceding aspects, wherein the solid tumor cancer or solid tumor premalignancy includes ovarian cancer, non-small cell lung carcinoma, head and neck squamous cell cancer, pancreatic cancer, renal cancer, breast cancer, metastatic breast cancer, tamoxifen-resistant breast cancer, triple negative breast cancer, prostate cancer, castration-resistant prostate cancer (CRPC), pancreatic cancer, small cell lung carcinoma (SCLC), non-small cell lung carcinoma (NSCLC), hepatocellular carcinoma (HCC), cholangiocarcinoma, gastric cancer, colorectal cancer, esophageal cancer, Barrett's esophagus, osteosarcoma, dermatofibrosarcoma protuberans (DF SP), fibrosarcoma (fibroblastic sarcoma), chondrosarcoma, Ewing's sarcoma, Kaposi's sarcoma, rhabdomyosarcoma, liposarcoma, synovial sarcoma, pleomorphic sarcoma, gastrointestinal stromal tumor, leiomyosarcoma, or angiosarcoma, or any of those disclosed herein.

Aspect 11. The use of any one of the preceding aspects, wherein the use is for the preparation of a medicament for the treatment of a solid tumor cancer or solid tumor premalignancy in a mammalian subject, such as a human patient, not afflicted with a hematological cancer or hematological premalignancy, in combination with immune checkpoint inhibition.

Aspect 12. The use of aspect 12, wherein the immune checkpoint inhibition includes a CD47 blockade.

Aspect 13. The use of aspect 12, wherein the immune checkpoint inhibition includes blockade of one or both of PD-1 or PD-L1.

Aspect 14. The use of aspect 12, wherein the immune checkpoint inhibition includes blockade of CTLA-4.

Aspect 15. The use of any one of aspects 1-14, wherein the solid tumor cancer or solid tumor premalignancy is a CD33 low-expressing or CD33-negative solid tumor cancer or solid tumor premalignancy.

Aspect 16. Use of a radiolabeled molecule that binds specifically to CD33 in the preparation of a medicament for killing myeloid-derived suppressor cells in a mammalian subject, such as a human patient, afflicted with a cancer or premalignancy or afflicted with haemophagocytic lymphohistiocytosis (HLH) or macrophage activation syndrome (MAS).

Aspect 17. The use of aspect 16, wherein the radiolabeled molecule is a radiolabeled antibody, antibody, antibody fragment, antibody mimetic, peptide, ligand, or small molecule.

Aspect 18. The use of aspect 17, wherein the radiolabeled molecule is a radiolabeled antibody or antibody fragment.

Aspect 19. The use of aspect 18, wherein the radiolabeled antibody includes radiolabeled lintuzumab, radiolabeled gemtuzumab, radiolabeled vadastuximab, a radiolabeled CD33-binding fragment of lintuzumab, gemtuzumab or vadastuximab, or any combination thereof.

Aspect 20. The use of any one of aspects 16-19, wherein the radiolabeled molecule includes a radiolabel selected from selected from $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Po, $^{211}$At, $^{212}$Bi, $^{213}$Bi, $^{223}$Ra, $^{227}$Th, $^{149}$Tb, $^{161}$Tb, $^{47}$Sc, $^{67}$Cu, $^{134}$Ce, $^{137}$Cs, $^{212}$Pb or $^{103}$Pd, or any combination thereof.

Aspect 21. The use of any one of aspects 16-20, wherein the radiolabeled molecule includes the radiolabel 225Ac.

Aspect 22. The use of any one of aspects 16-21, wherein the radiolabeled molecule includes a chelator that binds the radiolabel by chelation.

Aspect 23. The use of aspect 22, wherein the chelator includes DOTA or a DOTA derivative.

Aspect 24. The use of aspect 23, wherein the radiolabeled molecule is $^{225}$Ac-labeled lintuzumab or a $^{225}$Ac-labeled CD33-binding fragment of lintuzumab.

Aspect 25. The use of any one of aspects 16-24, wherein the cancer or premalignancy includes ovarian cancer, head and neck squamous cell cancer, pancreatic cancer, renal cancer, breast cancer, metastatic breast cancer, tamoxifen-resistant breast cancer, triple negative breast cancer, prostate cancer, castration-resistant prostate cancer (CRPC), pancreatic cancer, small cell lung carcinoma (SCLC), non-small cell lung carcinoma (NSCLC), hepatocellular carcinoma (HCC), cholangiocarcinoma, gastric cancer, colorectal cancer, esophageal cancer, Barrett's esophagus, osteosarcoma, dermatofibrosarcoma protuberans (DFSP), fibrosarcoma (fibroblastic sarcoma), chondrosarcoma, Ewing's sarcoma, Kaposi's sarcoma, rhabdomyosarcoma, liposarcoma, synovial sarcoma, pleomorphic sarcoma, gastrointestinal stromal tumor, leiomyosarcoma, or angiosarcoma, or any of those disclosed herein.

Aspect 26. The use of any one of aspects 16-24, wherein the use is for the preparation of a medicament for the treatment of a solid tumor cancer or solid tumor premalignancy in a mammalian subject, such as a human patient.

Aspect 27. The use of aspect 26, wherein the mammalian subject, such as human patient, is
(i) not afflicted with a myeloid-derived hematological cancer or myeloid-derived hematological premalignancy; or
(ii) not afflicted with a hematological cancer or hematological premalignancy.

Aspect 28. The use of any one of aspects 16-27, wherein the use is for the preparation of a medicament for the treatment of a cancer or premalignancy in a mammalian subject, such as a human patient, in combination with immune checkpoint inhibition.

Aspect 29. The use of aspect 28, wherein the immune checkpoint inhibition includes CD47 blockade.

Aspect 30. The use of aspect 28, wherein the immune checkpoint inhibition includes blockade of one or both of PD-1 or PD-L1.

Aspect 31. The use of aspect 28, wherein the immune checkpoint inhibition includes blockade of CTLA-4.

Aspect 33. The use of any one of aspects 16-31, wherein the solid tumor cancer or solid tumor premalignancy is a CD33 low-expressing or CD33-negative solid tumor cancer or solid tumor premalignancy.

Aspect 34. A method for treating (a) a solid tumor cancer or solid tumor premalignancy in a mammalian subject, such as a human patient, for example, a mammalian subject not afflicted with a myeloid-derived hematological cancer or myeloid-derived premalignancy or not afflicted with a hematological cancer or hematological premalignancy, (b) a non-myeloid derived hematological malignancy such as a lymphoma or lymphocytic leukemia in a mammalian subject, such as a human patient, or (c) haemophagocytic lymphohistiocytosis (HLH) or macrophage activation syndrome (MAS) in a mammalian subject, such as a human patient, including:
administering a therapeutically effective amount of a radiolabeled molecule that binds specifically to CD33 to the mammalian subject.

Aspect 35. The method of aspect 34, wherein the radiolabeled molecule is a radiolabeled antibody, antibody, antibody fragment, antibody mimetic, peptide, ligand, or small molecule.

Aspect 36. The method of aspect 35, wherein the radiolabeled molecule is a radiolabeled antibody or antibody fragment.

Aspect 37. The method of aspect 36, wherein the radiolabeled antibody includes radiolabeled lintuzumab, gemtuzumab or vadastuximab, a radiolabeled CD33-binding fragment of lintuzumab, gemtuzumab or vadastuximab, or any combination thereof.

Aspect 38. The method of any one of aspects 34-37, wherein the radiolabeled molecule includes a radiolabel selected from selected from $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Po, $^{211}$At, $^{212}$Bi, $^{213}$Bi, $^{223}$Ra, $^{227}$Th, $^{149}$Tb, $^{161}$Tb, $^{47}$Sc, $^{67}$Cu, $^{134}$Ce, $^{137}$Cs, $^{212}$Pb or $^{103}$Pd, or any combination thereof.

Aspect 39. The method of any one of aspects 34-38, wherein the radiolabeled molecule includes the radiolabel $^{225}$AC.

Aspect 40. The method of any one of aspects 34-39, wherein the radiolabeled molecule includes a chelator that binds the radiolabel by chelation.

Aspect 41. The method of aspect 40, wherein the chelator includes DOTA or a DOTA derivative.

Aspect 42. The method of aspect 41, wherein the radiolabeled molecule is $^{225}$Ac-labeled lintuzumab or an $^{225}$Ac-labeled CD33-binding fragment of lintuzumab.

Aspect 43. The method of any one of aspects 34-43, wherein the solid tumor cancer or solid tumor premalignancy includes ovarian cancer, head and neck squamous cell cancer, pancreatic cancer, renal cancer, breast cancer, metastatic breast cancer, tamoxifen-sensitive tamoxifen-resistant breast cancer, triple negative breast cancer, prostate cancer, castration-resistant prostate cancer (CRPC), pancreatic cancer, small cell lung carcinoma (SCLC), non-small cell lung carcinoma (NSCLC), hepatocellular carcinoma (HCC), cholangiocarcinoma, gastric cancer, colorectal cancer, esophageal cancer, Barrett's esophagus, osteosarcoma, dermatofibrosarcoma protuberans (DF SP), fibrosarcoma (fibroblastic sarcoma), chondrosarcoma, Ewing's sarcoma, Kaposi's sarcoma, rhabdomyosarcoma, liposarcoma, synovial sarcoma, pleomorphic sarcoma, gastrointestinal stromal tumor, leiomyosarcoma, or angiosarcoma, or any of those disclosed herein.

Aspect 44. The method of any one of aspects 34-43, further including administering at least one immune checkpoint inhibitor to the mammalian subject.

Aspect 45. The method of aspect 44, wherein the at least one immune checkpoint inhibitor includes a CD47 inhibitor.

Aspect 46. The method of aspect 45, wherein the at least one immune checkpoint inhibition includes one or both of a PD-1 or PD-L1 inhibitor.

Aspect 47. The method of aspect 45, wherein the immune checkpoint inhibition includes a CTLA-4 inhibitor.

Aspect 48. The method of any one of aspects 34-47, wherein the solid tumor cancer or solid tumor premalignancy is a CD33 low-expressing or CD33-negative solid tumor cancer or solid tumor premalignancy.

Aspect 49. A method for killing myeloid-derived suppressor cells (MDSCs) in a mammalian subject, such as a human patient, afflicted with a cancer or premalignancy or afflicted with haemophagocytic lymphohistiocytosis (HLH) or macrophage activation syndrome (MAS), including:
administering a radiolabeled molecule that binds specifically to CD33 to the mammalian subject in an amount effective to kill MDSCs in the mammalian subject.

Aspect 50. The method of aspect 49, wherein the radiolabeled molecule is a radiolabeled antibody, antibody fragment, antibody mimetic, peptide, or small molecule.

Aspect 51. The method of aspect 50, wherein the radiolabeled molecule is a radiolabeled antibody or antibody fragment.

Aspect 52. The method of aspect 51, wherein the radiolabeled antibody includes radiolabeled lintuzumab, gemtuzumab or vadastuximab, or a radiolabeled CD33-binding fragment of lintuzumab, gemtuzumab or vadastuximab, or any combination thereof.

Aspect 53. The method of any one of aspects 49-52, wherein the radiolabeled molecule includes a radiolabel selected from selected from $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Po, $^{211}$At, $^{212}$Bi, $^{213}$Bi, $^{223}$Ra, $^{227}$Th, $^{149}$Tb, $^{161}$Tb, $^{47}$Sc, $^{67}$Cu, $^{134}$Ce, $^{137}$Cs, $^{212}$Pb or $^{103}$Pd, or any combination thereof.

Aspect 54. The method of any one of aspects 49-53, wherein the radiolabeled molecule includes the radiolabel $^{225}$Ac.

Aspect 55. The method of any one of aspects 49-54, wherein the radiolabeled molecule includes a chelator that binds the radiolabel by chelation.

Aspect 56. The method of aspect 55, wherein the chelator is DOTA or a DOTA derivative.

Aspect 57. The method of aspect 23, wherein the radiolabeled molecule is $^{225}$Ac-labeled lintuzumab or an $^{225}$Ac-labeled CD33-binding fragment of lintuzumab.

Aspect 58. The method of any one of aspects 49-57, wherein the cancer or premalignancy includes ovarian cancer, non-small cell lung carcinoma, head and neck squamous cell cancer, pancreatic cancer, renal cancer, breast cancer, metastatic breast cancer, tamoxifen-resistant breast cancer, triple negative breast cancer, prostate cancer, castration-resistant prostate cancer (CRPC), pancreatic cancer, small cell lung carcinoma (SCLC), non-small cell lung carcinoma (NSCLC), hepatocellular carcinoma (HCC), cholangiocarcinoma, gastric cancer, colorectal cancer, esophageal cancer, Barrett's esophagus, osteosarcoma, dermatofibrosarcoma protuberans (DF SP), fibrosarcoma (fibroblastic sarcoma), chondrosarcoma, Ewing's sarcoma, Kaposi's sarcoma, rhabdomyosarcoma, liposarcoma, synovial sarcoma, pleomorphic sarcoma, gastrointestinal stromal tumor, leiomyosarcoma, or angiosarcoma, or any of those disclosed herein.

Aspect 59. The method of any one of aspects 49-58, wherein the method is for the treatment of a solid tumor cancer or solid tumor premalignancy in a mammalian subject, such as a human patient.

Aspect 60. The method of aspect 59, wherein the mammalian subject, such as human patient, is
(i) not afflicted with a myeloid-derived hematological cancer or myeloid-derived hematological premalignancy; or
(ii) not afflicted with a hematological cancer or hematological premalignancy.

Aspect 61. The method of any one of aspects 49-60, further including administering at least one immune checkpoint inhibitor to the mammalian subject.

Aspect 62. The method of aspect 61, wherein the at least one immune checkpoint inhibitor includes a CD47 inhibitor.

Aspect 63. The method of aspect 61 or 62, wherein the at least one immune checkpoint inhibitor includes one or both of PD-1 inhibitor or a PD-L1 inhibitor.

Aspect 64. The method of any one of aspects 61-63, wherein the at least one immune checkpoint inhibitor includes a CTLA-4 inhibitor.

Aspect 65. The method of any one of aspects 49-64, wherein the solid tumor cancer or solid tumor premalignancy is a CD33 low-expressing or CD33-negative solid tumor cancer or CD33 low-expressing or CD33-negative solid tumor premalignancy.

Aspect 66. A pharmaceutical composition, including:
a therapeutically effective amount of a radiolabeled molecule that binds specifically to CD33 such as to human CD33; and
a therapeutically effective amount of an immune checkpoint inhibitor.

Aspect 67. The pharmaceutical composition of aspect 66, further including at least one pharmaceutically acceptable excipient.

Aspect 68. The pharmaceutical composition of aspect 66 or 67, wherein the radiolabeled molecule is a radiolabeled antibody, antibody, antibody fragment, antibody mimetic, peptide, ligand, or small molecule.

Aspect 69. The pharmaceutical composition of aspect 68, wherein the radiolabeled molecule is a radiolabeled antibody or antibody fragment.

Aspect 70. The pharmaceutical composition of aspect 69, wherein the radiolabeled antibody includes radiolabeled lintuzumab, radiolabeled gemtuzumab, radiolabeled vadastuximab, or any combination thereof.

Aspect 71. The pharmaceutical composition of any one of aspects 66-70, wherein the radiolabeled molecule includes a radiolabel selected from selected from $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Po, $^{211}$At, $^{212}$Bi, $^{213}$Bi, $^{223}$Ra, $^{227}$Th, $^{149}$Tb, $^{161}$Tb, $^{47}$Sc, $^{67}$Cu, $^{134}$Ce, $^{137}$Cs, $^{212}$Pb or $^{103}$Pd, or any combination thereof.

Aspect 72. The pharmaceutical composition of any one of 66-71 aspects, wherein the radiolabeled molecule includes the radiolabel $^{225}$AC.

Aspect 73. The pharmaceutical composition of any one of aspects 66-72, wherein the radiolabeled molecule includes a chelator that binds the radiolabel by chelation.

Aspect 74. The pharmaceutical composition of aspect 73, wherein the chelator includes DOTA or a DOTA derivative.

Aspect 75. The pharmaceutical composition of aspect 74, wherein the radiolabeled molecule is $^{225}$Ac-labeled lintuzumab.

Aspect 76. The pharmaceutical composition of any one of aspects 66-75, wherein the at least one immune checkpoint inhibitor includes a CD47 inhibitor.

Aspect 77. The pharmaceutical composition of any one of aspects 66-76, wherein the at least one immune checkpoint inhibitor includes one or both of a PD-1 inhibitor and a PD-L1 inhibitor.

Aspect 78. The pharmaceutical composition of any one of aspects 66-77, wherein the at least one immune checkpoint inhibitor includes a CTLA-4 inhibitor.

Aspect 79. The pharmaceutical composition of any one of aspects 66-78, wherein the composition is for the treatment of a solid tumor cancer or solid tumor premalignancy in a mammalian subject, such as a human patient, not afflicted with a hematological cancer or hematological premalignancy.

Aspect 80. The pharmaceutical composition of aspect 79, wherein the solid tumor cancer or solid tumor premalignancy is a CD33 low-expressing or CD33-negative solid tumor cancer or CD33 low-expressing or CD33-negative solid tumor premalignancy.

Aspect 81. The pharmaceutical composition of aspect 79, wherein the solid tumor cancer or solid tumor premalignancy includes ovarian cancer, non-small cell lung carcinoma, head and neck squamous cell cancer, pancreatic cancer, renal cancer, breast cancer, metastatic breast cancer, tamoxifen-resistant breast cancer, triple negative breast cancer, prostate cancer, castration-resistant prostate cancer (CRPC), pancreatic cancer, small cell lung carcinoma (SCLC), non-small cell lung carcinoma (NSCLC), hepatocellular carcinoma (HCC), cholangiocarcinoma, gastric cancer, colorectal cancer, esophageal cancer, Barrett's esophagus, osteosarcoma, dermatofibrosarcoma protuberans (DF SP), fibrosarcoma (fibroblastic sarcoma), chondrosarcoma, Ewing's sarcoma, Kaposi's sarcoma, rhabdomyosarcoma, liposarcoma, synovial sarcoma, pleomorphic sarcoma, gastrointestinal stromal tumor, leiomyosarcoma, or angiosarcoma, or any of those disclosed herein.

Aspect 82. The pharmaceutical composition of any one of aspects 66-78, wherein the composition is for killing myeloid-derived suppressor cells (MDSCs) in a mammalian subject, such as a human patient, afflicted with a cancer or premalignancy.

Aspect 83. The pharmaceutical composition of aspect 82, wherein the cancer or premalignancy is a CD33 low-expressing or CD33-negative cancer or premalignancy.

Aspect 84. The pharmaceutical composition of aspect 82, wherein the cancer or premalignancy includes ovarian cancer, non-small cell lung carcinoma, head and neck squamous cell cancer, pancreatic cancer, renal cancer, breast cancer, metastatic breast cancer, tamoxifen-resistant breast cancer, triple negative breast cancer, prostate cancer, castration-resistant prostate cancer (CRPC), pancreatic cancer, small cell lung carcinoma (SCLC), non-small cell lung carcinoma (NSCLC), hepatocellular carcinoma (HCC), cholangiocarcinoma, gastric cancer, colorectal cancer, esophageal cancer, or Barrett's esophagus, osteosarcoma, dermatofibrosarcoma protuberans (DFSP), fibrosarcoma (fibroblastic sarcoma), chondrosarcoma, Ewing's sarcoma, Kaposi's sarcoma, rhabdomyosarcoma, liposarcoma, synovial sarcoma, pleomorphic sarcoma, gastrointestinal stromal tumor, leiomyosarcoma, or angiosarcoma, or any of those disclosed herein.

Aspect 85. A pharmaceutical composition for treating a solid tumor cancer or solid tumor premalignancy in a mammalian subject, such as a human patient, not afflicted with a myeloid-derived hematological cancer or myeloid-derived hematological premalignancy, including:
a therapeutically effective amount of a radiolabeled molecule that binds specifically to CD33.

Aspect 86. The pharmaceutical composition of aspect 85, wherein the radiolabeled molecule is a radiolabeled antibody, antibody, antibody fragment, antibody mimetic, peptide, ligand, or small molecule, peptide or small molecule.

Aspect 87. The pharmaceutical composition of aspect 86, wherein the radiolabeled molecule is a radiolabeled antibody or antibody fragment.

Aspect 88. The pharmaceutical composition of aspect 87, wherein the radiolabeled antibody includes radiolabeled lintuzumab, radiolabeled gemtuzumab, radiolabeled vadastuximab, or any combination thereof.

Aspect 89. The pharmaceutical composition of any one of aspects 85-88, wherein the radiolabeled molecule includes a radiolabel selected from selected from $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Po, $^{211}$At, $^{212}$Bi, $^{213}$Bi, $^{223}$Ra, $^{227}$Th, $^{149}$Tb, $^{161}$Tb, $^{47}$Sc, $^{67}$Cu, $^{134}$Ce, $^{137}$Cs, $^{212}$Pb or $^{103}$Pd, or any combination thereof.

Aspect 90. The pharmaceutical composition of any one of aspects 85-89, wherein the radiolabeled molecule includes the radiolabel $^{225}$AC.

Aspect 91. The pharmaceutical composition of any one of aspects 85-90, wherein the radiolabeled molecule includes a chelator that binds the radiolabel by chelation.

Aspect 92. The pharmaceutical composition of aspect 91, wherein the chelator includes DOTA or a DOTA derivative.

Aspect 93. The pharmaceutical composition of aspect 92, wherein the radiolabeled molecule is $^{225}$Ac-labeled lintuzumab.

Aspect 94. The pharmaceutical composition of any one of aspects 85-93, wherein the solid tumor cancer or solid tumor premalignancy includes ovarian cancer, head and neck squamous cell cancer, pancreatic cancer, renal cancer, breast cancer, metastatic breast cancer, tamoxifen-resistant breast cancer, triple negative breast cancer, prostate cancer, castration-resistant prostate cancer (CRPC), pancreatic cancer, small cell lung carcinoma (SCLC), non-small cell lung carcinoma (NSCLC), hepatocellular carcinoma (HCC), cholangiocarcinoma, gastric cancer, colorectal cancer, esophageal cancer, Barrett's esophagus, osteosarcoma, dermatofibrosarcoma protuberans (DFSP), fibrosarcoma (fibroblastic sarcoma), chondrosarcoma, Ewing's sarcoma, Kaposi's sarcoma, rhabdomyosarcoma, liposarcoma, synovial sarcoma, pleomorphic sarcoma, gastrointestinal stromal tumor, leiomyosarcoma, or angiosarcoma, or any of those disclosed herein.

Aspect 95. The pharmaceutical composition of any one of aspects 85-94, further including
administering at least one immune checkpoint inhibitor to the mammalian subject.

Aspect 96. The pharmaceutical composition of aspect 95, wherein the at least one immune checkpoint inhibitor includes a CD47 inhibitor.

Aspect 97. The pharmaceutical composition of aspect 95 or 96, wherein the at least one immune checkpoint inhibition includes one or both of a PD-1 or PD-L1 inhibitor.

Aspect 98. The pharmaceutical composition of any one of aspects 95-97, wherein the immune checkpoint inhibition includes a CTLA-4 inhibitor.

Aspect 99. The pharmaceutical composition of any one of aspects 85-98, wherein the solid tumor cancer or solid tumor premalignancy is a CD33 low-expressing or CD33-negative solid tumor cancer or solid tumor premalignancy.

Aspect 100. The pharmaceutical composition of any one of aspects 85-99, further including at least one pharmaceutically acceptable excipient.

Aspect 101. A pharmaceutical composition for killing myeloid-derived suppressor cells (MDSCs) in a mammalian subject, such as a human patient, afflicted with a cancer or premalignancy or afflicted with haemophagocytic lymphohistiocytosis (HLH) or macrophage activation syndrome (MAS), including:
a radiolabeled molecule that binds specifically to CD33 to the mammalian subject in an amount effective to kill MDSCs in the mammalian subject.

Aspect 102. The pharmaceutical composition of aspect 101, wherein the radiolabeled molecule is a radiolabeled antibody, antibody, antibody fragment, antibody mimetic, peptide, ligand, or small molecule.

Aspect 103. The pharmaceutical composition of aspect 102, wherein the radiolabeled molecule is a radiolabeled antibody.

Aspect 104. The pharmaceutical composition of aspect 103, wherein the radiolabeled antibody includes radiolabeled lintuzumab, radiolabeled gemtuzumab, radiolabeled vadastuximab, or any combination thereof.

Aspect 105. The pharmaceutical composition of any one of aspects 101-104, wherein the radiolabeled molecule includes a radiolabel selected from selected from $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Po, $^{211}$At, $^{212}$Bi, $^{213}$Bi, $^{223}$Ra, $^{227}$Th, $^{149}$Tb, $^{161}$Tb, $^{47}$Sc, $^{67}$Cu, $^{134}$Ce, $^{137}$Cs, $^{212}$Pb or $^{103}$Pd, or any combination thereof.

Aspect 106. The pharmaceutical composition of any one of aspects 101-105, wherein the radiolabeled molecule includes the radiolabel $^{225}$AC.

Aspect 107. The pharmaceutical composition of any one of aspects 101-106, wherein the radiolabeled molecule includes a chelator that binds the radiolabel by chelation.

Aspect 108. The pharmaceutical composition of aspect 107, wherein the chelator includes DOTA or a DOTA derivative.

Aspect 109. The pharmaceutical composition of aspect 108, wherein the radiolabeled molecule is $^{225}$Ac-labeled lintuzumab.

Aspect 110. The pharmaceutical composition of any one of aspects 101-109, wherein the cancer or premalignancy includes ovarian cancer, non-small cell lung carcinoma, head and neck squamous cell cancer, pancreatic cancer, renal cancer, breast cancer, tamoxifen-resistant breast cancer, triple negative breast cancer, prostate cancer, castration-resistant prostate cancer (CRPC), pancreatic cancer, small cell lung carcinoma (SCLC), non-small cell lung carcinoma (NSCLC), hepatocellular carcinoma (HCC), cholangiocarcinoma, gastric cancer, colorectal cancer, esophageal cancer, Barrett's esophagus, osteosarcoma, dermatofibrosarcoma protuberans (DFSP), fibrosarcoma (fibroblastic sarcoma), chondrosarcoma, Ewing's sarcoma, Kaposi's sarcoma, rhabdomyosarcoma, liposarcoma, synovial sarcoma, pleomorphic sarcoma, gastrointestinal stromal tumor, leiomyosarcoma, or angiosarcoma, or any of those disclosed herein.

Aspect 111. The pharmaceutical composition of any one of aspects 101-110, wherein the pharmaceutical composition is for the treatment of a solid tumor cancer or solid tumor premalignancy in a mammalian subject, such as a human patient.

Aspect 112. The pharmaceutical composition of aspect 111, wherein the mammalian subject, such as human patient, is not afflicted with a hematological cancer or hematological premalignancy.

Aspect 113. The pharmaceutical composition of any one of aspects 101-112, further including at least one immune checkpoint inhibitor.

Aspect 114. The pharmaceutical composition of aspect 113, wherein the at least one immune checkpoint inhibitor includes a CD47 inhibitor.

Aspect 115. The pharmaceutical composition of aspect 113 or 114, wherein the at least one immune checkpoint inhibitor includes one or both of PD-1 inhibitor and a PD-L1 inhibitor.

Aspect 116. The pharmaceutical composition of any one of aspects 113-115, wherein the at least one immune checkpoint inhibitor includes a CTLA-4 inhibitor.

Aspect 117. The pharmaceutical composition of any one of aspects 101-116, wherein the solid tumor cancer or solid tumor premalignancy is a CD33 low-expressing or CD33-negative solid tumor cancer or a CD33 low-expressing or CD33-negative solid tumor cancer solid tumor premalignancy.

EXAMPLES

Example 1: Production of Radiolabeled Targeting Agent

A targeting agent such as an antibody may, for example, be labeled with a radionuclide, such as Indium-111 ($^{111}$In) or Actinium-225 ($^{225}$Ac), according to procedures detailed in any of U.S. Pat. No. 9,603,954 (disclosing, e.g., p-SCN-Bn-DOTA conjugation and $^{225}$Ac labeling), U.S. Pat. No. 10,420,851, International Pub. No. WO 2017/155937 and U.S. Provisional Patent Application No. 63/042,651 filed Dec. 9, 2019 and titled "Compositions and methods for preparation of site-specific radioconjugates."

Radiolabeling: The antibody may be conjugated to a linker, such as any of the bifunctional chelators described herein and in the above indicated patent literature. An exemplary linker includes at least dodecane tetraacetic acid (DOTA), wherein a goal of the conjugation reaction is to achieve a DOTA-antibody ratio of 3:1 to 5:1. Chelation with the radionuclide $^{111}$In or $^{225}$Ac may then be performed and efficiency and purity of the resulting or $^{225}$Ac-labeled anti-CD33 antibody may be determined by HPLC and iTLC.

An exemplary labeling reaction for $^{225}$AC is as follows: A reaction including 15 µl 0.15M NH$_4$OAc buffer, pH=6.5 and 2 µL (10 µg) DOTA-anti-CD33 (5 mg/ml) may be mixed in an Eppendorf reaction tube, and 4 µL $^{225}$Ac (10 µCi) in 0.05 M HCl subsequently added. The contents of the tube may be mixed with a pipette tip and the reaction mixture incubated at 37° C. for 90 min with shaking at 100 rpm. At the end of the incubation period, 3 µL of a 1 mM DTPA solution may be added to the reaction mixture and incubated at room temperature for 20 min to bind the unreacted $^{225}$Ac into the $^{225}$Ac-DTPA complex. Instant thin layer chromatography with 10 cm silica gel strip and 10 mM EDTA/normal saline mobile phase may be used to determine the radiochemical purity of $^{225}$Ac-DOTA-anti-CD3 3 through separating $^{225}$Ac-labeled anti-CD33 ($^{225}$Ac-DOTA-anti-CD33) from free $^{225}$Ac ($^{225}$Ac-DTPA). In this system, the radiolabeled antibody stays at the point of application and $^{225}$Ac-DTPA moves with the solvent front. The strips may be cut in halves and counted in the gamma counter equipped with the multichannel analyzer using channels 72-110 for $^{225}$Ac to exclude its daughters.

Purification: An exemplary radiolabeled targeting agent, such as $^{225}$Ac-DOTA-antibody, may be purified either on PD10 columns pre-blocked with 1% HSA or on Vivaspin centrifugal concentrators with a 50 kDa MW cut-off with 2×1.5 mL washes, 3 min per spin. HPLC analyses of the $^{225}$Ac-DOTA-antibody after purification may be conducted using a Waters HPLC system equipped with flow-through Waters UV and Bioscan Radiation detectors, using a TSK3000SW XL column eluted with PBS at pH=7.4 and a flow rate of 1 ml/min.

Example 2: Specificity and Stability of CD33 ARC

Lintuzumab conjugated with Actinium-225 (Ac$^{225}$) was tested for cytotoxicity against specific cell types which express CD33. For example, suspensions of HL60 (leukemia cells) were incubated with various doses of radiolabeled lintuzumab (lintuzumab-Ac$^{225}$), and the dose at which 50% of the cells were killed (LD$_{50}$) was found to be 8 µCi per mL of cell suspension.

In studies to access the reactivity of the radiolabeled lintuzumab with peripheral blood and bone marrow cells from nonhuman primate and human frozen tissues, the radiolabeled lintuzumab showed reactivity with mononuclear cells only, demonstrating specificity. Moreover, in studies to determine the stability of the radiolabel on the antibody, 10 normal mice (8-week-old Balb/c female mice from Taconic, Germantown, New York) were injected in the tail with 300 nCi radiolabeled lintuzumab (in 0.12 ml). Serum samples taken over a 5 day period showed that the Actinium-225 remained bound to the lintuzumab, demonstrating the stability of the radiolabel on the antibody in vivo.

A maximum tolerated dose (MTD) of a single injection of the radiolabeled lintuzumab was determined to be 3 μCi/kg patient weight. As a split dose (e.g., 2 equal doses administered 4-7 days apart), the MTD was determined to be 2 μCi/kg per dose, or 4 μCi/kg total. This data was determined by injections into patients with relapsed/refractory AML: 21 patients were injected with increasing doses of the radiolabeled lintuzumab—0.5 μCi/kg to 4 μCi/kg. Determination of MTD was based on the severity of the adverse effects observed at each dose level. Anti-leukemic effects included elimination of peripheral blood blasts in 13 of 19 evaluable patients. Twelve of 18 patients who were evaluable at 4 weeks following treatment had reductions in bone marrow blasts, including nine with reductions >50%. Three patients treated with 1 μCi/kg, 3 μCi/kg and 4 μCi/kg respectively had <5% blasts after therapy.

Example 3: Human Maximal Tolerated Dose and Efficacy of CD33 ARC

A maximum tolerated dose (MTD) of fractionated doses of $^{225}$Ac-lintuzumab followed by Granulocyte Colony Stimulating factor (GCSF) support in each cycle may be determined using a dosing cycle of approximately 42 days. A cycle starts with administration of a fractionated dose of $^{225}$Ac-labeled lintuzumab on Day 1 followed by the administration of GCSF on Day 9 and continuing GCSF per appropriate dosing instructions until absolute neutrophil count (ANC) is greater than 1,000, which is expected to occur within 5-10 days. On Days 14, 21, 28, 35 and 42 peripheral blood will be assessed for paraprotein burden. A bone marrow aspirate will be performed to assess plasmocyte infiltration on Day 42. If a response is a partial response or better but less than a complete response on Day 42, and the patient remains otherwise eligible, the patient will be re-dosed in a new cycle at the same dose level no sooner than 60 days after Day 1 of the first cycle. In absence of dose limiting toxicities, cycles will continue using the above-described algorithm until the patient has received a cumulative dose of 4 μCi/kg of $^{225}$Ac-labeled lintuzumab.

Example 4: $^{225}$Ac-Lintuzumab Depletes Human Cancer Patient-Derived MDSCs and Human Healthy Donor MDSCs The ability of 225Ac-labeled lintuzumab (anti-CD33 mAb) to kill MDSCs isolated from the PBMCs of human colorectal cancer (CRC) patients or from healthy human donors (HD) was tested.

Both CRC and HD PBMCs were obtained. In each case, anti-CD14 microbeads (Catalog No. 130-050-201, Miltenyi Biotec, Bergisch Gladbach, Germany) were used to isolate CD14-positive MDSCs (monocytic MDSCs, M-MDSCs). Anti-CD15 microbeads (Catalog No. 130-046-601, Miltenyi Biotec) were then used to selected CD15-positive MDSCs (granulocytic MFSCs, G-MDSCs) from the CD14-negative PBMC fraction. The isolated M-MDSCs and G-MDSCs were then pooled and immunophenotyped (using FITC labeled antibodies from Miltenyi Biotec and an Accuri C6 Plus flow cytometer (Becton Dickinson, Franklin Lakes, NJ USA)) confirming M-MDSC (CD14$^+$, CD15$^-$, CD11b$^+$, HLA-DR$^-$/low CD33$^+$) and G-MDSC (CD14$^-$, CD15$^+$, CD11b$^+$, CD33$^+$) profiles of the isolated cells. The Miltenyi Biotec fluorophore-labeled antibodies used for the immunophenotyping were CD14-FITC anti-Human Antibody (Catalog No. 130-110-518), CD15-APC anti-Human Antibody (Catalog No. 130-113-482), CD33-FITC anti-Human Antibody (Catalog No. 130-111-018), CD11b-APC anti-Human Antibody (Catalog No. 130-110-554), CD33-APC anti-Human Antibody (Catalog No. 130-111-020), CD11b-FITC anti-Human Antibody (Catalog No. 130-110-552), and HLA-DR-FITC anti-Human Antibody (Catalog No. 130-111-788). The pooled MDSCs were then used in viability assays examining the effects of $^{225}$Ac-labeled lintuzumab (specifically, $^{225}$Ac-labeled conjugate of p-SCN-Bn-DOTA and lintuzumab) at different radiation doses versus non-radiolabeled lintuzumab control.

For each radiation dose of $^{225}$Ac-labeled lintuzumab tested, the protein amount of the $^{225}$Ac-labeled lintuzumab and the protein amount of the non-radiolabeled lintuzumab were the same in the experiment. Via-Probe red nucleic acid stain (Catalog No. 1 565803, Becton Dickinson) was used to assess viability of cells with the Accuri C6 Plus flow cytometer.

FIG. 1 shows results of a viability assay demonstrating that $^{225}$Ac-labeled lintuzumab (anti-CD33 mAb) significantly depletes MDSCs isolated from a human colorectal cancer (CRC) patient versus non-radiolabeled lintuzumab control. In this experiment, 100,000 cells/well, 15 min 4° C. treatment (radiolabeled or non-radiolabeled lintuzumab), and an endpoint of 48 hours were used.

Figure 2:
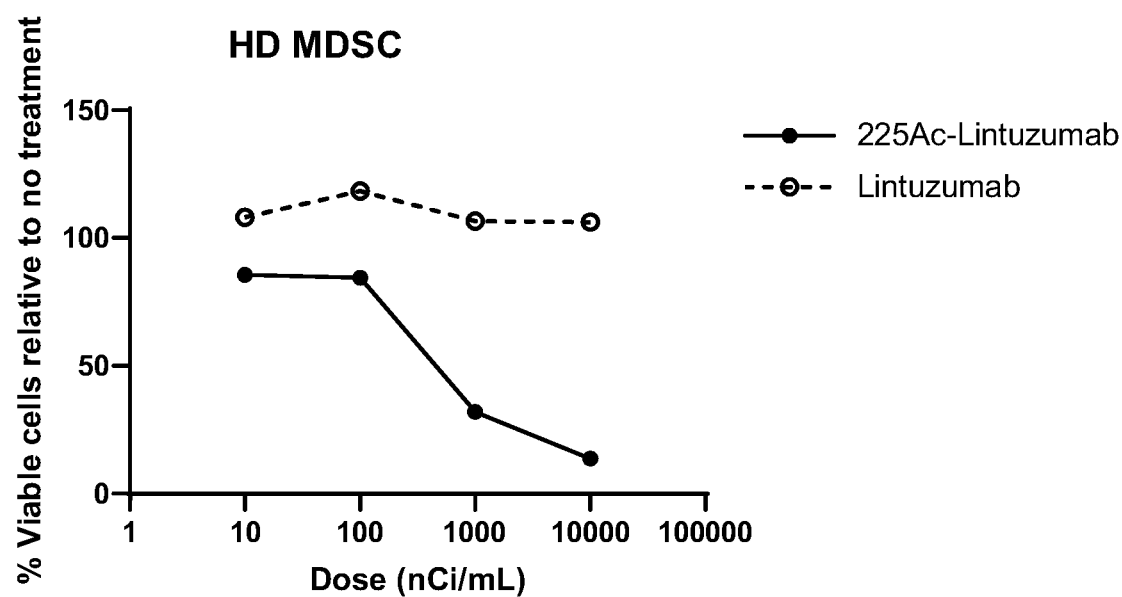
FIG. 2 shows results of a viability assay demonstrating that $^{225}$Ac-labeled lintuzumab (anti-CD33 mAb) significantly depletes MDSCs isolated from a healthy human donor (HD) versus non-radiolabeled lintuzumab control.

FIG. 2 shows results of a viability assay demonstrating that $^{225}$Ac-labeled lintuzumab (anti-CD33 mAb) significantly depletes MDSCs isolated from a healthy human donor (HD) versus non-radiolabeled lintuzumab control. In this experiment, 100,000 cells/well, 15 min 37° C. treatment (radiolabeled or non-radiolabeled lintuzumab), and an endpoint of 48 hours were used.

While various specific embodiments have been illustrated and described herein, it will be appreciated that various changes can be made without departing from the spirit and scope of the invention(s). Moreover, features described in connection with one aspect of the invention may be used in conjunction with other aspects of the invention, even if not explicitly exemplified in combination within.

What is claimed is:

1. A method for treating a sarcoma in a human subject, comprising administering a therapeutically effective amount of a radiolabeled anti-CD33 antibody to a human subject in need of treatment for a sarcoma,
   wherein the radiolabeled anti-CD33 antibody comprises $^{225}$Ac-labeled conjugate of p-SCN-Bn-DOTA and lintuzumab, and
   wherein the sarcoma is osteosarcoma, dermatofibrosarcoma protuberans (DFSP), fibrosarcoma (fibroblastic sarcoma), chondrosarcoma, Ewing's sarcoma, Kaposi's sarcoma, rhabdomyosarcoma, liposarcoma, synovial sarcoma, pleomorphic sarcoma, gastrointestinal stromal tumor, leiomyosarcoma, or angiosarcoma.

2. The method of claim 1, further comprising administering to the human subject a therapeutically effective amount of at least one of a PD-L1 inhibitor, a PD-1 inhibitor, and a CTLA-4 inhibitor.

* * * * *